(12) United States Patent
Bhargava et al.

(10) Patent No.: US 11,508,364 B2
(45) Date of Patent: Nov. 22, 2022

(54) ELECTRONIC DEVICE FOR OUTPUTTING RESPONSE TO SPEECH INPUT BY USING APPLICATION AND OPERATION METHOD THEREOF

(71) Applicant: Samsung Electronics Co., Ltd., Suwon-si (KR)

(72) Inventors: Cheenepalli Srirama Krishna Bhargava, Bangalore (IN); Ankush Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 16/418,371

(22) Filed: May 21, 2019

(65) Prior Publication Data
US 2019/0362718 A1    Nov. 28, 2019

(30) Foreign Application Priority Data

May 22, 2018  (IN) ............................... 20184109106
Nov. 30, 2018  (IN) ............................. 2018 4109106
May 9, 2019  (KR) ........................ 10-2019-0054521

(51) Int. Cl.
*G10L 15/22*    (2006.01)
*G10L 15/18*    (2013.01)
*G10L 15/08*    (2006.01)

(52) U.S. Cl.
CPC .......... *G10L 15/22* (2013.01); *G10L 15/1815* (2013.01); *G10L 2015/088* (2013.01); *G10L 2015/223* (2013.01)

(58) Field of Classification Search
CPC ..... G10L 15/197; G10L 15/02; G10L 15/187; G10L 15/22; G10L 15/1815; G10L 2015/088; G10L 2015/223
See application file for complete search history.

(56) References Cited

U.S. PATENT DOCUMENTS 6,615,178 B1 *  9/2003  Tajima .................. G06F 40/205
                                                          704/277
7,603,273 B2  10/2009  Poirier
(Continued)

FOREIGN PATENT DOCUMENTS

EP       3 200 185 A1     8/2017
WO   WO2018025668 A1 *  7/2017

OTHER PUBLICATIONS

International Search Report dated Aug. 29, 2019, issued in International Patent Application No. PCT/KR2019/006111.
(Continued)

*Primary Examiner* — Michelle M Koeth
*Assistant Examiner* — Darioush Agahi
(74) *Attorney, Agent, or Firm* — Jefferson IP Law, LLP

(57) ABSTRACT

An artificial intelligence (AI) system is provided. The AI system simulates functions of human brain such as recognition and judgment by utilizing a machine learning algorithm such as deep learning, etc. and an application of the AI system. A method, performed by an electronic device, of outputting a response to a speech input by using an application, includes receiving the speech input, obtaining text corresponding to the speech input by performing speech recognition on the speech input, obtaining metadata for the speech input based on the obtained text, selecting at least one application from among a plurality of applications for outputting the response to the speech input based on the metadata, and outputting the response to the speech input by using the selected at least one application.

15 Claims, 27 Drawing Sheets

(56) References Cited

U.S. PATENT DOCUMENTS

| | | | |
|---|---|---|---|
| 8,010,359 B2 | 8/2011 | Matsuo | |
| 8,954,323 B2 | 2/2015 | Tsujikawa et al. | |
| 9,286,897 B2 | 3/2016 | Bisani et al. | |
| 9,373,329 B2 | 6/2016 | Strope et al. | |
| 9,472,196 B1 * | 10/2016 | Wang | G10L 15/19 |
| 9,576,574 B2 * | 2/2017 | van Os | G06F 3/167 |
| 9,740,751 B1 * | 8/2017 | Yeom | G10L 15/1822 |
| 9,754,016 B1 | 9/2017 | Bozarth et al. | |
| 10,089,983 B1 * | 10/2018 | Gella | G10L 15/32 |
| 2006/0212291 A1 | 9/2006 | Matsuo | |
| 2009/0006100 A1 | 1/2009 | Badger et al. | |
| 2014/0067403 A1 | 3/2014 | Burke et al. | |
| 2014/0188477 A1 * | 7/2014 | Zhang | G10L 15/22 704/257 |
| 2016/0378080 A1 | 12/2016 | Uppala et al. | |
| 2018/0074785 A1 * | 3/2018 | Ohmura | G06F 3/0487 |
| 2018/0096690 A1 | 4/2018 | Mixter et al. | |
| 2019/0027149 A1 * | 1/2019 | Vogel | G10L 15/26 |

OTHER PUBLICATIONS

Extended European Search Report dated Mar. 5, 2021, issued in European Patent Application No. 19808029.3-1207.

\* cited by examiner

ELECTRONIC DEVICE FOR OUTPUTTING RESPONSE TO SPEECH INPUT BY USING APPLICATION AND OPERATION METHOD THEREOF

CROSS-REFERENCE TO RELATED APPLICATIONS

This application is based on and claims priority under 35 U.S.C. § 119(a) of an Indian Provisional patent application number 20184109106, filed on May 22, 2018, in the Indian Intellectual Property Office, of an Indian patent application number 20184109106, filed on Nov. 30, 2018, in the Indian Intellectual Property Office, and of a Korean patent application number 10-2019-0054521, filed on May 9, 2019, in the Korean Intellectual Property Office, the disclosure of each of which is incorporated by reference herein in its entirety.

BACKGROUND

1. Field

The disclosure relates to an electronic device for outputting a response to a speech input by using an application and an operation method thereof. The disclosure also relates to an artificial intelligence (AI) system that utilizes a machine learning algorithm such as deep learning, etc. and an application of the AI system.

2. Description of Related Art

An AI system is a computer system with human level intelligence. Unlike an existing rule-based smart system, the AI system is a system that trains itself autonomously, makes decisions, and becomes increasingly smarter. The more the AI system is used, the more the recognition rate of the AI system may improve and the AI system may more accurately understand a user preference, and thus, an existing rule-based smart system is being gradually replaced by a deep learning based AI system.

AI technology refers to machine learning (deep learning) and element technologies that utilize the machine learning.

Machine learning is an algorithm technology that classifies/learns the features of input data autonomously. Element technology is a technology that simulates functions of human brain such as recognition and judgment by utilizing machine learning algorithm such as deep learning and consists of technical fields such as linguistic understanding, visual comprehension, reasoning/prediction, knowledge representation, and motion control.

AI technology is applied to various fields as follows. Linguistic understanding is a technology to recognize and apply/process human language/characters and includes natural language processing, machine translation, dialogue systems, query response, speech recognition/synthesis, and the like. Visual comprehension is a technology to recognize and process objects like human vision and includes object recognition, object tracking, image search, human recognition, scene understanding, spatial understanding, image enhancement, and the like. Reasoning prediction is a technology to acquire and logically infer and predict information and includes knowledge/probability based reasoning, optimization prediction, preference based planning, recommendation, and the like. Knowledge representation is a technology to automate human experience information into knowledge data and includes knowledge building (data generation/classification), knowledge management (data utilization), and the like. Motion control is a technology to control autonomous traveling of a vehicle and motion of a robot, and includes motion control (navigation, collision avoidance, and traveling), operation control (behavior control), and the like.

An electronic device may use various types of applications to provide a response to a speech input of a user. For example, when the speech input includes a speech command or a speech query, the electronic device may perform an operation corresponding to the speech command or the speech query by using various types of applications using the AI techniques described above and provide a response indicating a result of the operation being performed to the user.

However, according to a characteristics of each application, the accuracy, the success rate, the processing speed, etc. of the response provided to the user may be different.

Accordingly, there is a need for a method that provides an appropriate response to a speech input of a user by using the most suitable application for providing the response to the speech input.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that selects an application for outputting a response to a speech input according to the speech input and outputs the response to the speech input by using the selected application and an operation method thereof.

Another aspect of the disclosure is to provide a computer program product including a non-transitory computer-readable recording medium having recorded thereon a program for executing the method on a computer. The technical solution to be solved is not limited to the technical problems as described above, and other technical problems may exist.

Additional aspects will be set forth in part in the description which follows and, in part, will be apparent from the description, or may be learned by practice of the presented embodiments.

In accordance with an aspect of the disclosure, a method, performed by an electronic device, of outputting a response to a speech input by using an application is provided. The method includes receiving the speech input, obtaining text corresponding to the speech input by performing speech recognition on the speech input, obtaining metadata for the speech input based on the obtained text, selecting at least one application from among a plurality of applications for outputting the response to the speech input based on the metadata, and outputting the response to the speech input by using the selected at least one application.

In accordance with another aspect of the disclosure, an electronic device for performing authentication on a user is provided. The electronic device includes a user inputter configured to receive speech input, at least one processor configured to obtain text corresponding to the speech input by performing speech recognition on the speech input, obtain metadata for the speech input based on the obtained text, and select at least one application from among a plurality of applications for outputting the response to the speech input based on the metadata, and an outputter configured to output a response to the speech input by using the selected at least one application.

In accordance with another aspect of the disclosure, a computer program product is provided. The computer program product includes a non-transitory computer-readable recording medium having recorded thereon a program for executing the method on a computer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
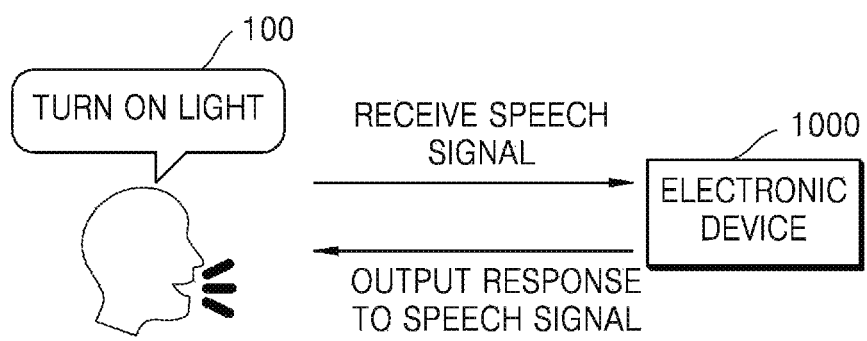
FIG. 1 is a block diagram illustrating a system for providing a response to a speech input by using an application according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments of the disclosure will be described in detail in order to fully convey the scope of the disclosure and enable one of ordinary skill in the art to embody and practice the disclosure. The disclosure may, however, be embodied in many different forms and should not be construed as being limited to the embodiments set forth herein. Also, parts in the drawings unrelated to the detailed description are omitted to ensure clarity of the disclosure. Like reference numerals in the drawings denote like elements.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

Throughout the disclosure, the expression "at least one of a, b or c" indicates only a, only b, only c, both a and b, both a and c, both b and c, all of a, b, and c, or variations thereof.

Hereinafter, the disclosure will be described in detail by explaining embodiments of the disclosure with reference to the attached drawings.

FIG. 1 is a block diagram illustrating a system for providing a response to a speech input by using an application according to an embodiment of the disclosure.

Referring to FIG. 1, the system for providing the response to the speech input 100 by using the application according to an embodiment of the disclosure may include an electronic device 1000. The electronic device 1000 may receive the speech input 100 from a user and output the response to the received speech input 100.

The electronic device 1000 according to an embodiment of the disclosure may be implemented in various forms, such as a device capable of receiving the speech input 100 and outputting the response to the received speech input 100. For example, the electronic device 1000 described herein may be a digital camera, a smart phone, a laptop computer, a tablet personal computer (PC), an electronic book terminal, a digital broadcast terminal, a personal digital assistant (PDA), a portable multimedia player (PMP), a navigation device, an MP3 player, an artificial intelligent speaker, and the like but is not limited thereto.

The electronic device 1000 described herein may be a wearable device that may be worn by the user. The wearable device may include at least one of an accessory-type device (e.g., a watch, a ring, a cuff band, an ankle band, a necklace, spectacles, and a contact lens), a head-mounted-device (HMD), a textile or garment-integrated device (e.g. electronic garments), a body attachment device (e.g., a skin pad), or a bioimplantable device (e.g., implantable circuit) but is not limited thereto. Hereinafter, for convenience of explanation, a case where the electronic device 1000 is a smart phone will be described as an example.

According to an embodiment of the disclosure, the application used to provide the response to the speech input 100 by the electronic device 1000 may provide an interactive interface for receiving the speech input 100 from the user and outputting the response to the speech input 100 of the user. The application may include, but is not limited to, a virtual assistant, an artificial intelligence (AI) assistant, and the like. The virtual assistant or the AI assistant may be a software agent that processes a task required by the user and provides a service specific to the user.

According to an embodiment of the disclosure, the electronic device 1000 may perform a speech recognition on the speech input 100 of the user to obtain text corresponding to the speech input 100, and based on the text, select an application to provide the response corresponding to the speech input 100 from among a plurality of applications.

According to an embodiment of the disclosure, the electronic device 1000 may select an application suitable for processing the speech input 100 on the basis of metadata obtained based on the speech input 100, and output the response to the speech input 100 by using the selected application.

The plurality of applications according to an embodiment of the disclosure may have different characteristics and process the speech input 100.

For example, any one of the applications may have a function of controlling a home appliance previously designated according to the speech input 100. Also, any one of the applications may have a control function related to navigation. Also, any one of the applications may have a function of processing a speech input related to multimedia playback.

Thus, the electronic device 1000 may select the application to process the speech input 100, considering that a difference is present in capability, processing speed, and accuracy by which each of the applications may process the speech input 100, data used to process the speech input 100, and an operation that may be performed according to the speech input 100.

For example, the electronic device 1000 may select at least one application suitable for processing the speech input 100 distinguished as the metadata from the plurality of applications for outputting the response to the speech input 100 received by the electronic device 100, based on at least one of feedback information of the user about a response output by a plurality of applications, information about a result of processing a speech input by the plurality of applications, information about a time taken for the plurality of applications to output the response, information about operations that may be performed by the plurality of applications, or information about capability of the plurality of applications.

The electronic device is not limited to the above-described example, and may select the application to be used for outputting the response to the speech input 100, based on a variety of information regarding the plurality of applications.

The selected application may perform an operation corresponding to the speech input 100, generate the response based on a result of the operation being performed, and provide the generated response to the user.

For example, when text obtained as a result of performing speech recognition on the speech input 100 of the user is "Turn on the light," the electronic device 1000 may obtain "light" that is a keyword of the text as the metadata for the speech input 100. The electronic device 1000 according to an embodiment of the disclosure may select at least one application suitable for processing the speech input 100, based on the metadata including the "light."

Also, the electronic device 1000 may output the response based on the result of the operation performed, by performing the operation corresponding to the speech input 100 through the selected application. For example, the selected application may perform the operation of controlling an electric lamp around the user in correspondence to the speech input 100 "Turn on the light," and based on the result of the operation performed, output the response "Light 1 in the living room is turned on."

The metadata may further include a variety of information related to the speech input 100 as well as the keyword extracted from the text corresponding to the speech input 100.

For example, the metadata may include a variety of information that may be obtained from the text, such as the keyword extracted from the text corresponding to the speech input 100, information about an intention of the user obtained based on the text, etc.

The metadata is not limited to the above described example, and may further include information about a sound characteristic of the speech input 100, information about the user of the electronic device 1000 that receives the speech input 100, etc., as information related to the speech input 100 besides the text.

According to an embodiment of the disclosure, the metadata may include at least one of the keyword extracted from the text corresponding to the speech input 100, the information about the intention of the user acquired based on the text, the information about the sound characteristic of the speech input 100, or the information about the user of the electronic device 1000 that receives the speech input 100 described above.

The text may include the text corresponding to the speech input 100, obtained by performing speech recognition on the speech input 100. For example, when the speech input 100 includes a speech signal that is uttered "Turn on the light" by the user, then "Turn on the light" may be obtained as the text corresponding to the speech input 100.

The keyword extracted from the text may include at least one word included in the text. For example, the keyword may be determined as a word indicating the core content of the text of the speech input 100. The keyword may be extracted according to various methods of extracting a core word from the text.

The information about the intention of the user may include the intention of the user who performed the speech input 100, which may be interpreted through text analysis. The information about the intention of the user may be determined in further consideration of not only the text analysis but also a variety of information related to the user such as schedule information of the user, information about a speech command history of the user, information about an interest of the user, information about a life pattern of the user, etc. For example, the intention of the user may be determined as content related to a service that the user desires to receive using the electronic device 1000.

For example, with respect to the text "Turn on the light," the information about the intention of the user may include "external device control." The external device may include a device other than the electronic device 1000 that may be controlled upon request of the electronic device 1000. For another example, the information about the intention of the user may include, in addition to "external device control," one of "emergency rescue service request," "information provision," "setting for an electronic device," "navigation function provision," and "multimedia file playback." The information about the intention of the user, but not limited to the above described example, may include various kinds of information related to an operation of the electronic device 1000 expected by the user through the speech input 100.

According to an embodiment of the disclosure at least one keyword may be extracted from the text. For example, when a plurality of keywords are extracted, based on a variety of information related to the user, such as the information about the speech command history of the user, the information about the interest of the user, feedback information about the speech command of the user, a priority of each keyword may be determined. For another example, the priority of each keyword may be determined based on a degree related to the intention of the user. According to an embodiment of the disclosure, a weight for each keyword may be determined according to the determined priority, and according to the determined weight, an application by which the response is to be output may be determined based on at least one keyword.

When a plurality of keywords are extracted from the text, based on the variety of information about the user above described, the at least one keyword for determining the application by which the response is to be output may be selected. For example, based on the weight determined for each keyword described above, at least one of the plurality of keywords may be selected. According to an embodiment of the disclosure, at least one non-selected keyword of the plurality of keywords may be a keyword including information that does not contradict each other.

For example, when the speech-recognized text is "Tell me the way by driving to place A . . . place B," keywords "place A," "place B," and "driving" may be extracted. According to an embodiment of the disclosure, the electronic device 1000 may determine, on the text, that it is highly likely that "place A" is a word that the user is mistakenly spoken of, considering that the user reversely speaks "place A" as place B. Also, according to the schedule information of the user, the electronic device 1000 may determine that it is highly likely that the user is currently to move to "place B." Therefore, the electronic device 1000 may determine that "place B" among "place A" and "place B" is the keyword corresponding to the intention of the user. According to an embodiment of the disclosure, the electronic device 1000 may determine the application to output the response by excluding "place A" from the keyword, or by setting a low weight to "place A."

The information about the sound characteristic of the speech input 100 according to an embodiment of the disclosure may include information about a characteristic of a speech signal of the speech input 100. For example, the information about the sound characteristic may include a time at which the speech signal is received, a length of the speech signal, type information of the speech signal (e.g., male, female, and noise), etc. The information about the sound characteristic may include various types of information as information about the speech signal of the speech input 100.

The information about the user may include information about the user of the electronic device 1000 that receives the speech input 100, for example, a variety of information such as an age of the user, a life pattern, a preferred device, a field of interest, etc.

According to an embodiment of the disclosure, the electronic device 1000 may use an AI model to select at least one application from among a plurality of applications based on the speech input 100 received from the user. For example, the electronic device 1000 may use a previously learned AI model in generating metadata or selecting an application based on the metadata.

According to an embodiment of the disclosure, the electronic device 1000 may receive a plurality of speech inputs 100 for a predetermined time period. For example, the electronic device 1000 may receive the plurality of speech inputs 100 received from at least one speaker for a time period of about 5 seconds.

The electronic device 1000 may determine priorities with respect to responses corresponding to the plurality of speech inputs 100 and output the responses according to the determined priorities. For example, when the plurality of speech inputs 100 are received, metadata may be obtained for each of the speech inputs 100, and based on the metadata, the priorities with respect to the responses corresponding to the plurality of speech inputs 100 may be determined. For one example, the priority may be determined based on the information about the intention of the user included in the metadata. Also, based on the priority, the responses by the respective speech inputs 100 may be sequentially output.

Further, the priority with respect to the response may be determined based further on at least one of information about a size of the response, whether the response includes a characteristic preferred by the user, or a time taken to output the response after obtaining the response.

The priorities with respect to the plurality of responses may be, but not limited to the above described example, determined based on a variety of information about each response.

According to an embodiment of the disclosure, in accordance with the on-device AI technology, without transmitting and receiving data to and from a cloud server, the speech command of the user may be processed, on the electronic device 1000, and a processing result may be output through the application. For example, the electronic device 1000 may perform operations according to an embodiment of the disclosure, based on a variety of information about the user collected by the electronic device 1000 in real time, without using big data stored in the cloud server.

According to the on-device AI technology, the electronic device 1000 may learn by itself based on the data collected by itself, and make a decision by itself based on a learned AI model. According to the on-device AI technology, because the electronic device 1000 does not transmit the collected data to the outside but operates the data by itself, there are advantages in terms of personal information protection of the user and data processing speed.

For example, according to whether a network environment of the electronic device 1000 is unstable or, without using the big data, it is sufficient to perform the operation according to an embodiment of the disclosure according to the AI model learned in the electronic device 1000, based on only the information collected in the electronic device 1000, the electronic device 1000 may operate using the on-device AI technology, without connection to the cloud server.

However, the electronic device 1000 is not limited to operating according to the on-device AI technology, and may perform the operation according to an embodiment of the disclosure through data transmission/reception with the cloud server or an external device. Also, the electronic device 1000 may perform the operation according to an embodiment of the disclosure by combining the on-device AI technology and a method through the data transmission/reception with the cloud server described above.

For example, according to the network environment and computing power of the electronic device 1000, when the method through the cloud server is more advantageous than the on-device AI technology such as an operation through the cloud server is more advantageous in terms of data processing speed or data that does not include the personal information of the user is delivered to the cloud server, etc., the operation according to an embodiment of the disclosure may be performed, according to the method through the cloud server.

Figure 2:
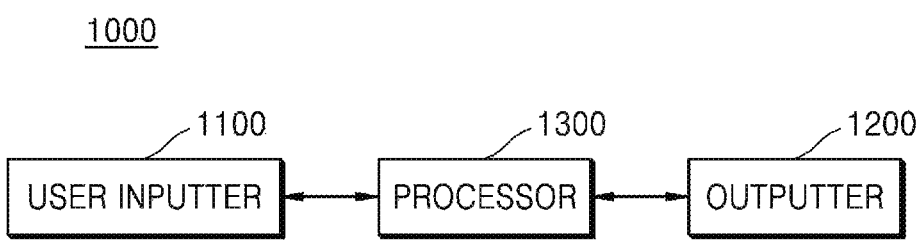
FIG. 2 is a block diagram for explaining an internal configuration of an electronic device according to an embodiment of the disclosure.

FIG. 2 is a block diagram for explaining an internal configuration of an electronic device according to an embodiment of the disclosure.

Figure 3:
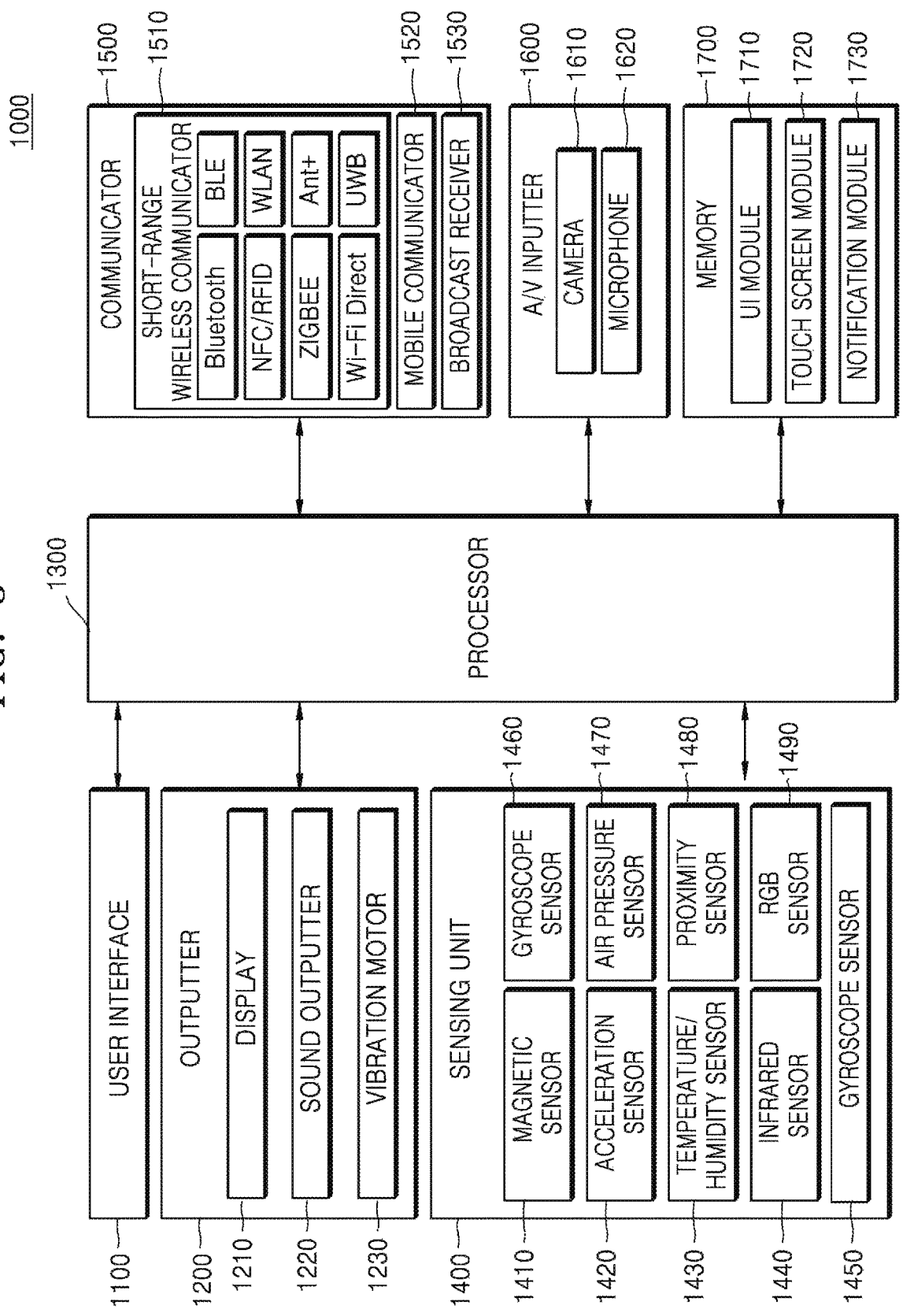
FIG. 3 is a block diagram for explaining an internal configuration of an electronic device according to an embodiment of the disclosure.

FIG. 3 is a block diagram for explaining an internal configuration of an electronic device according to an embodiment of the disclosure.

Referring to FIG. 2, the electronic device 1000 may include a user inputter 1100, a processor 1300, and an outputter 1200. However, not all components shown in FIG. 2 are indispensable components of the electronic device 1000. The electronic device 1000 may be implemented by more components than the components shown in FIG. 2, and the electronic device 1000 may be implemented by fewer components than the components shown in FIG. 2.

For example, referring to FIG. 3, the electronic device 1000 may include a sensing unit 1400, a communicator 1500, a user inputter 1100, an audio/video (A/V) inputter 1600, and a memory 1700, in addition to the user inputter 1100, the processor 1300, and the outputter 1200.

The user inputter 1100 is a means for a user to input data for controlling the electronic device 1000. For example, the user inputter 1100 may include a key pad, a dome switch, a touch pad (a contact capacitance type, a pressure resistive type, an infrared ray detection type, a surface ultrasonic wave conduction type, an integral tension measurement type, a piezo effect type, etc.), a jog wheel, a jog switch, and the like, but is not limited thereto.

The user inputter 1100 may receive the speech input 100 of the user. For example, the user inputter 1100 may receive the speech input 100 of the user input through a microphone provided in the electronic device 1000.

The outputter 1200 may output an audio signal or a video signal or a vibration signal and may include a display 1210, a sound outputter 1220, and a vibration motor 1230.

The outputter 1200 may output a response including a result of performing an operation according to the speech input 100 of the user. For example, the outputter 1200 may output the response including the result of performing the operation corresponding to the speech input 100 of the user by at least one application. The at least one application by which the operation corresponding to the speech input 100 is performed may be determined based on text obtained as a result of performing speech recognition on the speech input 100.

The display 1210 may display and output information processed by the electronic device 1000. According to an embodiment of the disclosure, the display 1210 may display a result of performing the operation according to the speech input 100 of the user.

The display 1210 and a touch pad may be configured as a touch screen in a layer structure. In this case, the display 1210 may be used as an input device in addition to as an output device. The display 1210 may include at least one of a liquid crystal display, a thin film transistor-liquid crystal display, an organic light-emitting diode display, a flexible display, a three-dimensional (3D) display, or an electrophoretic display. The electronic device 1000 may include two or more displays 1210 according to an implementation type of the electronic device 1000.

The sound outputter 1220 may output audio data received from the communicator 1500 or stored in the memory 1700. The sound outputter 1220 may output audio data indicating a result of performing an operation according to the speech input 100 of the user.

The vibration motor 1230 may output a vibration signal. The vibration motor 1230 may output the vibration signal when a touch is input to the touch screen. The vibration motor 1230 according to an embodiment of the disclosure may output a vibration signal indicating the result of performing the operation according to the speech input 100 of the user.

The processor 1300 may generally control the overall operation of the electronic device 1000. For example, the processor 1300 may generally control the user inputter 1100, the outputter 1200, the sensing unit 1400, the communicator 1500, and the A/V inputter 1600 by executing programs stored in the memory 1700. The electronic device 1000 may include at least one processor 1300.

The processor 1300 may be configured to process a command of a computer program by performing basic arithmetic, logic, and input/output operations. The command may be provided to the processor 1300 from the memory 1700 or may be received through the communicator 1500 and provided to the processor 1300. For example, the processor 1300 may be configured to execute the command in accordance with program code stored in a recording device, such as a memory.

The at least one processor 1300 may obtain text corresponding to the speech input 100 by performing speech recognition on the speech input 100 of the user, and may select an application to provide a response corresponding to the speech input 100 from among a plurality of applications.

For example, the at least one processor 1300 may select an application suitable for processing the speech input 100 based on metadata obtained on the basis of the speech input 100, and may provide the response to the speech input 100 to the user through the selected application.

The at least one processor 1300 may determine a priority with respect to at least one response to the speech input 100 and control the at least one response to be output according to the determined priority.

The sensing unit 1400 may sense a state of the electronic device 1000 or a state around the electronic device 1000 and may transmit sensed information to the processor 1300.

The information sensed by the sensing unit 1400 may be used as metadata related to the speech input 100. For example, the metadata may include various types of sensing information related to the speech input 100 and about the user and a surrounding environment sensed by the sensing unit 1400. Thus, the electronic device 1000 may select the application suitable for processing the speech input 100, based on the metadata including a variety of information related to the speech input 100.

The sensing unit 1400 may include at least one of a magnetic sensor 1410, an acceleration sensor 1420, a temperature/humidity sensor 1430, an infrared sensor 1440, a gyroscope sensor 1450, a location sensor (e.g., a global positioning system (GPS)) 1460, an air pressure sensor 1470, a proximity sensor 1480, or a red, green, and blue (RGB) sensor (an illuminance sensor) 1490, but is not limited thereto.

The communicator 1500 may include one or more components that allow the electronic device 1000 to communicate with a server (not shown) or an external device (not shown). For example, the communicator 1500 may include a short-range wireless communicator 1510, a mobile communicator 1520, and a broadcast receiver 1530.

The communicator 1500 may transmit information about the speech input 100 received by the electronic device 1000 to a cloud (not shown) that processes an operation with respect to the selected application according to an embodiment of the disclosure. The cloud (not shown) may receive information about the speech input 100, and, according to an embodiment of the disclosure, perform an operation corresponding to the speech input 100 and transmit a result of performing the operation to the electronic device 1000. The electronic device 1000 may output a response based on information received from the cloud (not shown) through the selected application according to an embodiment of the disclosure.

The communicator 1500 may transmit a signal for controlling an external device (not shown) according to the result of performing the operation corresponding to the speech input 100 by the electronic device 1000. For example, when the speech input 100 includes a command to control the external device (not shown), the electronic device 1000 may generate a control signal for controlling the external device (not shown) by using the selected application according to an embodiment of the disclosure and transmit the generated control signal to the external device (not shown). The electronic device 1000 may output a result of controlling the external device (not shown) in response to the speech input 100 through the selected application according to an embodiment of the disclosure.

The short-range wireless communicator 1510 may include a Bluetooth communicator, a Bluetooth low energy (BLE) communicator, a near field communicator, a wireless local area network (WLAN) communicator, a WLAN (Wi-Fi) communicator, a Zigbee communicator, an infrared data association (IrDA) communicator, a Wi-Fi direct (WFD) communicator, an ultra wideband (UWB) communicator, an Ant+ communicator, etc., but is not limited thereto.

The mobile communicator 1520 may transmit and receive a radio signal to and from at least one of a base station, an external terminal, or a server on a mobile communication network. The radio signal may include various types of data according to a speech call signal, a video call signal, or a text/multimedia message transmission/reception.

The broadcast receiver 1530 may receive a broadcast signal and/or broadcast-related information from outside through a broadcast channel. The broadcast channel may include a satellite channel and a terrestrial channel. The electronic device 1000 may not include the broadcast receiver 1530 according to an implementation example.

The A/V inputter 1600 is for inputting an audio signal or a video signal, and may include a camera 1610, a microphone 1620, and the like. The camera 1610 may obtain an image frame such as a still image or a moving image through an image sensor in a video communication mode or a photographing mode. An image captured through the image sensor may be processed through the processor 1300 or a separate image processor (not shown). The microphone 1620 may receive an external sound signal and process the received signal as electrical speech data.

The A/V inputter 1600 may perform a function of receiving the speech input 100 of the user.

The memory 1700 may store program for processing and controlling the processor 1300 and may store data input to or output from the electronic device 1000.

The memory 1700 may store one or more instructions and the at least one processor 1300 of the electronic device 1000 described above may perform an operation according to an embodiment of the disclosure by executing the one or more instructions stored in the memory 1700.

The memory 1700 according to an embodiment of the disclosure may store information necessary for selecting an application by which the speech input 100 is to be processed. For example, the memory 1700 may store previously learned information as the information necessary for selecting the application by which the speech input 100 is to be processed.

The memory 1700 may include at least one type storage medium of a flash memory type, a hard disk type, a multimedia card micro type, a card type memory (e.g., secure digital (SD) or extreme digital (xD) memory), random access memory (RAM), static RAM (SRAM), read only memory (ROM), electrically erasable programmable ROM (EEPROM), programmable ROM (PROM), a magnetic memory, a magnetic disk, or an optical disk.

The programs stored in the memory 1700 may be classified into a plurality of modules according to their functions, and may include, for example, a user interface (UI) module 1710, a touch screen module 1720, a notification module 1730, and the like.

The UI module 1710 may provide a specialized UI, a graphical user interface (GUI), and the like that interact with the electronic device 1000 for each application. The touch screen module 1720 may sense a touch gesture on the user on the touch screen and may transmit information about the touch gesture to the processor 1300. The touch screen module 1720 according to some embodiments of the disclosure may recognize and analyze a touch code. The touch screen module 1720 may be configured as separate hardware including a controller.

Various sensors may be arranged inside or near the touch screen for sensing the touch on the touch screen or a close touch. A tactile sensor is an example of a sensor for sensing the touch on the touch screen. The tactile sensor refers to a sensor for sensing the touch of a specific object at a level of human feeling or at a higher level than that. The tactile sensor may sense a variety of information such as roughness of a contact surface, hardness of a contact material, and temperature of a contact point.

Touch gestures of the user may include a tap, a touch and hold, a double tap, a drag, a fanning, a flick, a drag and drop, a swipe, etc.

The notification module 1730 may generate a signal for notifying occurrence of an event of the electronic device 1000.

Figure 4:
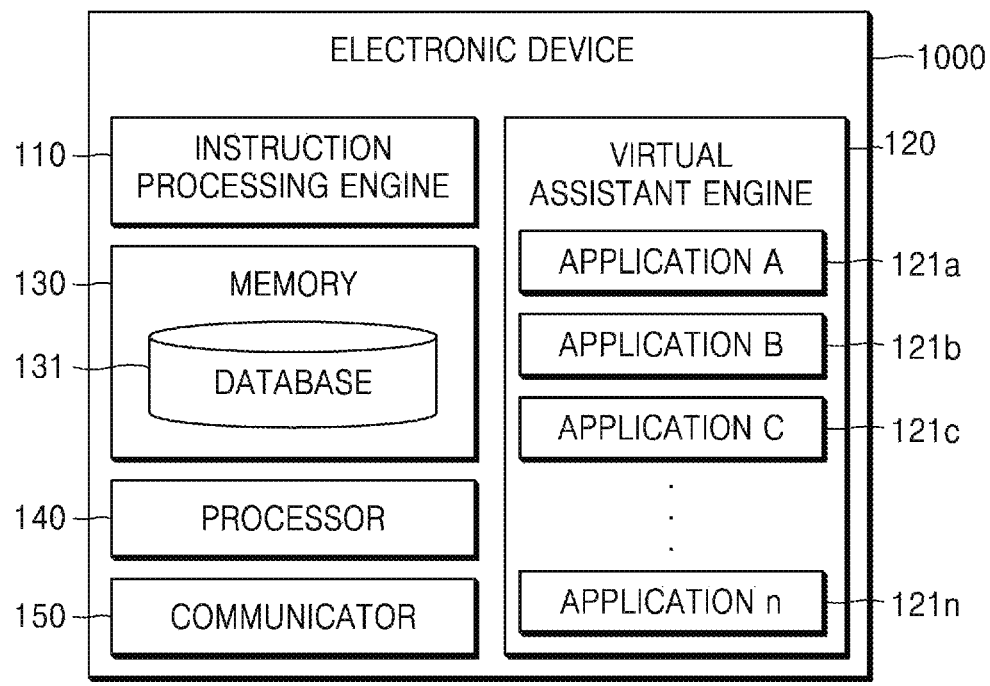
FIG. 4 is a diagram for explaining an internal configuration of an electronic device according to an embodiment of the disclosure.

FIG. 4 is a diagram for explaining an internal configuration of an electronic device according to an embodiment of the disclosure.

Referring to FIG. 4, the electronic device 1000 may include an instruction processing engine 110, a memory 130, a processor 140, a communicator 150, and a virtual assistant engine 120 as configurations for performing an operation corresponding to the speech input 100. The memory 130, the processor 140 and the communicator 150 may correspond to the memory 1700, the processor 1300, and the communicator 1500 shown in FIG. 3, respectively.

The example shown in FIG. 4 is merely an embodiment of the disclosure, and the electronic device 1000 may be implemented with more or fewer components than the components shown in FIG. 4.

The instruction processing engine 110 may obtain the speech input 100 received by the electronic device 1000 and may select at least one application to process the speech input 100. The speech input 100 may include an input requesting an emergency service (e.g., an emergency call and a rescue phone), external device (e.g., a home appliance, an office device, a factory device, etc.) control, a navigation service, information (e.g., weather, news, time, person, device, event (e.g., game score/status, party/meeting, and appointment)) service, etc. The instruction processing engine 110 may process a plurality of speech inputs 100 received from a plurality of users for a predetermined time. The instruction processing engine 110 according to an embodiment of the disclosure may store the received speech input 100 in the memory 130.

The instruction processing engine 110 may select at least one application to process the speech input 100 from among a plurality of applications 121*a* to 121*n* capable of processing the speech input 100 in the electronic device 1000.

In an embodiment of the disclosure, the instruction processing engine 110 may detect an event related to an application A 121*a*. The application A 121*a* may be, for example, an application previously set as an application for processing the speech input 100. For example, the application A 121*a* may be previously set as the application for processing the speech input 100, as the speech input 100 includes information indicating the application A 121*a*.

According to an embodiment of the disclosure, the instruction processing engine 110 may detect at least one of a plurality of applications capable of processing the speech input 100, as the instruction processing engine 110 detects the event related to an application A 121*a*. When the instruction processing engine 110 does not detect the above described event before the speech input 100 is not processed by the application A 121*a*, without an operation of selecting an application according to an embodiment of the disclosure, the speech input 100 may be processed by the application A 121*a* and a result thereof may be output in response to the speech input 100.

The event related to the application A 121*a* described above may include a state in which it is inappropriate to process the speech input 100 through the application A 121*a*. For example, the event may include a state in which the application A 121*a* is difficult to use data for processing the speech input 100, a state in which the application A 121*a* is incapable of providing a response to the speech input 100.

A case where the application A 121*a* is difficult to use the data for processing the speech input 100 may include, for example, a state in which connection between a backhaul device and a cloud is not smooth, a state in which connection between the application A 121*a* and the backhaul device, a state in which a network quality used to process the speech input 100 deteriorates, and the like. The backhaul device may refer to an intermediate device to which the electronic device 1000 connects to connect to an external network. The cloud may be a server device to which the application A 121*a* connects to process the speech input 100. For example, the application A 121*a* may transmit the information about the speech input 100 to the cloud, and receive a result of processing the speech input 100 from the cloud. The application A 121*a* may provide the response to the speech input 100 based on the information received from the cloud.

A state in which the application A 121*a* according to an embodiment of the disclosure may not provide the response to the speech input 100 may include, for example, a state in which the application A 121*a* may not provide the response because the application A 121*a* may not perform an operation corresponding to the speech input 100 due to the function limitation of the application A 121*a*.

According to an embodiment of the disclosure, the instruction processing engine 110 may periodically acquire various types of information, which may be used to process the speech input 100, and store the information in the memory 130. For example, the information may include identification information and an IP (Internet Protocol) address of an external device connected to the electronic device 1000 to exchange data, information about the application that may be used to process the speech input 100 in the external device, information about a function (e.g., music reproduction, light control, text display, etc.) that may be used to process the speech input 100 in the external device, information about the network quality of the external device, information about the application that may be used to process the speech input 100 in the electronic device 1000, information about the function of the application that may be used to process the speech input 100 in the electronic device 1000, an IP address of the electronic device 1000, information about the network quality that may be used to process the speech input 100 in the electronic device 1000, and the like. The information may include various kinds of information that may be used to process the speech input 100.

The external device may include various types of devices that may be controlled according to the speech input 100, and may include, for example, a Bluetooth speaker, a Wi-Fi display, various types of home appliances, and the like.

According to an embodiment of the disclosure, the instruction processing engine 110 may extract metadata from text corresponding to the speech input 100. For example, the instruction processing engine 110 may extract metadata from the text corresponding to the speech input 100 when the event related to the application A 121*a* is detected. For example, "light" may be obtained as the metadata for the speech input 100 of "Turn on the light." Also, "driving" may be obtained as the metadata for the speech input 100 of "Show me the direction to drive to Chennai."

In an embodiment of the disclosure, the metadata may include information about a time at which the speech input 100 was started and a time at which it was terminated, a time period over which the speech input 100 was performed, etc. The metadata may also include information about a sound characteristic of a speech signal of the speech input 100, such as a male speech, a female speech, a child speech, noise, and the like. Also, the metadata may include information about an owner of the electronic device 1000.

The metadata may also include information about an intention of the user with respect to the speech input 100. The information about the intention of the user may include, for example, setting information search with respect to the electronic device 1000, external device control, search for multiple users, a predetermined operation request for the electronic device 1000, an emergency service request, etc.

According to an embodiment of the disclosure, the instruction processing engine 110 may select an application B 121*b* for outputting the response to the speech input 100 from among the plurality of applications, based on metadata including various types of information.

Also, the instruction processing engine 110 may select the application B 121*b* suitable for processing the speech input 100 from among the plurality of applications by using preference information for each application based on the meta data. The preference information may include information about the application suitable for processing the speech input 100, for example, according to the characteristic of the speech input 100 distinguished by the metadata. The electronic device 1000 may use the preference information to select an application that is most suitable for processing the speech input 100.

The preference information for each application may be learned based on a variety of information related to processing of the speech input 100 of each application. For example, the preference information may be learned based on at least one of feedback information of the user about the response output by each application, information about a result of processing the speech input 100 by each application, information about a time taken for each application to output the response, information about an operation that may be performed by each application, or information about capability of each application. The preference information may be learned based on various kinds of information that may be used to select the application suitable for processing the speech input 100 according to the metadata of the speech input 100.

The preference information for each application may be stored in the database 131 of the memory 130.

The feedback of the user may be determined based on evaluation information input by the user when the response corresponding to the speech input 100 is provided according to an embodiment of the disclosure. For example, the feedback of the user may be positive feedback, negative feedback, and the like.

The result of processing the speech input 100 by each application may be determined based on content of the response to the speech input 100 and may include, for example, a detailed result, a brief result, an accurate result, an inaccurate result, a semi-accurate result, etc.

The operation that may be performed by each application according to the speech input 100 may include, for example, navigating the user, controlling an external device (e.g., a home appliance), providing information, etc.

Information about the time taken to process the speech input 100 by each application may include a time taken to complete the operation corresponding to the speech input 100 or output the response after the operation is performed and may include, for example, 10 seconds, 1 minute, etc.

The information about the capability of each application may include, for example, a type (e.g., On-Device based, Hub based, Cloud based) of each application, latency and throughput with respect to processing of the speech input 100, a success rate and accuracy with respect to processing of the speech input 100, a maximum utterance duration supported by each application, a function (e.g., IoT function, home automation function, emergency service provision function) supported by each application, a communication bearer used by each application (e.g., Wi-Fi, cellular radio, Bluetooth, etc.) used by each application, an application protocol (e.g., hypertext transfer protocol (HTTP), remote procedure calls (gRPC)) used by each application, security for the speech input 100 processed by each application, and the like. The information about the capability of each application may include, but not limited to the above described example, a variety of information indicating the processing capability of each application.

In an embodiment of the disclosure, the instruction processing engine 110 may evaluate processing capability of each application executed for each speech input received by the electronic device 1000, thereby obtaining information about the capability of the application above-described. The instruction processing engine 110 may update the preference information with respect to each application based on the evaluation result.

The instruction processing engine 110 may select the speech input 100 to be preferentially processed when the plurality of speech inputs 100 are received for a predetermined time period and firstly output the selected speech input 100 such that a response to the selected speech input 10 may be output quickly. For example, the instruction processing engine 110 may preferentially process the speech input 100 by the owner of the electronic device 1000, the speech input 100 by a woman, the speech input 100 requesting an emergency service, etc., that are determined based on the metadata of each speech input 100 as compared with other speech input.

The instruction processing engine 110 may process the speech input 100 using the plurality of applications in a round robin fashion. The round robin fashion is a fashion in which several processes are executed little by little in turn, and processing by the speech input 100 according to the round robin fashion may be performed by the plurality of applications. For example, the instruction processing engine 110 may process the speech input 100 in the round robin fashion using the plurality of applications selected based on the metadata of the speech input 100.

According to an embodiment of the disclosure, the application selected based on the metadata may transmit the speech input 100 to be processed to the cloud corresponding to the selected application. Each application may be connected to the cloud for processing the speech input 100 input into each application.

The selected application may receive at least one type response of an automatic speech recognition (ASR) response, a natural language understanding (NLU) response, or a text to speech (TTS) response from the cloud as providing the speech input 100 to the cloud. The electronic device 1000 may perform an operation based on various types of responses received from the cloud and output the response corresponding to the speech input 100 based on a result of performing the operation.

The ASR response may include text obtained as a result of speech recognition performed on the speech input 100 in the cloud. The electronic device 1000 may obtain the text obtained as a result of speech recognition performed on the speech input 100 from the cloud, perform the operation based on the text, and provide the result to the user as the response to the speech input 100. For example, when the speech input 100 is "Turn on the light," the electronic device 1000 may receive the text "Turn on the light" from the cloud and, based on the text, control an electric lamp around the user based on the text, and output a result of controlling the electric lamp.

The NLU response may include information about a result of NLU performed on the speech input 100 in the cloud. The electronic device 1000 may obtain information indicating the meaning of the speech input 100 as a result of NLU performed on the speech input 100 from the cloud, performs an operation based on the obtained information, and provide the result to the user as the response to the speech input (100).

The TTS response may include information that the text to be output in response to the speech input 100 in the cloud is converted into a speech signal according to the TTS technology. The electronic device 1000 may provide the TTS response to the user as the response to the speech input 100 upon receiving the TTS response in response to the speech input 100 from the cloud. For example, when the speech input 100 is "what is today's headline?," the electronic device 1000 may receive information about the speech signal that text indicating today news information is TTS-converted from the cloud in response to the speech input 100. The electronic device 1000 may output the response to the speech input 100 based on the received information.

The electronic device 1000 may receive various types of information about the result of processing the speech input 100 from the cloud corresponding to the selected application, and based on the received information, output the response to the speech input 100.

According to an embodiment of the disclosure, the instruction processing engine 110 may select a plurality of applications based on the metadata. Accordingly, the command processing engine 110 may receive a plurality of responses from the selected plurality of applications. The instruction processing engine 110 may determine priorities with respect to the plurality of responses, and based on the determined priorities, output at least one response.

The priority may be determined based on whether each response is an appropriate response corresponding to the intention of the user. For example, the priority of the response may be determined based on data previously learned based on responses corresponding to the various speech inputs 100. The instruction processing engine 110 may output responses in the descending order of priority.

According to an embodiment of the disclosure, the instruction processing engine 110 may perform an operation corresponding to the speech input 100 through an application framework for controlling applications installed in the electronic device 1000. Also, the instruction processing engine 110 may generate a textual response as the response corresponding to the speech input 100, based on the result of performing the operation. The instruction processing engine 110 may convert the generated text into a speech signal using the TTS technology, and output the speech signal through at least one speaker.

According to an embodiment of the disclosure, the instruction processing engine 110 may delete data stored in association with the speech input 100 from the memory 130 when the operation according to the response corresponding to the speech input 100 is successfully performed. For example, a case where the operation according to the response is successfully performed may include a case where an operation of outputting the response corresponding to the speech input 100 as a speech message or a text message, an operation of completing the operation according to the response corresponding to the speech input 100, and the like are successfully performed.

The memory 130 may store a database 131 including the preference information and information necessary for performing an operation for processing the speech input 100 according to an embodiment of the disclosure.

The processor 140 may be configured to perform various operations, including the operation for processing the speech input 100 according to an embodiment of the disclosure.

The communicator 150 may be configured to allow the electronic device 1000 to communicate with the external device or the cloud through a wired/wireless connection.

The virtual assistant engine 120 may include a plurality of applications for processing the speech input 100 received by the electronic device 1000 and outputting the response, such as the application A 121a, the application B 121b, an application C 121c, an application n 121n, etc.

Figure 5:
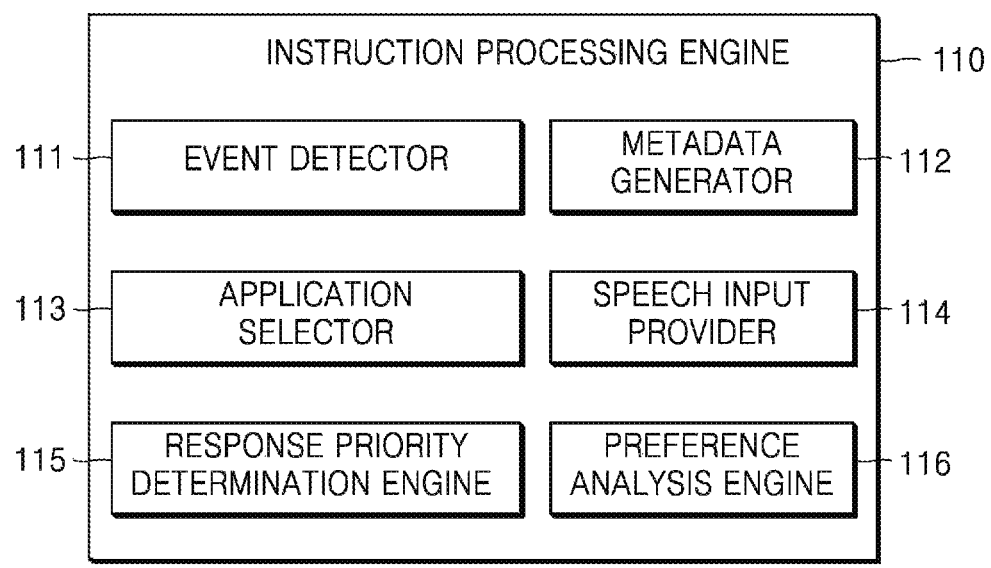
FIG. 5 is a block diagram including an internal configuration of an instruction processing engine according to an embodiment of the disclosure.

FIG. 5 is a block diagram including an internal configuration of an instruction processing engine according to an embodiment of the disclosure.

Referring to FIG. 5, the instruction processing engine 110 may include an event detector 111, a metadata generator 112, an application selector 113, a speech input provider 114, a response priority determination engine 115 and a preference analysis engine 116.

The example shown in FIG. 5 is merely an embodiment of the disclosure, and the electronic device 1000 may be implemented with more or fewer components than the components shown in FIG. 4.

The event detector 111 may receive the speech input 100 from the user and detect an event related to a first application. The first application may be a predetermined application, for example, an application that outputs a response to the speech input 100. However, when an event including a state in which the first application may not output the response to the speech input 100 is detected, an operation of selecting an application by which the speech input 100 is to be processed may be performed.

The metadata generator 112 may generate metadata based on the speech input 100 according to the event detected by the event detector 111. The metadata may be generated based on text obtained by performing speech recognition on the speech input 100.

The application selector 113 may select at least one of a plurality of applications available in the electronic device 1000 based on the metadata and preference information.

The speech input provider 114 may transmit the speech input 100 to the at least one application selected by the application selector 113. For example, the speech input provider 114 may preferentially transmit the speech input 100 to an application capable of processing the speech input 100 among the plurality of applications selected according to an embodiment of the disclosure. In addition, the speech input provider 114 may transmit the speech input 100 to an application which is in a state in which the speech input 100 may be processed after an operation by another speech query is terminated among the plurality of applications selected according to an embodiment of the disclosure.

The speech input provider 114 according to an embodiment of the disclosure may preferentially transmit the speech input 100 having a short speech signal, the speech input 100 by an owner of the electronic device 1000, the speech input 100 by female, the speech input 100 requesting an emergency service, and the like to the application selected by an embodiment of the disclosure when a plurality of speech inputs 100 are present.

The speech input provider 114 may transmit the speech input 100 to the plurality of applications such that the speech input 100 may be processed by the plurality of applications selected according to an embodiment of the disclosure in a round robin fashion. The plurality of applications receiving the speech input 100 may transmit the response to the speech input 100 to the instruction processing engine 110.

The response priority determination engine 115 may determine a priority of at least one response received from the at least one application. The response may be output from the electronic device 1000 according to the priority determined by the response priority determination engine 115. For example, responses may be output sequentially in order of priority, or only responses within a predetermined priority range may be output.

According to an embodiment of the disclosure, when priorities determined for some of the responses are the same, the responses having the same priority may be sequentially output in the order in which the responses are received from the applications in the electronic device 1000.

The preference analysis engine 116 may learn preference information for each application based on a variety of information related to processing of the speech input 100 of each application. For example, the preference information may include information about an application suitable for processing the speech input 100, according to characteristics of the speech input 100 that are distinguished by the metadata. According to an embodiment of the disclosure, the preference information learned by the preference analysis engine 116 may be used to select an application for outputting the response corresponding to the speech input 100.

Figure 6:
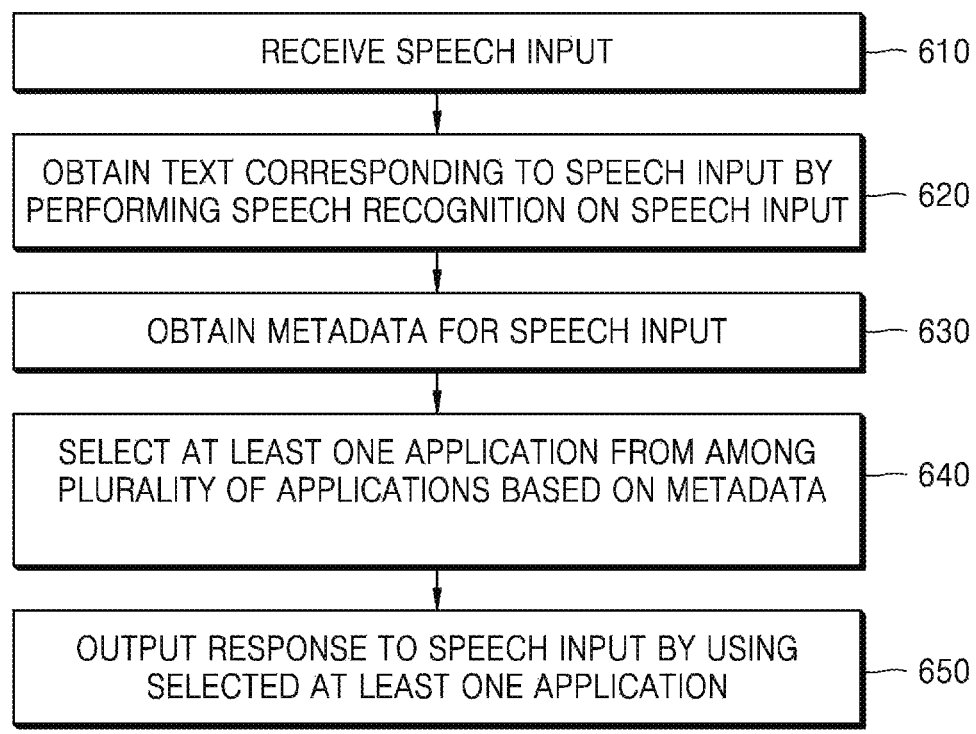
FIG. 6 is a flowchart illustrating a method, performed by an electronic device, of outputting a response to a speech input by using an application according to an embodiment of the disclosure.

FIG. 6 is a flowchart illustrating a method, performed by the electronic device 1000, of outputting a response to a speech input by using an application according to an embodiment of the disclosure.

Referring to FIG. 6, at operation 610, the electronic device 1000 may receive the speech input. The speech input may include, for example, a speech command for requesting an operation intended by a user.

At operation 620, the electronic device 1000 may perform speech recognition on the speech input received at operation 610 to obtain text corresponding to the speech input. For example, when the speech input includes a speech signal "Turn on the light" which is uttered by the user, "Turn on the light" may be obtained as the text corresponding to the speech input.

At operation 630, the electronic device 1000 may obtain metadata for the speech input based on the text obtained in operation 620. For example, the metadata may include a variety of information that may be obtained based on the text, such as a keyword extracted from the text, an intention of the user determined from the text, and the like. The metadata may further include, but not limited to the above described example, a variety of information related to the speech input as well as information obtained based on the text corresponding to the speech input.

At operation 640, the electronic device 1000 may select at least one application from a plurality of applications available in the electronic device 1000, based on the metadata obtained at operation 630. The plurality of applications available in the electronic device 1000 may include an application that may be used to output the response to the speech input.

According to an embodiment of the disclosure, the electronic device 1000 may further use preference information for each application in addition to the metadata to select the application to be used to output the response to the speech input. The preference information may include information about an application suitable for processing the speech input, for example, according to characteristics of the speech input distinguished by the metadata.

At operation 650, the electronic device 1000 may output the response to the speech input by using the selected application. For example, the electronic device 1000 may transmit the speech input to the selected application, and perform an operation corresponding to the speech input through the application. In addition, a response indicating a result of performing the operation may be output by the electronic device 1000.

According to an embodiment of the disclosure, based on a result of outputting the response to the speech input, the preference information that may be used to select the application may be updated according to an embodiment of the disclosure.

Figure 7:
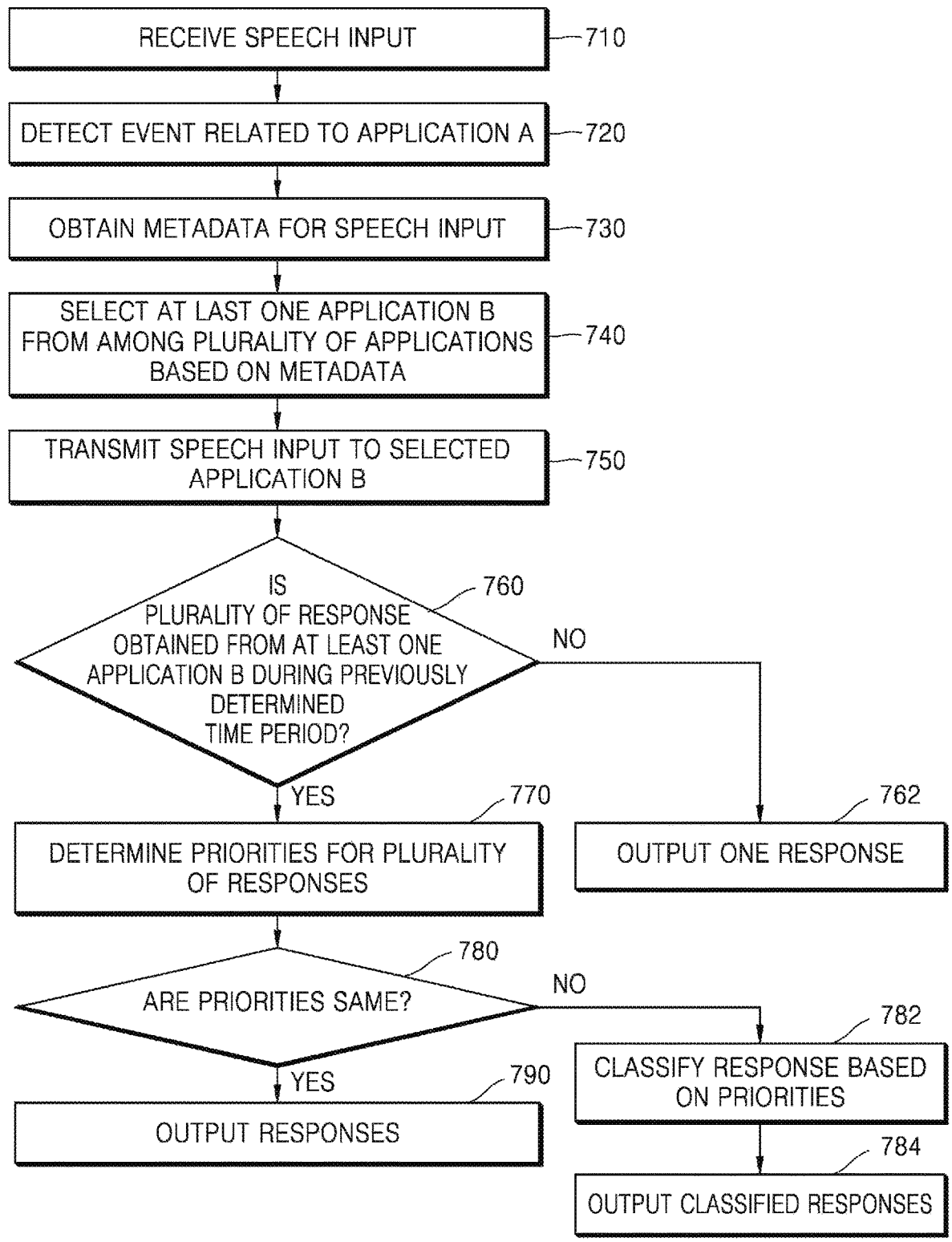
FIG. 7 is a flowchart illustrating a method, performed by an electronic device, of outputting a response to a speech input by using an application according to an embodiment of the disclosure.

FIG. 7 is a flowchart illustrating a method, performed by an electronic device, of outputting a response to a speech input by using an application according to an embodiment of the disclosure.

Referring to FIG. 7, at operation 710, the electronic device 1000 may receive the speech input. For example, the electronic device 1000 may receive at least one speech input from at least one user.

At operation 720, the electronic device 1000 may detect an event related to an application A 121a. The event related to the application A 121a may include, for example, a state in which the response to the speech input may not be output through application A 121a previously determined as an application outputting the response to the speech input. Accordingly, the electronic device 1000 may perform an operation for selecting an application to process the speech input, according to detection of an event.

At operation 730, the electronic device 1000 may obtain metadata for the speech input. The metadata for the speech input may include various kinds of information that may be obtained based on the text obtained by performing speech recognition on the speech input. For example, the metadata may include information that may be obtained based on the text, such as a keyword extracted from the text corresponding to the speech input, an intention of the user, etc.

At operation 740, the electronic device 1000 may select at least one application B 121b to process the speech input from among a plurality of applications, based on the metadata. The electronic device 1000 according to an embodiment of the disclosure may select the at least one application B 121b suitable for processing the speech input according to the metadata, based on previously learned data. Also, the electronic device 1000 may select the at least one application B 121b by further using preference information for each application in addition to the metadata. The above-described preference information may include information previously learned about the application suitable for processing the speech input 100, according to characteristics of the speech input 100 distinguished by the metadata.

At operation 750, the electronic device 1000 may transmit the speech input to the application B 121b selected at operation 740. The application B 121b may perform an operation corresponding to the speech input and obtain a response based on a result of performing the operation.

At operation 760, the electronic device 1000 may determine whether a plurality of responses are obtained from the at least one application B 121b for a previously designated time period, after transmitting the speech input to the at least one application B 121b. For example, when a plurality of applications B 121b are selected in operation 740, the plurality of responses may be obtained.

At operation 750, when the previously designated time period elapses after transmitting the speech input to the at least one application B 121b, the electronic device 1000 may determine that it is temporally too late to provide the response received from the application B 121b to the user and may not output the response to the speech input.

When obtaining only one response from the at least one application B 121b for the previously designated time period, the electronic device 1000 may output the obtained one response as the response to the speech input at operation 762.

On the other hand, when obtaining a plurality of responses from the at least one application B 121b for the previously designated time period, then in operation 770, the electronic device 1000 may determine priority of each response. For example, the priority may be determined based on the previously learned data for determining whether each response is an appropriate response corresponding to an intention of the user.

At operation 780, the electronic device 1000 may determine whether the priorities determined at operation 770 are the same.

The electronic device 1000 may output the plurality of responses at operation 790 without considering the priorities when the priorities for the respective response are all the same. For example, the electronic device 1000 may output the plurality of responses according to the order in which the responses are received first from the respective applications B 121b, without consideration of priority.

On the other hand, when the priorities for the respective response are different, the electronic device 1000 may classify the responses based on the priorities in operation 782 and output the classified responses in operation 784. For example, the electronic device 1000 may output the plurality of responses sequentially according to the priorities, or output a predetermined number of responses in the order of highest priority. When there are three predetermined number of responses, only two responses having the highest priority may be output sequentially.

In addition, when there are some responses having the same priority, the electronic device 1000 may prioritize the responses received first from the respective applications B 121b to determine priorities again.

When obtaining the plurality of responses to the speech input, the electronic device 100 may, but not limited to the above-described example, output the plurality of responses by using various methods.

Figure 8:
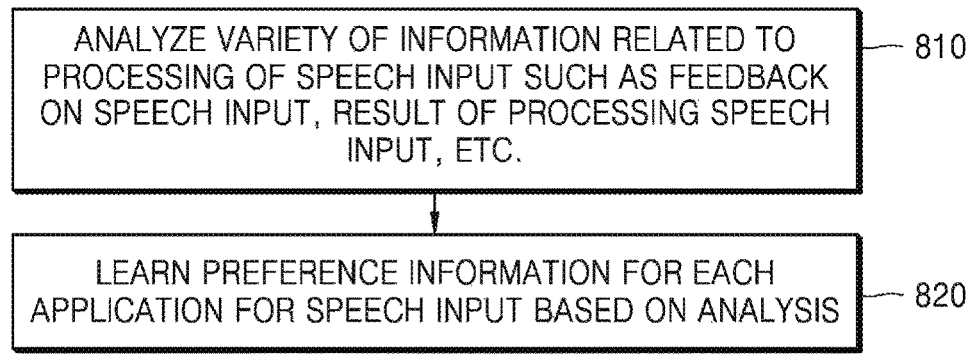
FIG. 8 is a flowchart illustrating a method of learning preference information according to an embodiment of the disclosure.

FIG. 8 is a flowchart illustrating a method of learning preference information according to an embodiment of the disclosure.

Referring to FIG. 8, at operation 810, the electronic device 1000 may analyze a variety of information related to processing of a speech input of each application as information for learning the preference information.

Learning of the preference information according to an embodiment of the disclosure may be performed after a response to the speech input is output according to an embodiment of the disclosure based on an application used for outputting the response and various kinds of information used for outputting the response.

For example, at operation 810, the electronic device 1000 may analyze information about a feedback of a user on the response of the speech input by each application, a result of processing the speech input by each application, a time taken to process the speech input by each application, a type of an operation that may be performed by each application according to the speech input, capability of each application, etc., and learn the preference information based on a result of analysis.

Various types of information for learning the preference information, but not limited to the above described example, may be analyzed at operation 810.

At operation 820, the electronic device 1000 may learn the preference information for each application based on the information analyzed in operation 810.

Figure 9:
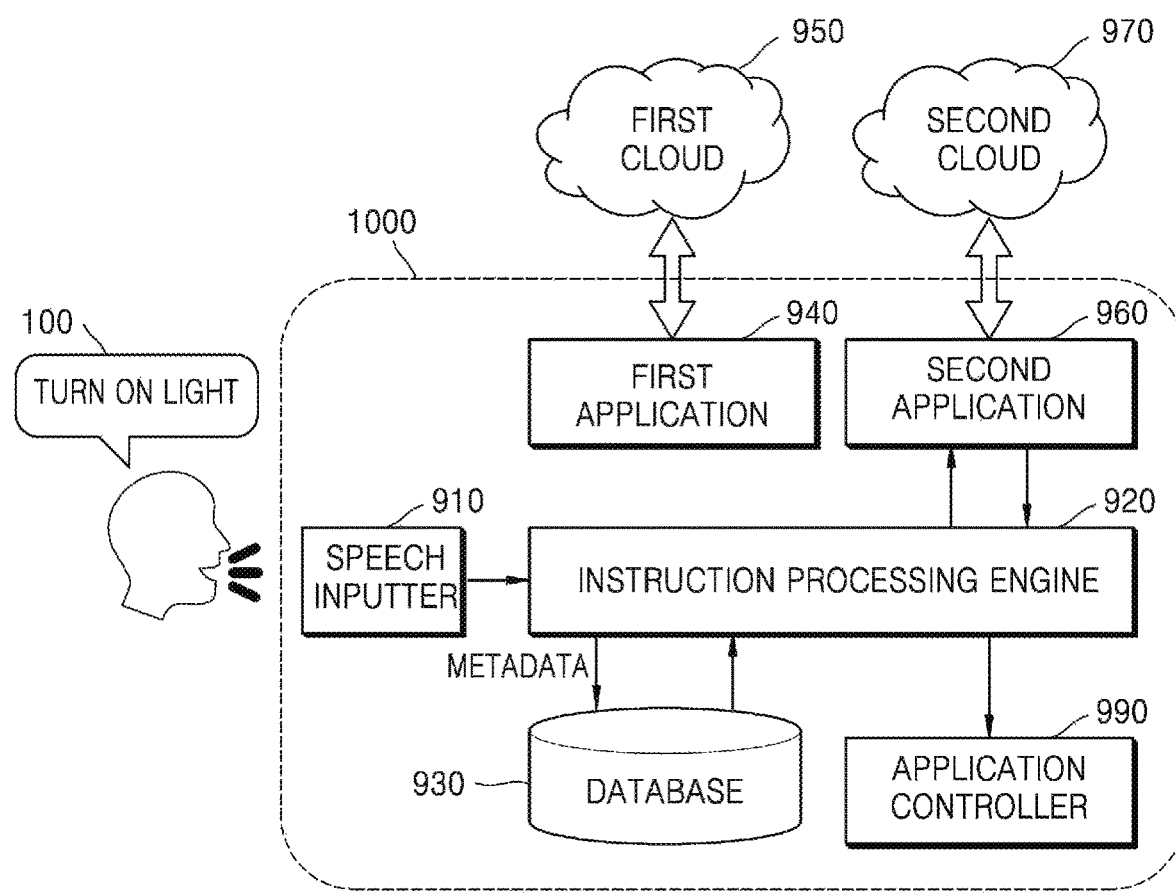
FIG. 9 is a diagram for explaining an example in which a response to a speech input is output according to an embodiment of the disclosure.

FIG. 9 is a diagram for explaining an example in which a response to speech input is output according to an embodiment of the disclosure.

Referring to FIG. 9, the electronic device 1000 may be a configuration to output the response to the speech input 100 and may include a speech inputter 910, an instruction processing engine 920, a database 930, a first application 940, a second application 960, and an application controller 990. However, not all of components shown in FIG. 9 are indispensable components of the electronic device 1000. The electronic device 1000 may be implemented by more components than the components shown in FIG. 9, and the electronic device 1000 may be implemented by fewer components than the components shown in FIG. 9.

Referring to FIG. 9, the speech input 100 "Turn on the light" may be received through the speech inputter 910. The speech inputter 910 may transmit the speech input 100 to the instruction processing engine 920.

The instruction processing engine 920 may extract metadata from the speech input 100. The instruction processing engine 920 may perform speech recognition on the speech input 100 to obtain text corresponding to the speech input 100 and obtain metadata based on the text.

For example, with respect to the speech input 100 "Turn on the light," "light" may be obtained as the metadata. Also, the instruction processing engine 920 may determine that an intention of a user is "external device control" by analyzing the text corresponding to the speech input 100, and obtain the "external device control" as the metadata.

The database 930 may include preference information, which is information about an application suitable for processing the speech input 100 according to characteristics of the speech input 100 that may be identified as the metadata. The instruction processing engine 920 may obtain the corresponding preference information from the database 930 based on the metadata and may select at least one application suitable for processing the speech input 100 based on the preference information.

According to an embodiment of the disclosure, the preference information may be learned based on at least one of a feedback of the user on responses output by a plurality of applications available in the electronic device 1000, information about the speech output successful for outputting the responses by the plurality of applications, a time taken for the plurality of applications to output the responses, or information about operations that may be performed by the plurality of applications. The preference information may be learned based on various kinds of information for selecting at least one application suitable for processing the speech input 100 according to metadata of the speech input 100.

The instruction processing engine 920 may identify the first application 940 and the second application 960 that may be used for processing the speech input 100 by the electronic device 1000. The first application 940 may be connected to a first cloud 950 to process the speech input 100 through the first cloud 950 and provide the response corresponding to the speech input 100. The second application 960 may also be connected to a second cloud 970 to process the speech input 100 through the second cloud 970 and provide the response corresponding to the speech input 100.

The instruction processing engine 920 may select the second application 960 as the application suitable for the speech input 100 from among the first application 940 and the second application 960 that may be used for processing the speech input 100 by the electronic device 1000. The instruction processing engine 920 may transmit the speech input 100 to the selected second application 960.

The second application 960 may process the speech input 100 through the second cloud 970 and may perform an operation corresponding to the speech input 100. For example, when the user is located in the living room, the second application 960 may transmit a control operation to turn on "light 1 in the living room" that is the operation corresponding to the speech input 100 to the application controller 990 through instruction processing engine 920 and perform the control operation. The application controller 990 may control another application available in the electronic device 1000 to perform the above-described control operation.

For example, when a third application capable of controlling a light is available in the electronic device 1000, the application controller 990 may receive information about the control operation to turn on "light 1 in the living room" from the second application 960 through instruction processing engine 920. Further, the application controller 990 may perform the control operation to turn on "light 1 in the living room" by controlling the third application by using the received information about the control operation. In addition, the application controller 990 may obtain a result of performing the control operation and transmit the result to the second application 960.

The second application 960 may generate and output a response message to the speech input 100 based on the result of performing the control operation. For example, when the control operation to turn on "light 1 in the living room" is successfully performed, the second application 960 may output "Turned on light 1 in the living room" as the response message to the speech input 100.

In addition, when the control operation to turn on "light 1 in the living room" fails, the second application 960 may output "Unable to turn on light 1 in the living room" as the response message to the speech input 100.

In addition, when the control operation fails as a result of performing the control operation, the second application 960 may perform another control operation corresponding to the speech input 100. For example, the second application 960 may retry to perform a control operation to turn on "lights 2 and 3 located in the living room."

Figure 10:
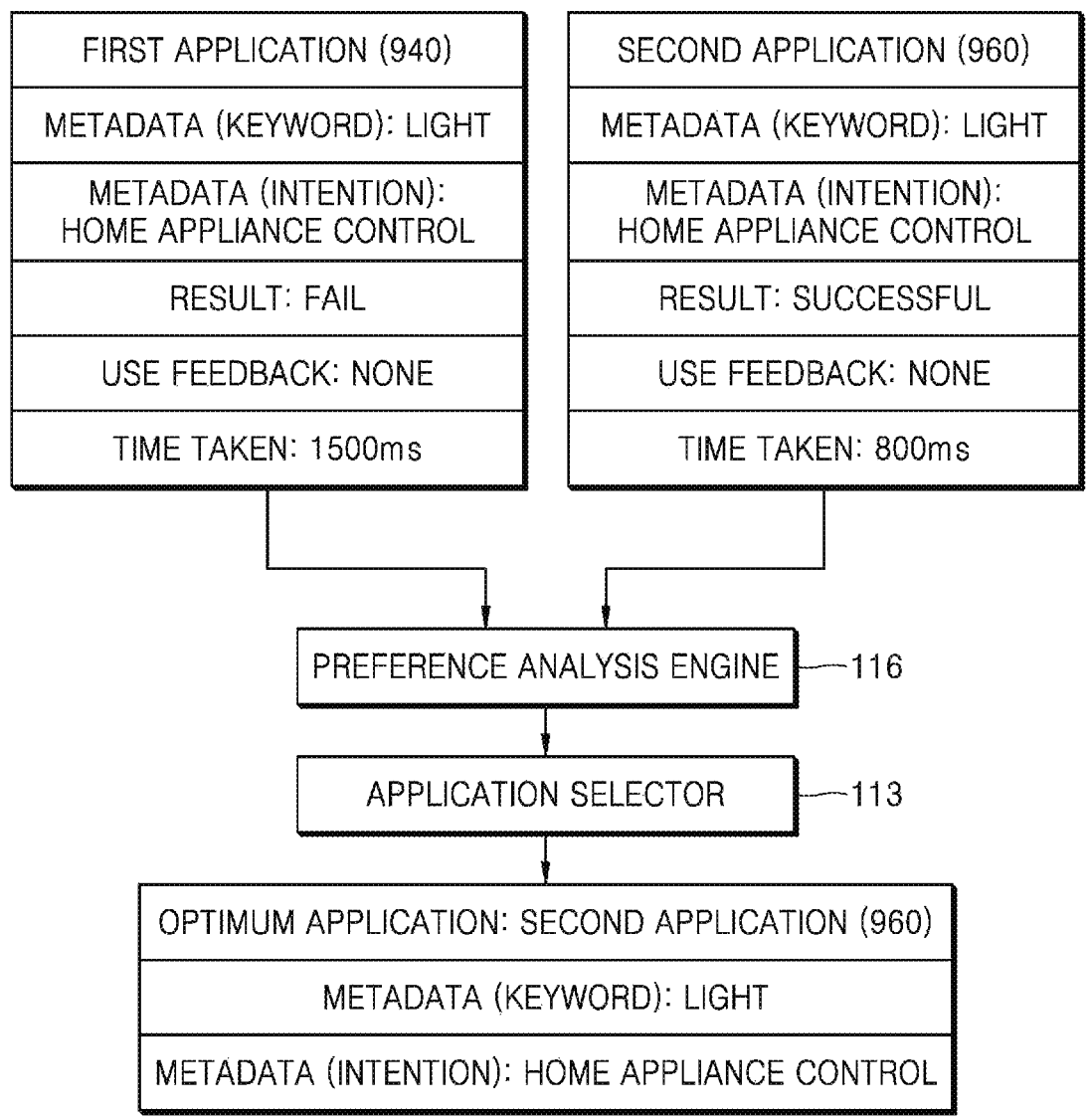
FIG. 10 is a diagram illustrating an example of learning preference information according to an embodiment of the disclosure.

FIG. 10 is a diagram illustrating an example of learning preference information according to an embodiment of the disclosure.

Referring to FIG. 10, the preference information for each application may be learned based on a result of processing the same speech input by the first application 940 and the second application 960.

The first application 940 and the second application 960 may be selected by the electronic device 1000 according to an embodiment of the disclosure based on metadata of the speech input, and the speech input may be processed by the first application 940 and the second application 960.

According to an embodiment of the disclosure, the metadata for the speech input "turn on the light" may include "light" as keyword information and "home appliance control" as information about an intention of a user.

The first application 940 fails to process the speech input and a time taken for the speech input to be received from the electronic device 1000 to output a response indicating a failure result may be measured as 1500 ms.

On the other hand, the second application 960 succeeded in processing the speech input, and a time taken for the speech input to be received from the electronic device 1000 to output a response indicating a success result may be measured as 800 ms.

In an embodiment of the disclosure, it is assumed that the user does not give a feedback on the responses output by the first application 940 and the second application 960.

The preference analysis engine 116 may learn the preference information based on at least one of a feedback of a user on the response by each application, information about the speech output successful for outputting the response by each application, a time taken for each application to output the response, or information about an operation that may be performed by each application according to the speech input. The preference analysis engine 116 may analyze and learn, but not limited to the above described example, a variety of information related to an operation of processing the speech input of each application. The preference information according to an embodiment of the disclosure may be learned such that an appropriate application may be selected according to the speech input distinguished by the metadata.

According to an embodiment of the disclosure shown in FIG. 10, the preference analysis engine 116 may learn the preference information for each application based on the information about the speech output successful for outputting the response by each application and the time taken for each application to output the response to the speech input. The preference information learned by the preference analysis engine 116 may be stored in the database 131 or preference information for each application previously stored in the database 131 may be updated based on the learned preference information.

The application selector 113 may then select an application to process another speech input received by the electronic device 1000. The application selector 113 may select the application based on the preference information learned by the preference analysis engine 116.

When metadata for the other speech input includes "light" as the keyword information and "home appliance control" as the information about the intention of the user, the application selector 113 may select the second application 960 as the optimum application for the speech input.

Figure 11:
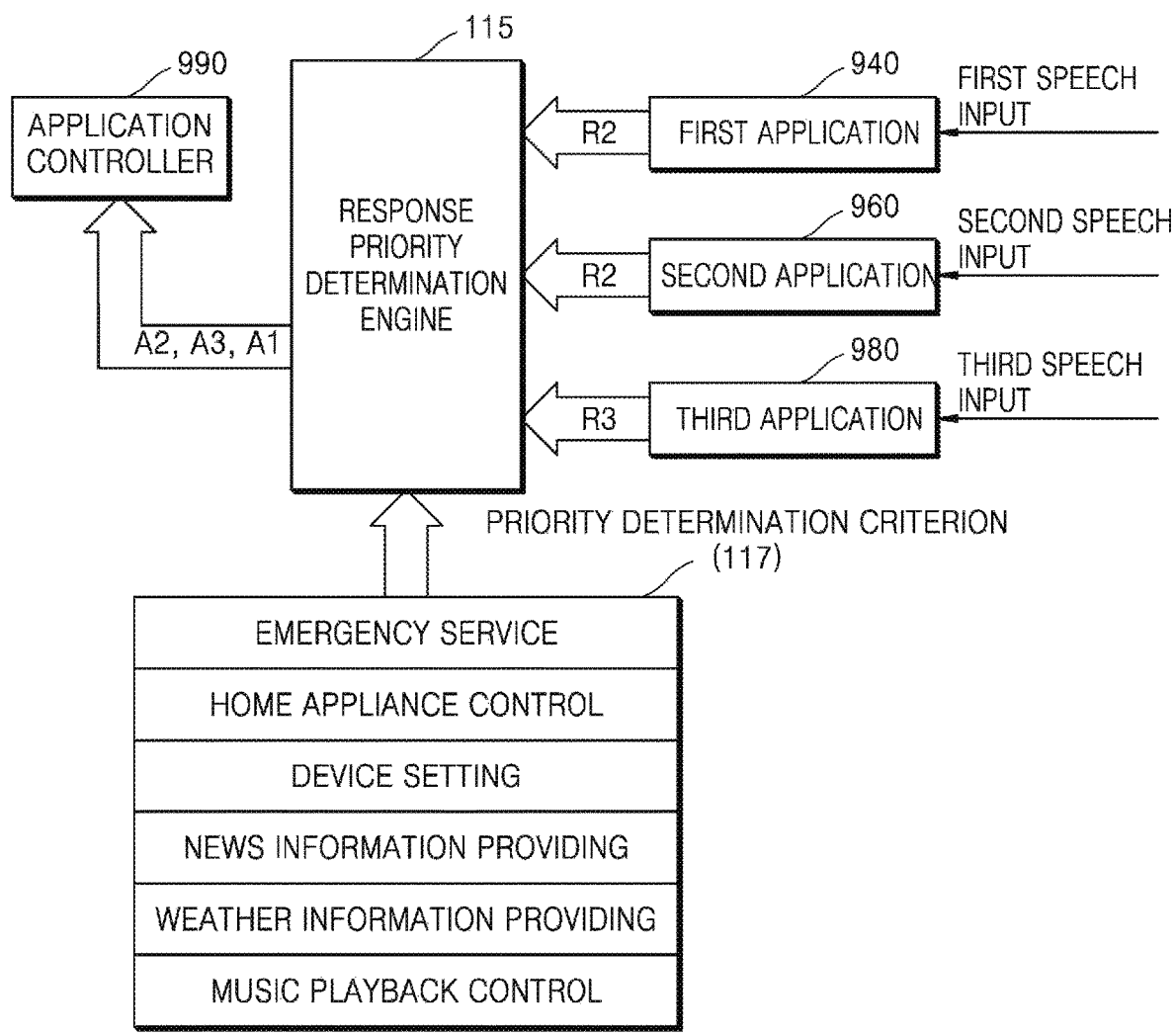
FIG. 11 is a diagram illustrating an example in which an operation corresponding to each response is performed according to priority of each response to each of a plurality of speech inputs according to an embodiment of the disclosure.

FIG. 11 is a diagram illustrating an example in which an operation corresponding to each response is performed according to priority of each response to each of a plurality of speech inputs according to an embodiment of the disclosure.

Referring to FIG. 11, the electronic device 1000 may receive a first speech input, a second speech input, and a third speech input that are the plurality of speech inputs, and select the first application 940, the second application 960 and the third application 980 that are to process the plurality of speech inputs respectively. The electronic device 1000 may receive the plurality of speech inputs for a predetermined time period and process and output a response corresponding to each speech input according to the priority. For example, the electronic device 1000 may select the first application 940, the second application 960 and the third application 980 according to metadata based on text corresponding to each of the plurality of speech inputs.

The first application 940, the second application 960 and the third application 980 may output responses R1, R2 and R3, respectively, as responses to the speech inputs received by the electronic device 1000. The responses R1, R2, and R3 output from the respective applications according to an embodiment of the disclosure may include information for controlling other applications according to operations corresponding to the speech inputs. For example, when the speech input is "Turn on the light," the response to the speech input may include information for controlling the light 1 in the living room through another application.

The response priority determination engine 115 may determine the priority of each of the responses R1, R2, and R3 output from the respective applications based on the information about the priority determination criterion 117. According to an embodiment of the disclosure, the priority may be determined based on at least one of an intention of the user related to the response, a size of the response, whether the response includes characteristics preferred by the user, or information about a time taken for the response to be output by the electronic device 1000 after the response is obtained. The priority, but not limited to the above described example, may be determined according to various criteria.

For example, according to the priority determination criterion 117, with respect to the intention of the user, the response including information about an emergency service may be determined to be the highest priority, and the response including information about music playback control may be determined to be the lowest priority.

According to an embodiment of the disclosure, the response R1 may include control information related to music playback, the response R2 may include control information related to the emergency services, and the response R3 may include control information related to home appliance control. According to the priority determination criterion 117, the response priority determination engine 115 may determine the priority of each response in the order of the response R2 related to the emergency service, the response R3 related to the home appliance control, and the response R1 related to the music playback.

Referring to FIG. 11, actions A1, A2, and A3 represent operations corresponding to the responses R1, R2, and R3, respectively.

According to an embodiment of the disclosure, the response priority determination engine 115 may cause the application controller 170 to operate in the order of the actions A2, A3, and A1 such that operations corresponding to the responses may be performed in order of the responses R2, R3, and R1.

For example, the response priority determination engine 115 may request the application controller 990 to perform an operation related to the emergency service first such that the operation corresponding to the response R1 may be performed first.

Also, the first application 940, the second application 960, and the third application 980 may obtain a result of performing the operation corresponding to each response, and output a response indicating the result of performing the operation to the user.

According to an embodiment of the disclosure, as the operation for each response is completed, the electronic device 1000 may output the responses generated by the first application 940, the second application 960, and the third application 980 in the order in which the responses are first generated. Alternatively, the electronic device 1000 may sequentially output the responses by the first application 940, the second application 960, and the third application 980 according to the priority determined by the response priority determination engine 115.

The electronic device 1000 may provide a plurality of response to the plurality of speech inputs by using the first application 940, the second application 960, and the third application 980 according to various orders and methods.

Figure 12:
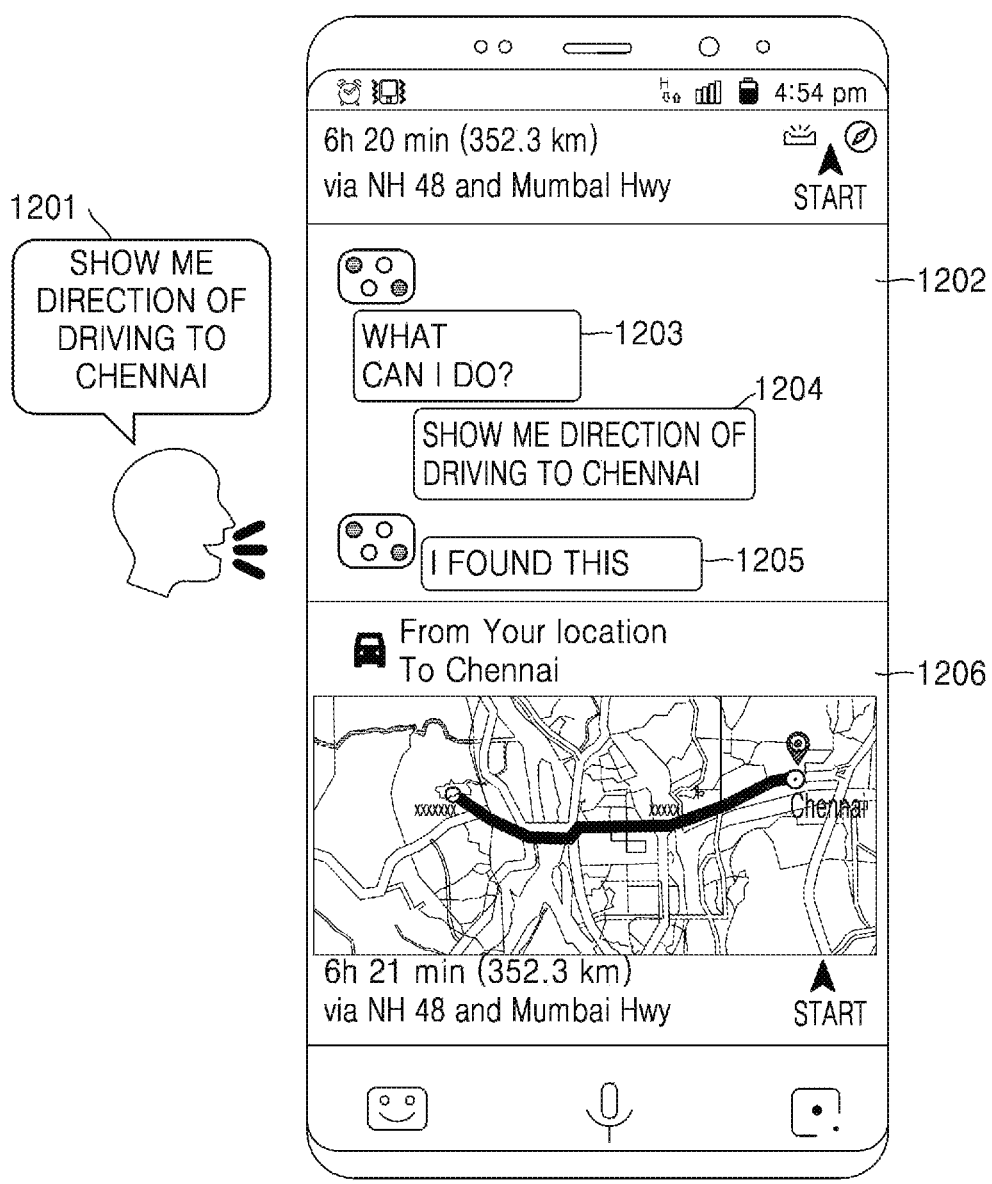
FIG. 12 is a diagram showing an example of updating preference information based on responses corresponding to a speech input according to an embodiment of the disclosure.

FIG. 12 is a diagram showing an example of updating preference information based on responses corresponding to a speech input according to an embodiment of the disclosure.

Referring to FIG. 12, as the first application 940 is executed, a guidance message 1203 "What can I do?" may be output on a screen 1202 displaying an interface of the first application 940.

According to an embodiment of the disclosure, the first application 940 may be previously determined as an application that outputs the response to the speech input 1201. However, when an event including a state in which the first application 940 may not output the response to the speech input 1201 is detected, an operation of selecting an application by which the speech input 1201 is to be processed according to an embodiment of the disclosure may be performed.

After the guidance message 1203 is output, the speech input 1201 "Show me the direction of driving to Chennai" may be received from a user. According to an embodiment of the disclosure, the speech input 1201 may be processed by the first application 940 as the first application 940 is executed by a user input that calls the first application 940.

As a result of performing speech recognition on the speech input 1201, text 1204 corresponding to the speech input 1201 may be displayed. Also, as responses 1205 and 1206 corresponding to the speech input 1201, a navigation function that shows the direction of driving to Chennai may be provided, as shown in FIG. 12.

The electronic device 1000 may update the preference information of the first application 940 based on the speech input 1201 processed in the first application 940 and the responses 1205 and 1206 to the speech input 1201.

For example, the electronic device 1000 may update the preference information of the first application 940 based on metadata including "driving" as metadata for the speech input 1201 and information indicating that the response to the speech input 1201 is successful.

Figure 13:
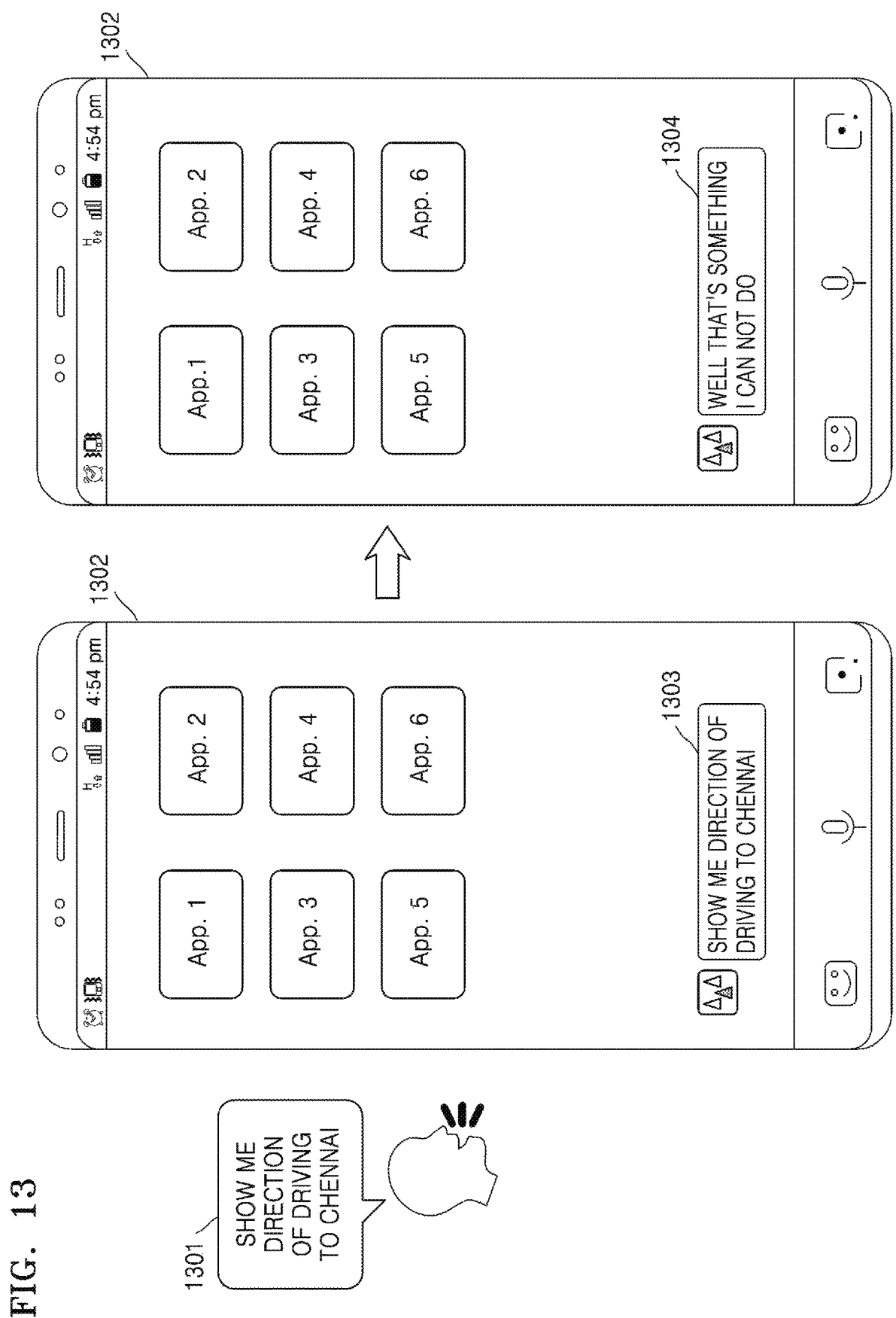
FIG. 13 is a diagram showing an example of updating preference information based on a response corresponding to a speech input according to an embodiment of the disclosure.

FIG. 13 is a diagram showing an example of updating preference information based on a response corresponding to a speech input according to an embodiment of the disclosure.

Referring to FIG. 13, in a state where the second application 960 is being executed, the speech input 1301 "Show me the direction of driving to Chennai" may be received from a user.

According to an embodiment of the disclosure, the speech input 1301 may be processed by the second application 960 as the second application 960 is executed by a user input that calls the second application 960.

According to an embodiment of the disclosure, the second application 960 may be previously determined as an application that outputs the response to the speech input 1301. However, when an event including a state in which the second application 960 may not output the response to the speech input 1301 is detected, an operation of selecting an application by which the speech input 1301 is to be processed according to an embodiment of the disclosure may be performed.

As a result of performing speech recognition on the speech input 1301, text 1303 corresponding to the speech input 1301 may be displayed on a screen 1302 displaying an interface of the second application 960. In addition, the second application 960 may display the response 1304 indicating a failure in processing the speech input 1301. For example, unlike the first application 940, the second application 960 may fail to process the speech input 1301 by failing to understand the speech input 1301 or failing to perform an operation corresponding to the speech input 1301.

The electronic device 1000 may update preference information of the second application 960 based on the speech input 1301 received in the second application 960 and the response 1304 to the speech input 1301.

For example, the electronic device 1000 may update the preference information of the second application 960 based on metadata including "driving" as metadata for the speech input 1301 and information indicating that the response 1304 to the speech input 1301 fails.

Figure 14:
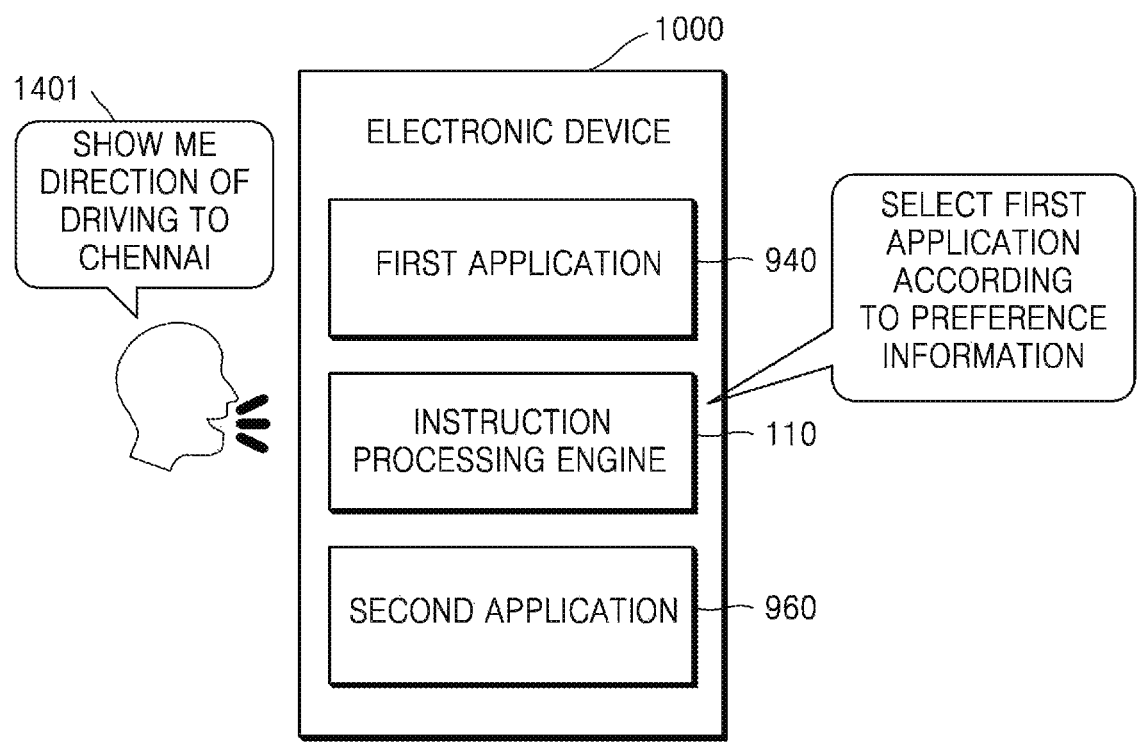
FIG. 14 is a diagram showing an example of processing a speech input based on preference information according to an embodiment of the disclosure.

FIG. 14 is a diagram showing an example of processing a speech input 1401 based on preference information according to an embodiment of the disclosure.

Referring to FIG. 14, the electronic device 1000 may include the first application 940, the second application 960, and the instruction processing engine 110 as components for processing the speech input 1401.

According to an embodiment of the disclosure, the electronic device 1000 may receive the speech input 1401 "Show me the direction to drive to Chennai." According to an embodiment of the disclosure, in a state where both the first application 940 and the second application 960 are not executed, as the speech input 1401 is received, an operation of selecting an application to process the speech input 1401 according to an embodiment of the disclosure may be performed. Further, as the application for processing the speech input 1401 is not selected by a user, the operation of selecting the application to process the speech input 1401 according to an embodiment of the disclosure may be performed. In addition, when an event including a state where an application previously determined as an application that outputs a response to the speech input 1401 may not output the response to the speech input 1401 is detected, the operation of selecting the application for processing the speech input 1401 according to an embodiment of the disclosure may be performed.

The instruction processing engine 110 may select the application to process the speech input 1401 based on the preference information for the first application 940 and the second application 960 updated in embodiments of the disclosure of FIGS. 12 and 13.

The instruction processing engine 110 may obtain metadata from the speech input 1401 for selecting the application to process the speech input 1401. The metadata may be obtained based on text corresponding to the speech input 1401. As the metadata obtained from the speech input 1401 includes "driving," the instruction processing engine 110 may select the first application 940 as an application suitable for processing the speech input 1401 including "driving" based on the preference information previously stored in the instruction processing engine 110.

For example, the instruction processing engine 110 may select the first application 940 which is successful in a result of processing the speech input 1401 corresponding to the metadata "driving" from among the first application 940 and the second application 960.

The first application 940 may process the speech input 1401 according to a selection of the instruction processing engine 110 and output the response corresponding to the speech input 1401 as a result of the selection.

Figure 15:
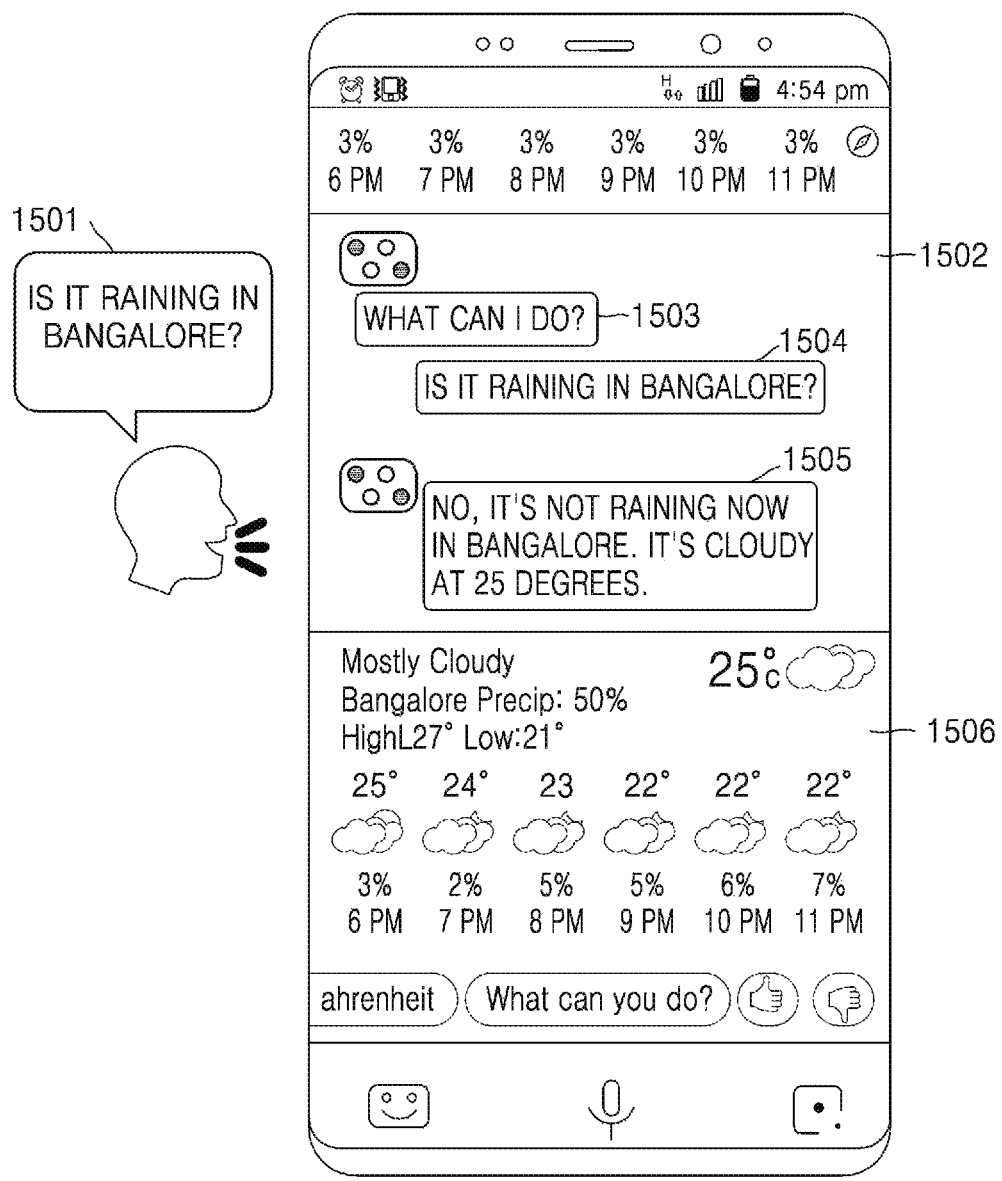
FIG. 15 is a diagram showing an example of updating preference information based on responses corresponding to a speech input according to an embodiment of the disclosure.

FIG. 15 is a diagram showing an example of updating preference information based on responses corresponding to a speech input according to an embodiment of the disclosure.

Referring to FIG. 15, as a wakeup word that calls the first application 940 is input to the electronic device 1000, the first application 940 may be executed and the speech input 1501 may be processed by the first application 940.

Referring to FIG. 15, as the first application 940 is executed, a guidance message 1503 "What can I do?" may be output on a screen 1502 displaying an interface of the first application 940.

According to an embodiment of the disclosure, the first application 940 may be previously determined as an application that outputs the response to the speech input 1501. However, when an event including a state in which the first application 940 may not output the response to the speech input 1501 is detected, an operation of selecting an application by which the speech input 1501 is to be processed according to an embodiment of the disclosure may be performed.

After the guidance message 1503 is output, the speech input 1501 "Is it raining in Bangalore?" may be received from a user. According to an embodiment of the disclosure, as the first application 940 is executed by a user input that calls the first application 940, the speech input 1501 may be processed by the first application 940.

As a result of performing speech recognition on the speech input 1501, text 1504 corresponding to the speech input 1501 may be displayed. In addition, weather information of Bangalore may be displayed as the responses 1505 and 1506 corresponding to the speech input 1501, as shown in FIG. 15.

The electronic device 1000 may update preference information of the first application 940 based on the speech input 1501 processed in the first application 940 and the responses 1505 and 1506 to the speech input 1501.

For example, the electronic device 1000 update the preference information of the first application 940 based on metadata including "rain" as metadata for the speech input 1501 and information that indicates that the response to the speech input 1501 is successful.

In addition, the electronic device 1000 may receive negative feedback as user feedback to the responses 1505 and 1506 to the speech input 1501. According to an embodiment of the disclosure, as the responses 1505 and 1506 provided by the first application 940 include incorrect content, the negative feedback may be received from the user. The electronic device 1000 may update the preference information of the first application 940 based on the negative feedback.

Figure 16:
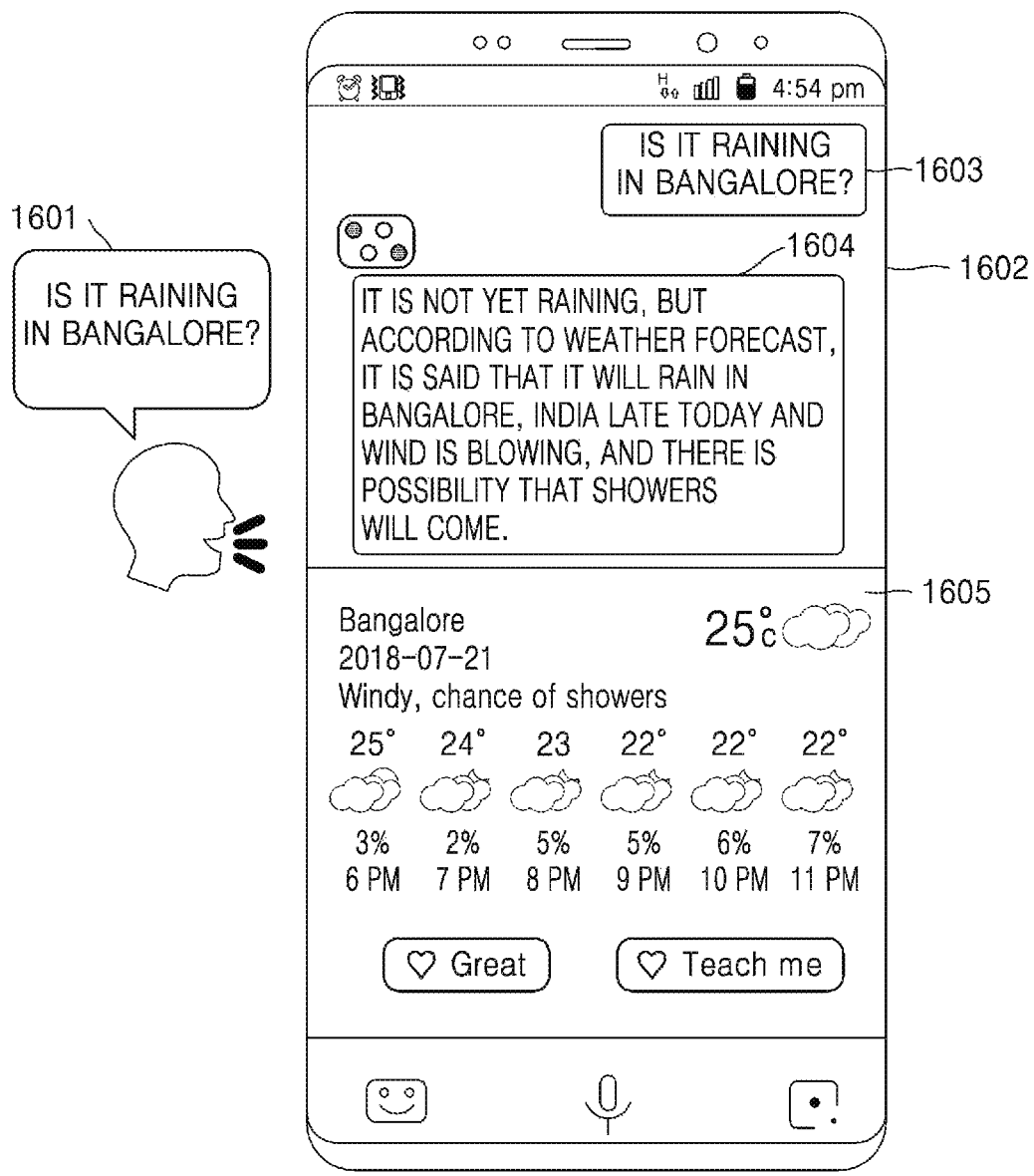
FIG. 16 is a diagram showing an example of updating preference information based on responses corresponding to a speech input according to an embodiment of the disclosure.

FIG. 16 is a diagram showing an example of updating preference information based on responses corresponding to a speech input according to an embodiment of the disclosure.

Referring to FIG. 16, as a wakeup word that calls the second application 960 is input to the electronic device 1000, the second application 960 may be executed and the speech input 1601 may be processed by the second application 960.

Referring to FIG. 16, in a state where the second application 960 is being executed, the speech input 1601 "Is it raining in Bangalore?" may be received from a user.

According to an embodiment of the disclosure, the second application 960 may be previously determined as an application that outputs the response to the speech input 1601. However, when an event including a state in which the second application 960 may not output the response to the speech input 1601 is detected, an operation of selecting an application by which the speech input 1601 is to be processed according to an embodiment of the disclosure may be performed.

As a result of performing speech recognition on the speech input 1601, text 1603 corresponding to the speech input 1601 may be displayed on a screen 1602 displaying an interface of the second application 960. In addition, weather information of Bangalore may be displayed as the responses 1604 and 1605 corresponding to the speech input 1601, as shown in FIG. 16.

The electronic device 1000 according to an embodiment of the disclosure may update preference information of the second application 960 based on the speech input 1601 received in the second application 960 and the responses 1604 and 1605 to the speech input 1601.

For example, the electronic device 1000 may update the preference information of the second application 960 based on metadata including "rain" as metadata for the speech input 1601 and information indicating that the response to the speech input 1601 is successful.

In addition, the electronic device 1000 may receive positive feedback as user feedback to the responses 1604 and 1605 to the speech input 1601. According to an embodiment of the disclosure, the positive feedback may be received from a user as the responses 1604 and 1605 provided by the second application 960 include accurate and detailed content. The electronic device 1000 may update the preference information of the second application 960 based on the positive feedback.

Figure 17:
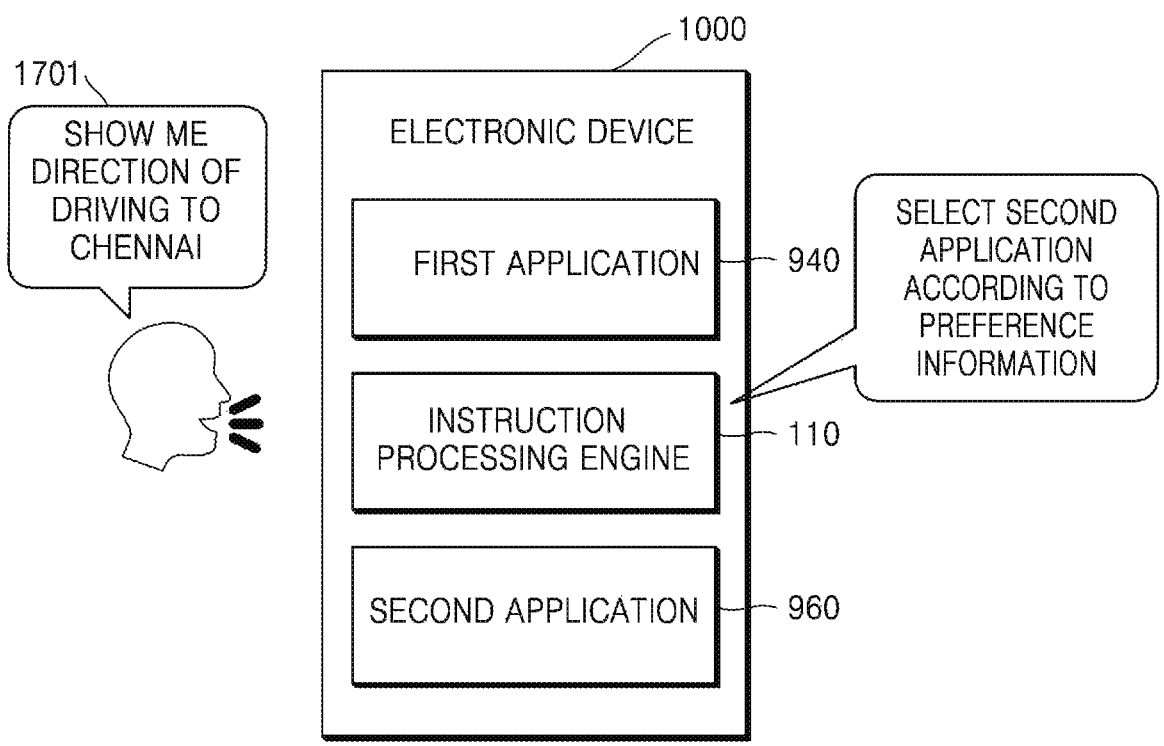
FIG. 17 is a diagram illustrating an example of processing a speech input based on preference information according to an embodiment of the disclosure.

FIG. 17 is a diagram illustrating an example of processing a speech input based on preference information according to an embodiment of the disclosure.

Referring to FIG. 17, the electronic device 1000 may include the first application 940, the second application 960, and the instruction processing engine 110 as components for processing the speech input 1701.

According to an embodiment of the disclosure, the electronic device 1000 may receive the speech input 1701 "Is it raining in Bangalore?" According to an embodiment of the disclosure, in a state where both the first application 940 and the second application 960 are not executed, as the speech input 1701 is received, an operation of selecting an application to process the speech input 1701 according to an embodiment of the disclosure may be performed. Further, as the application to process the speech input 1701 is not selected by a user, the operation of selecting the application to process the speech input 1701 according to an embodiment of the disclosure may be performed. In addition, when an event including a state where an application previously determined as an application that outputs a response to the speech input 1701 may not output the response to the speech input 1701 is detected, the operation of selecting the application by which the speech input 1701 is to be processed according to an embodiment of the disclosure may be performed.

For example, when the speech input 1701 does not include information indicating the application by which the speech input 1701 is to be processed, the operation of selecting the application to process the speech input 1701 according to an embodiment of the disclosure may be performed.

The instruction processing engine 110 may select the application to process the speech input 1701 based on the preference information for the first application 940 and the second application 960 updated in embodiments of the disclosure of FIGS. 15 and 16.

The instruction processing engine 110 may obtain metadata from the speech input 1701 for selecting the application to process the speech input 1701. The metadata may be obtained based on text corresponding to the speech input 1701. As the metadata obtained from the speech input 1701 includes "rain," the instruction processing engine 110 may select the second application 960 as an application suitable for processing the speech input 1701 including "rain" based on the preference information previously stored in the instruction processing engine 110.

For example, the instruction processing engine 110 may select the second application 960 which is successful in a result of processing the speech input 1701 including the metadata "rain" in the previously stored preference information and which is positive in user feedback from among the first application 940 and the second application 960.

The second application 960 may process the speech input 1701 according to a selection of the instruction processing engine 110 and output the response corresponding to the speech input 1701 as a result of the selection.

Figure 18:
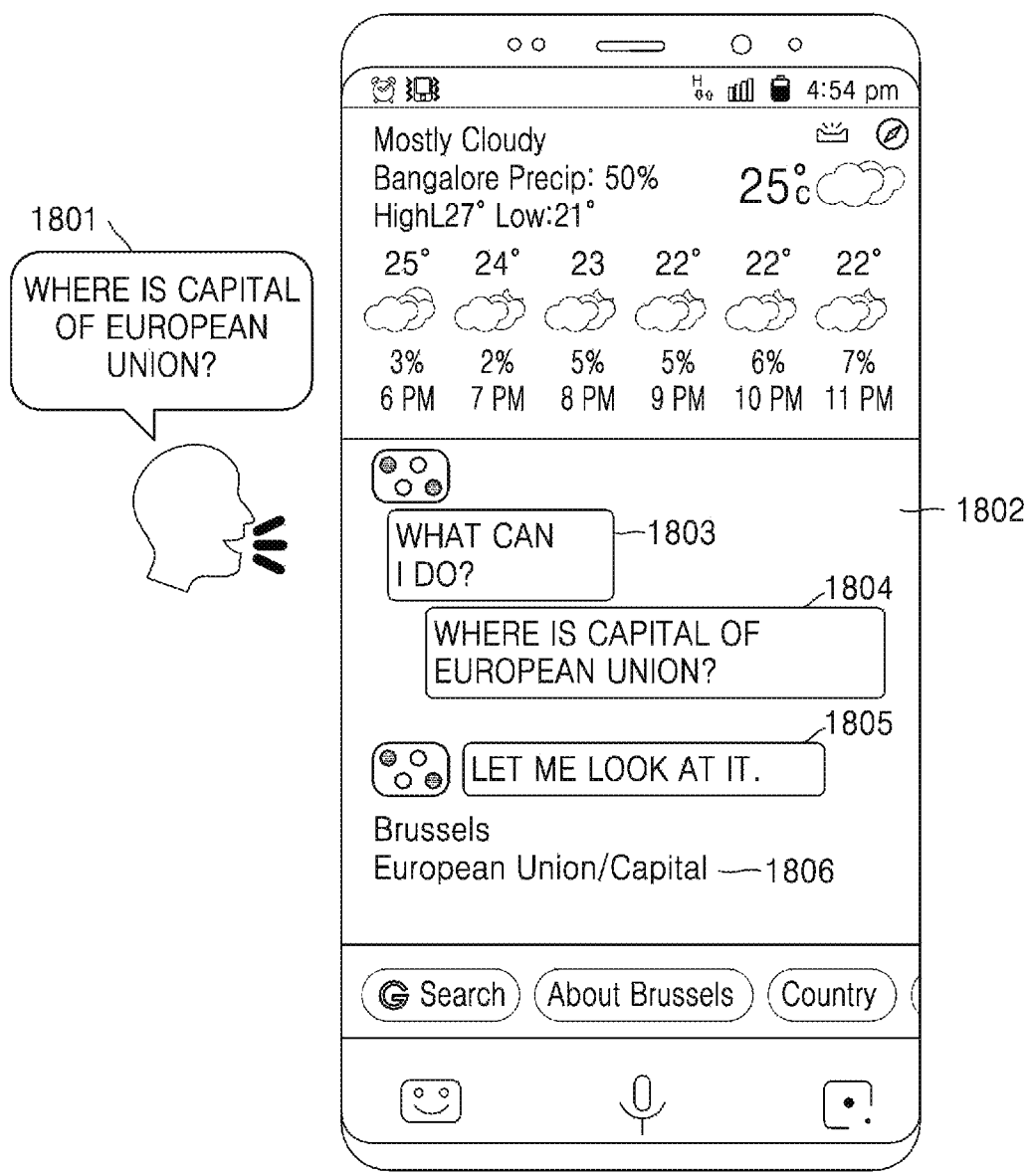
FIG. 18 is a diagram showing an example of updating preference information based on responses corresponding to a speech input according to an embodiment of the disclosure.

FIG. 18 is a diagram showing an example of updating preference information based on responses corresponding to a speech input according to an embodiment of the disclosure.

Referring to FIG. 18, as a wakeup word that calls the first application 940 is input to the electronic device 1000, the first application 940 may be executed and the speech input 1801 may be processed by the first application 940.

Referring to FIG. 18, as the first application 940 is executed, a guidance message 1803 "What can I do?" may be output on a screen 1802 displaying an interface of the first application 940.

According to an embodiment of the disclosure, the first application 940 may be previously determined as an application that outputs the response to the speech input 1801. However, when an event including a state in which the first application 940 may not output the response to the speech input 1801 is detected, an operation of selecting an application by which the speech input 1801 is to be processed according to an embodiment of the disclosure may be performed.

After the guidance message 1803 is output, the speech input 1801 "Where is the capital of the European Union?" may be received from a user. According to an embodiment of the disclosure, as the first application 940 is executed by a user input that calls the first application 940, the speech input 1801 may be processed by the first application 940.

As a result of performing speech recognition on the speech input 1801, text 1804 corresponding to the speech input 1801 may be displayed. In addition, information about Brussels, the capital of the European Union, may be displayed as the responses 1805 and 1806 corresponding to the speech input 1801, as shown in FIG. 18.

The electronic device 1000 may update preference information of the first application 940 based on the speech input 1801 processed in the first application 940 and the responses 1805 and 1806 to the speech input 1801.

For example, the electronic device 1000 may update the preference information of the first application 940 based on metadata including "capital" as metadata for the speech input 1801 and information that indicates that the response to the speech input 1801 is successful.

In addition, the electronic device 1000 may measure a time taken for the responses 1805 and 1806 for the speech input 1801 to be displayed on an interface 1802 after the speech input 1801 is received, and may update the preference information of the first application 940 based on time information "1.3 seconds" that is the measured time.

Figure 19:
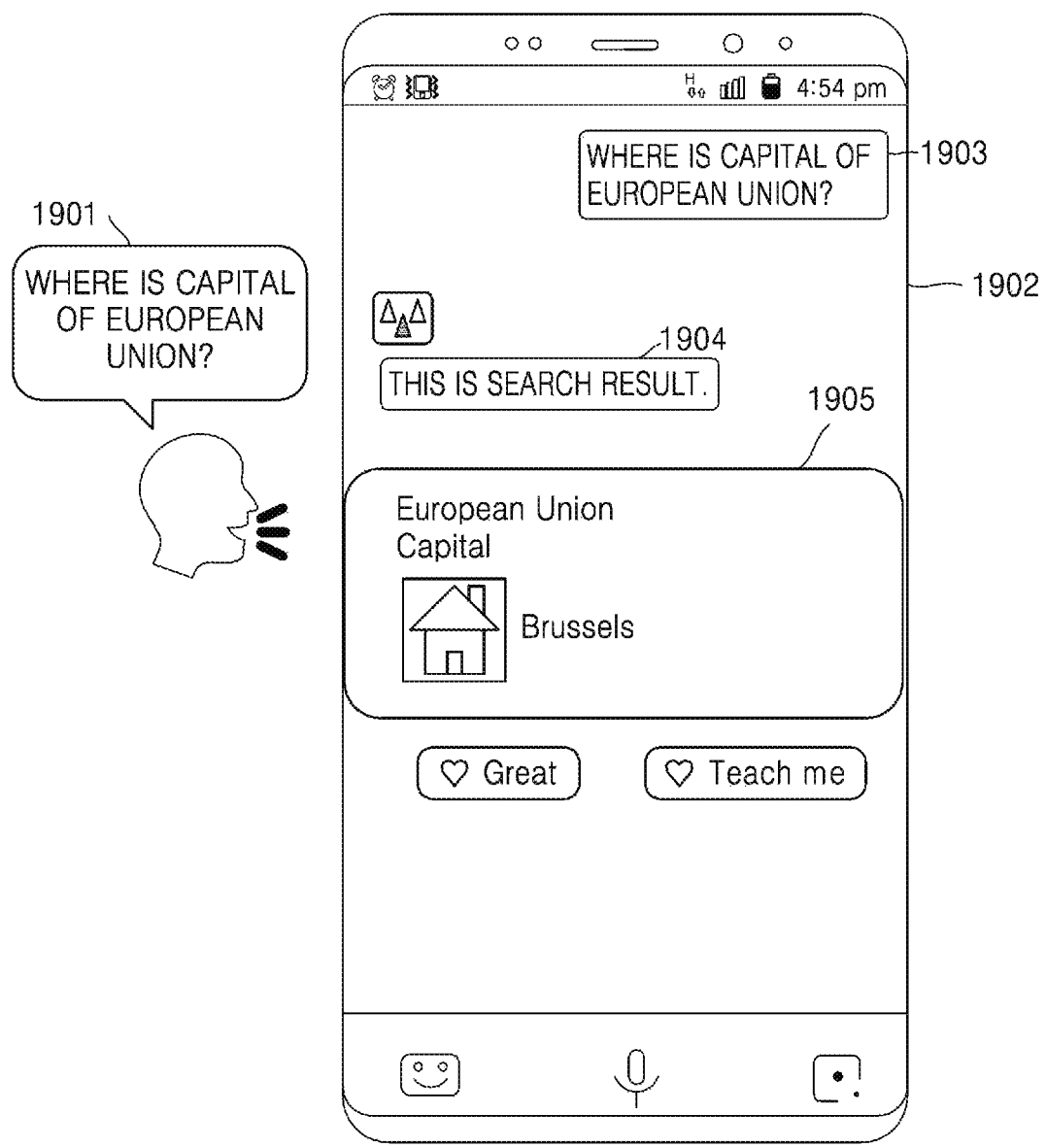
FIG. 19 is a diagram showing an example of updating preference information based on responses corresponding to a speech input according to an embodiment of the disclosure.

FIG. 19 is a diagram showing an example of updating preference information based on responses corresponding to a speech input according to an embodiment of the disclosure.

Referring to FIG. 19, as a wakeup word that calls the second application 960 is input to the electronic device 1000, the second application 960 may be executed and the speech input 1901 may be processed by the second application 960.

Referring to FIG. 19, in a state where the second application 960 is being executed, the speech input 1901 "Where is the capital of the European Union?" may be received from a user.

According to an embodiment of the disclosure, as the second application 960 is executed by a user input that calls the second application 960, the speech input 1901 may be processed by the second application 960.

According to an embodiment of the disclosure, the second application 960 may be previously determined as an application that outputs the response to the speech input 1901. However, when an event including a state in which the second application 960 may not output the response to the speech input 1901 is detected, an operation of selecting an application by which the speech input 1901 is to be processed according to an embodiment of the disclosure may be performed.

As a result of performing speech recognition on the speech input 1901, text 1903 corresponding to the speech input 1901 may be displayed on a screen 1902 displaying an interface of the second application 960. In addition, information about Brussels, the capital of the European Union, may be displayed as the responses 1904 and 1905 corresponding to the speech input 1601, as shown in FIG. 19.

The electronic device 1000 may update preference information of the second application 960 based on the speech input 1901 received in the second application 960 and the responses 1904 and 1905 to the speech input 1901.

For example, the electronic device 1000 may update the preference information of the second application 960 based on metadata including "capital" as metadata for the speech input 1901 and information indicating that the response to the speech input 1901 is successful.

In addition, the electronic device 1000 may measure a time taken for the responses 1905 and 1906 for the speech input 1901 to be displayed on an interface 1902 after the speech input 1901 is received, and may update the preference information of the first application 940 based on time information "2 seconds" that is the measured time.

Figure 20:
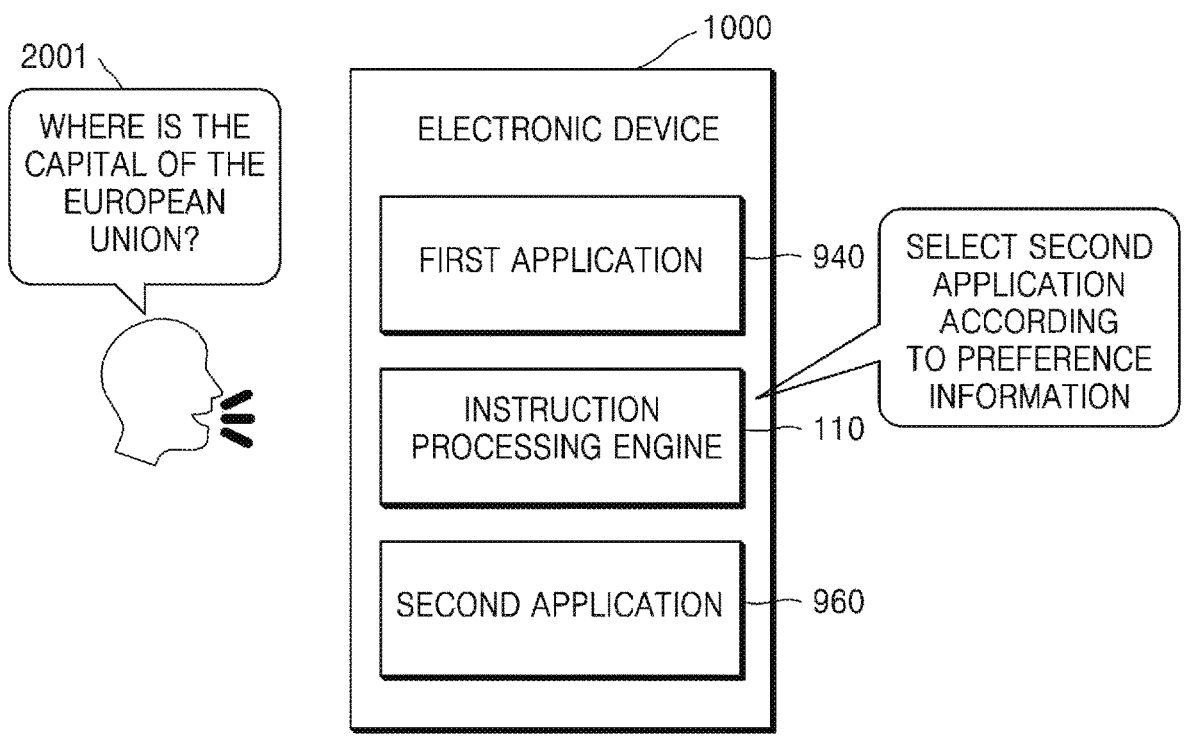
FIG. 20 is a diagram showing an example of processing a speech input 2001 based on preference information according to an embodiment of the disclosure.

FIG. 20 is a diagram showing an example of processing a speech input 2001 based on preference information according to an embodiment of the disclosure.

Referring to FIG. 20, the electronic device 1000 may include the first application 940, the second application 960, and the instruction processing engine 110 as components for processing the speech input 2001.

According to an embodiment of the disclosure, the electronic device 1000 may receive the speech input 2001 "Where is the capital of the European Union?" According to an embodiment of the disclosure, in a state where both the first application 940 and the second application 960 are not executed, as the speech input 2001 is received, an operation of selecting an application to process the speech input 2001 according to an embodiment of the disclosure may be performed. Further, according to an embodiment of the disclosure, as the application for processing the speech input 2001 is not selected by a user, the operation of selecting the application to process the speech input 2001 may be performed. In addition, when an event including a state where an application previously determined as an application that outputs a response to the speech input 2001 may not output the response to the speech input 2001 is detected, the operation of selecting the application for processing the speech input 2001 according to an embodiment of the disclosure may be performed.

The instruction processing engine 110 may select the application to process the speech input 2001 based on the preference information for the first application 940 and the second application 960 updated in embodiments of the disclosure of FIGS. 18 and 19.

The instruction processing engine 110 may obtain metadata from the speech input 2001 for selecting the application to process the speech input 2001. The metadata may be obtained based on text corresponding to the speech input 2001. As the metadata obtained from the speech input 2001 includes "capital," the instruction processing engine 110 may select the second application 960 as an application suitable for processing the speech input 2001 including "capital" based on the preference information previously stored in the instruction processing engine 110.

For example, the instruction processing engine 110 may select the second application 960 which is successful in a result of processing the speech input 2001 including the metadata "capital" in the previously stored preference information and which has a short time taken to output a response to the speech input 2001 from among the first application 940 and the second application 960.

The second application 960 may process the speech input 2001 according to a selection of the instruction processing engine 110 and output the response corresponding to the speech input 2001 as a result of the selection.

Figure 21:
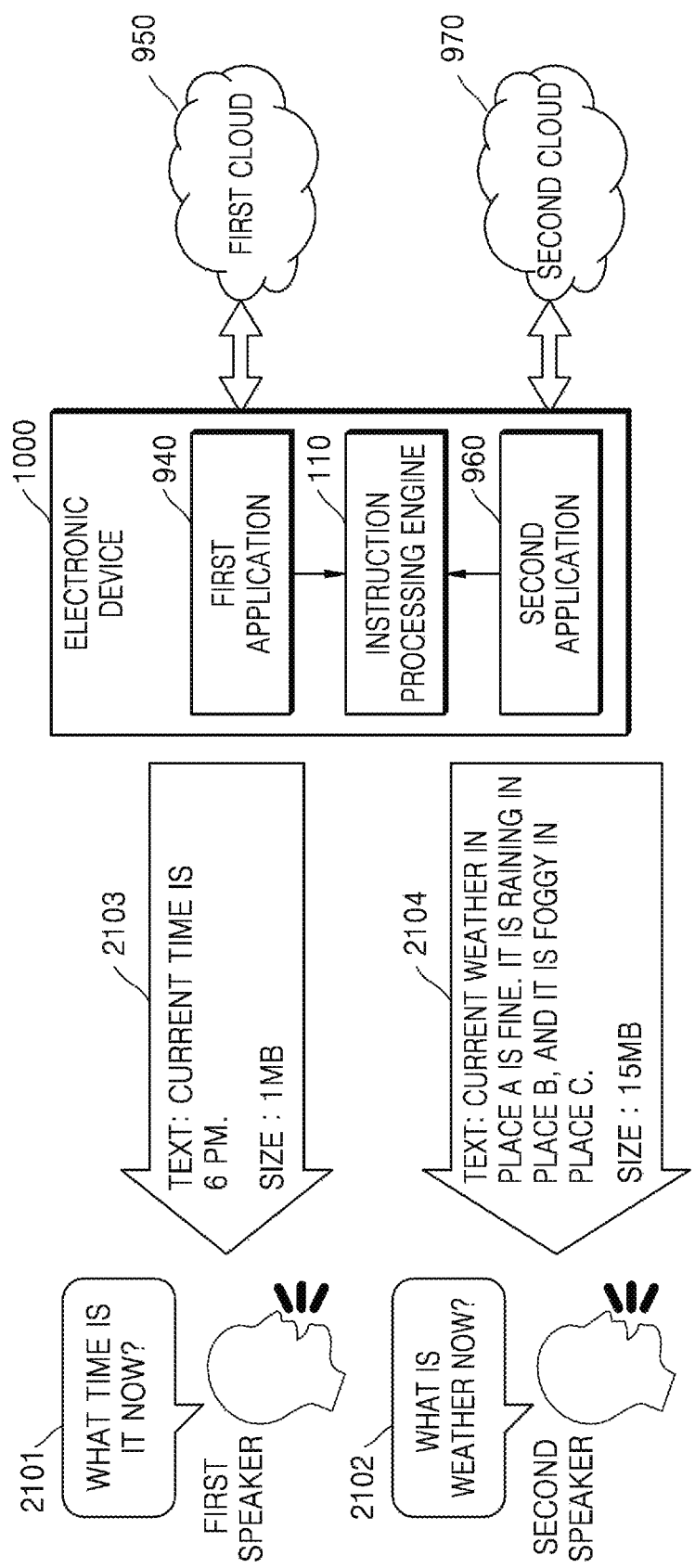
FIG. 21 is a diagram showing an example of outputting a plurality of responses based on priority according to an embodiment of the disclosure.

FIG. 21 is a diagram showing an example of outputting a plurality of responses based on priority according to an embodiment of the disclosure.

Referring to FIG. 21, the electronic device 1000 may receive a plurality of speech inputs 2101 and 2102 and output responses based on a plurality of response information 2103 and 2104 for the received speech inputs 2101 and 2102. The electronic device 1000 according to the embodiment of the disclosure shown in FIG. 21 may receive the plurality of speech inputs 2101 and 2102 from first and second speakers.

The electronic device 1000 may include the instruction processing engine 110 for processing the plurality of speech inputs 2101 and 2102 and the first application 940 and the second application 960 that may be used to output the responses to the plurality of speech inputs 2101 and 2102.

The instruction processing engine 110 may select applications to process the plurality of speech inputs 2101 and 2102 based on metadata obtained based on text of the plurality of speech inputs 2101 and 2102. For example, the first application 940 and the second application 960 may be selected as applications for processing the plurality of speech inputs 2101 and 2102, respectively.

The first application 940 and the second application 960 may be connected to the first cloud 950 and the second cloud 970 respectively and output the responses to the speech inputs 2101 and 2102 transmitted to the respective applications. According to an embodiment of the disclosure, the first application 940 and the second application 960 may output the responses to the speech inputs 2101 and 2102 based on data received from the cloud connected to each application.

According to an embodiment of the disclosure, the speech input 2101 "What time is it now?" may be transmitted to the first application 940 by the instruction processing engine 110. The first application 940 may use the first cloud 950 to obtain the response information 2103 "the current time is 6 PM" having a size of 1 MB. Also, the speech input 2102 "What is the weather now?" may be transmitted to the second application 960 by the instruction processing engine 110. The second application 960 may use the second cloud 970 to obtain the response information 2104 "Current weather in place A is fine. It is raining in place B, and it is foggy in place C," having a size of 15 MB.

The response information 2103 and 2104 obtained in the first application 940 and the second application 960 may be transmitted to the instruction processing engine 110. The instruction processing engine 110 may determine the priority of the plurality of response information 2103 and 2104 and output a plurality of responses based on the plurality of response information 2103 and 2104 according to the priority.

According to an embodiment of the disclosure, the priority of the plurality of response information 2103 and 2104 may be output faster the smaller the response size is at the faster speed the priority is processed by the electronic device 1000, and thus the priority may be determined to have a high priority. For example, because the size of the response information 2103 obtained from the first application 940 is smaller than that of the response information 2104 obtained from the second application 960, the response information 2103 may be determined to have a higher priority than the second information 2104.

The electronic device 1000 may determine the priority of the plurality of response information 2103 and 2104 according to whether a response has characteristics preferred by a user, a time taken to output the responses by the electronic device 1000, and other various criteria, and may sequentially output the responses based on the plurality of response information 2103 and 2104 according to the determined priority.

Therefore, even when a plurality of speech inputs are received by the electronic device 1000, the plurality of speech inputs may be simultaneously processed, and a plurality of responses may be output. Further, according to an embodiment of the disclosure, user experience may be improved as the plurality of responses are sequentially output according to the priority determined according to previously determined criteria.

Figure 22:
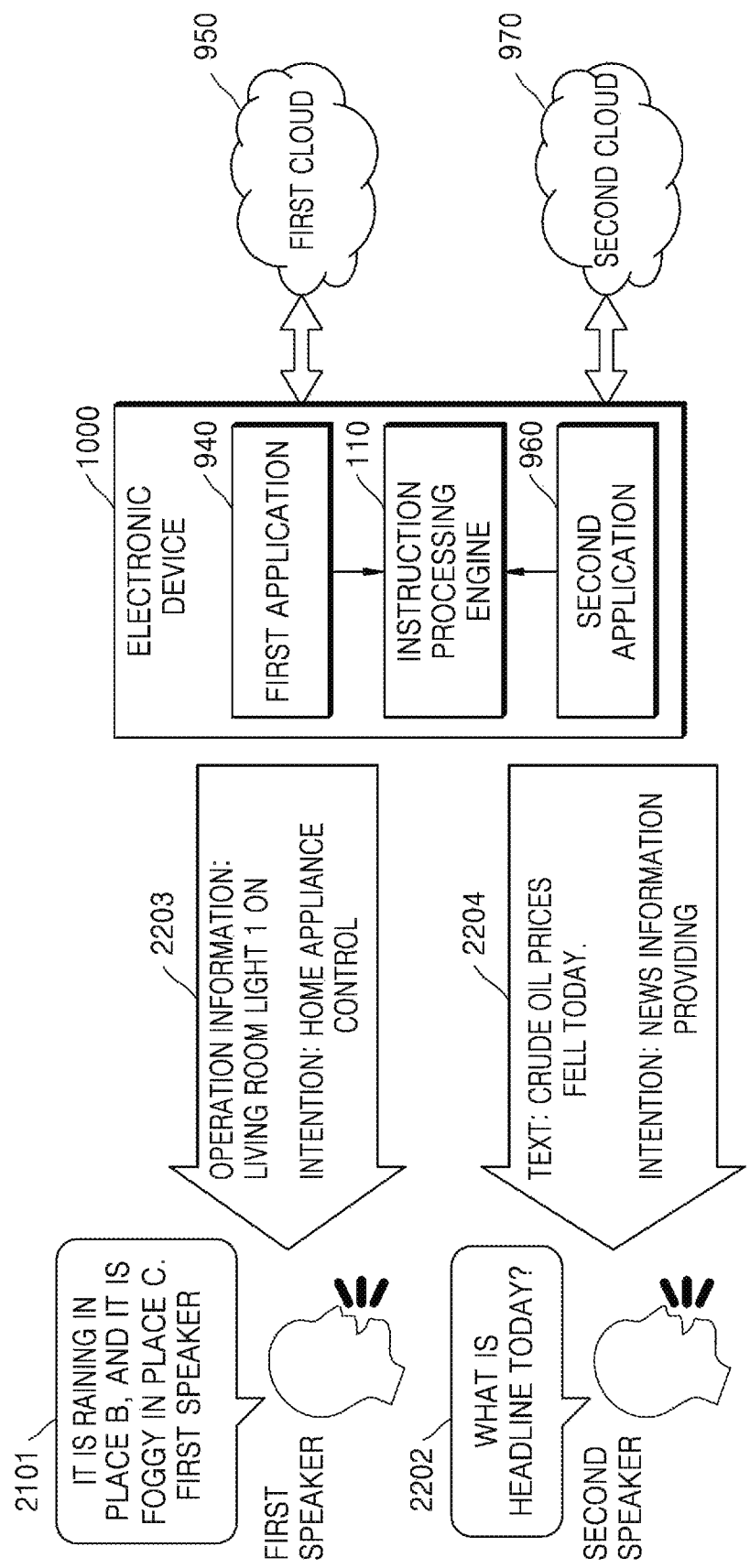
FIG. 22 is a diagram showing an example of outputting a plurality of responses based on priority according to an embodiment of the disclosure.

FIG. 22 is a diagram showing an example of outputting a plurality of responses based on priority according to an embodiment of the disclosure.

Referring to FIG. 22, the electronic device 1000 may receive a plurality of speech inputs 2201 and 2202 and output a plurality of responses for the received speech inputs 2201 and 2202. The electronic device 1000 may receive the plurality of speech inputs 2201 and 2202 from first and second speakers.

The electronic device 1000 may include the instruction processing engine 110 for processing the plurality of speech inputs 2201 and 2202 and the first application 940 and the second application 960 that may be used to output the responses to the plurality of speech inputs 2201 and 2202.

The instruction processing engine 110 according to an embodiment of the disclosure may select applications to process the plurality of speech inputs 2201 and 2202 based on metadata obtained based on text of the plurality of speech inputs 2201 and 2202. For example, the first application 940 and the second application 960 may be selected as the applications for processing the plurality of speech inputs 2201 and 2202, respectively.

The first application 940 and the second application 960 may be connected to the first cloud 950 and the second cloud 970 respectively and output the responses to the speech inputs 2201 and 2202 in the respective applications. According to an embodiment of the disclosure, the first application 940 and the second application 960 may output the responses to the speech inputs 2201 and 2202 based on data received from the cloud connected to each application.

According to an embodiment of the disclosure, the speech input 2201 "Turn on the light" may be transmitted to the first application 940 by the instruction processing engine 110. The first application 940 may use the first cloud 950 to obtain the response information 2203 including "home appliance control" as information relate to an intention of a user and including "living room light 1 ON" that is operation information corresponding to the speech input 2201.

Also, the speech input 2202 "What is the headline today?" may be transmitted to the second application 960 by the instruction processing engine 110. The second application 960 may use the second cloud 970 to obtain the response information 2204 including "news information providing" as information relate to an intention of a user and including "Crude oil prices fell today," that is text information that may be output in correspondence to the speech input 2201.

The response information 2203 and 2204 obtained in the first application 940 and the second application 960 may be transmitted to the instruction processing engine 110. The instruction processing engine 110 may determine the priority of the plurality of response information 2203 and 2204 and output responses based on the plurality of response information 2203 and 2204 according to the priority.

According to an embodiment of the disclosure, the priority of the plurality of response information 2203 and 2204 may be determined to have a higher priority according to a response having a characteristic further preferred by a user of the electronic device 1000. At least one of the first speaker or the second speaker may be the user of the electronic device 1000.

For example, when the user of the electronic device 1000 prefers a response relating to "home appliance control" to a response relating to "news information providing," the response information 2203 related to "home appliance control" may be determined to have a higher priority than the response information 2204 relating to "news information providing."

According to an embodiment of the disclosure, the electronic device 1000 may control the living room lamp 1 based on operation information of the response information 2203 related to "home appliance control" and output a control result. After the control result according to the response information 2203 is output as a response to the speech input 2201, the electronic device 1000 may output text as the response to the speech input 2201 based on the response information 2204 relating to "news information providing."

The electronic device 1000 may determine the priority of the plurality of response information 2203 and 2204 according to whether a response is preferred by a user, whether the response may be output faster by the electronic device 1000, or other various criteria, and may sequentially output the responses based on the plurality of response information 2203 and 2204 according to the determined priority.

Therefore, even when a plurality of speech inputs are received by the electronic device 1000, the plurality of speech inputs may be simultaneously processed, and a plurality of responses may be output. Further, user experience may be improved as the plurality of responses are sequentially output according to the priority determined according to previously determined criteria.

Figure 23:
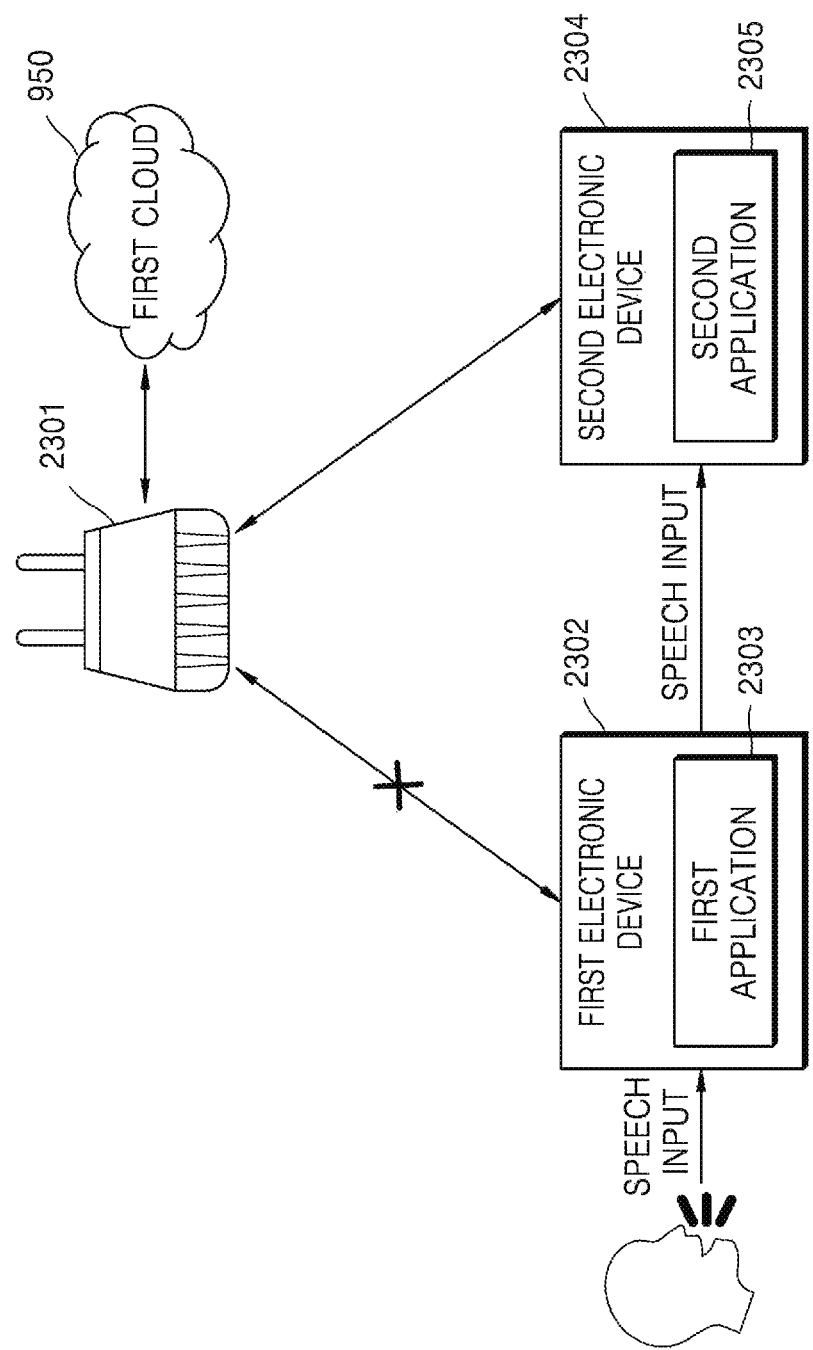
FIG. 23 is a diagram illustrating an example of outputting a response to a speech input through another electronic device according to an embodiment of the disclosure.

FIG. 23 is a diagram illustrating an example of outputting a response to a speech input through another electronic device according to an embodiment of the disclosure.

Referring to FIG. 23, a first electronic device 2302 may receive the speech input from a user. The first electronic device 2302 shown in FIG. 23 may correspond to the electronic device 1000 of FIGS. 1 to 3.

A second electronic device 2304 may be a device that may correspond to the electronic device 1000 of FIGS. 1 to 3 and different from the first electronic device 2402 that may be coupled to the first electronic device 2402.

The first electronic device 2302 and the second electronic device 2304 may be connected to the first cloud 950 through a network device 2301 to output the response to the speech input through first applications 2303 and 2305 selected according to an embodiment of the disclosure. For example, the network device 2301 may be a backhaul device that supports a network connection of a device connected to the network device 2301.

According to an embodiment of the disclosure, the first electronic device 2302 may process the received speech input and may search for the second electronic device 2304 capable of processing the speech input when it is in a state where the first electronic device 2302 may not output the response to the speech input. The first electronic device 2302 may transmit the speech input to the second electronic device 2304, according to a search result.

For example, the first electronic device 2302 may be in a state in which the first electronic device 2302 may not use the network device 2301 for processing the speech input because a connection state of the network device 2301 is not good or a connection is impossible. The first electronic device 2302 may use the network device 2301 to transmit the speech input to the second electronic device 2304 that is in a state in which the speech input may be processed.

The second electronic device 2304 that receives the speech input from the first electronic device 2302 may process the speech input in place of the first electronic device 2302. The second electronic device 2304 may output the response obtained by processing the speech input or may transmit the response to the first electronic device 2302. When the first electronic device 2302 receives the response from the second electronic device 2304, the first electronic device 2302 may output the received response as the response to the speech input.

Thus, even when the first electronic device 2302 is in the state where the first electronic device 2302 may not output the response to the speech input, the second electronic device 2304 may process the speech input in place of the first electronic device 2302, and thus the response to the speech input may be output.

Figure 24:
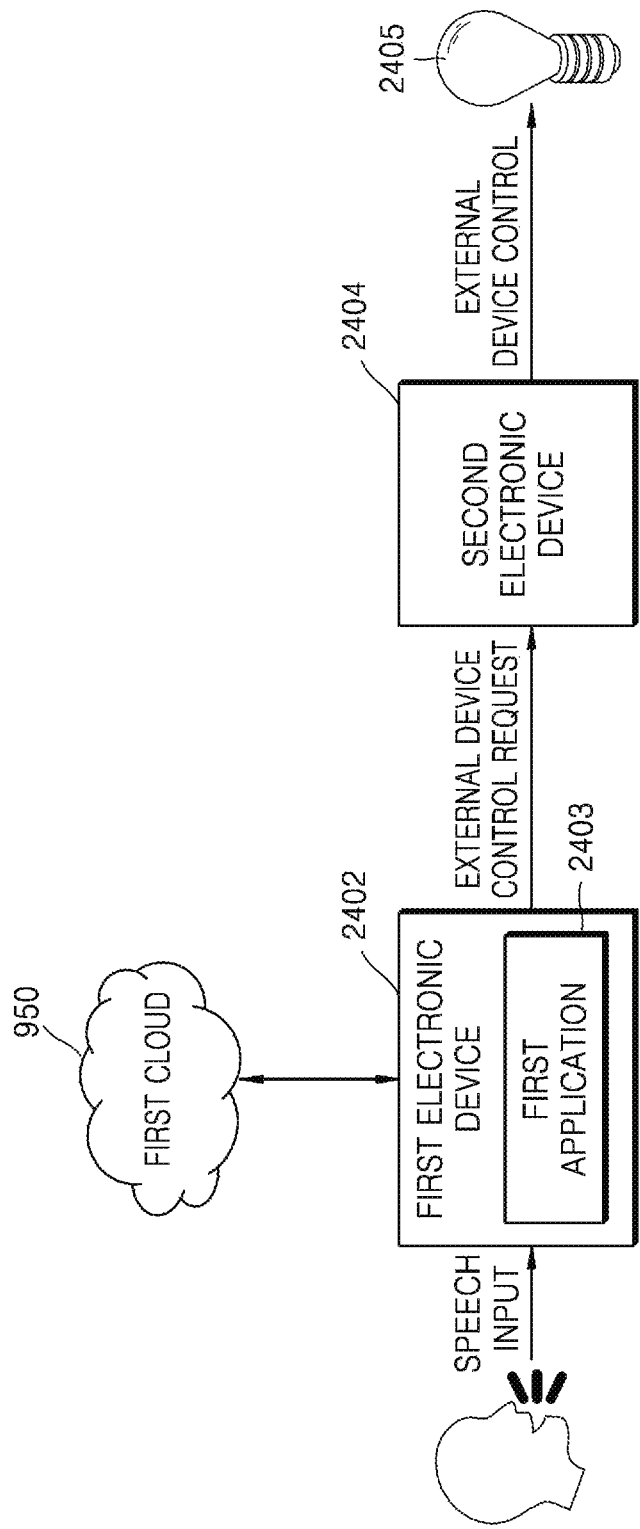
FIG. 24 is a diagram illustrating an example of controlling an external device according to a response to a speech input through another electronic device according to an embodiment of the disclosure.

FIG. 24 is a diagram illustrating an example of controlling an external device according to a response to a speech input through another electronic device according to an embodiment of the disclosure.

Referring to FIG. 24, the first electronic device 2402 may receive the speech input from a user. The first electronic device 2402 shown in FIG. 24 may correspond to the electronic device 1000 of FIGS. 1 to 3.

The second electronic device 2404 may be an electronic device other than the first electronic device 2402 located adjacent to the first electronic device 2402. The second electronic device 2404 may also be an electronic device that is connected to the external device 2405 so as to control the external device 2405. In addition, the second electronic device 2404 may be an electronic device corresponding to the electronic device 1000 of FIGS. 1 to 3.

The first electronic device 2302 may select a first application 2403 to process the received speech input and obtain operation information corresponding to the speech input through the first application 2403. For example, the first application 2403 may process the speech input through the first cloud 950 and obtain the operation information about an operation to be performed according to the speech input.

The first application 2403 may perform the operation according to the operation information and output a response based on a result of the operation. According to an embodiment of the disclosure, the operation information according to the speech input may include an operation of controlling the external device 2405. The external device 2405 may include, for example, a home appliance device that may be controlled by the second electronic device 2404.

When the first electronic device 2402 is the device that may not control the external device 2405, the first electronic device 2402 may search for the second electronic device 2404 capable of controlling the external device 2405. The first electronic device 2402 may request the second electronic device 2404 to control the external device 2405 according to the operation information according to the speech input.

The second electronic device 2404 may control the external device 2405 in response to a request received from the first electronic device 2402. Further, the second electronic device 2404 may transmit a result of controlling the external device 2405 to the first electronic device 2402.

The first electronic device 2402 may output the response corresponding to the speech input based on the result of controlling the external device 2405 received from the second electronic device 2404. For example, when it is successful in controlling the external device 2405, the first electronic device 2402 may output the response indicating that the external device 2405 is controlled according to the speech input.

Thus, according to an embodiment of the disclosure, even when the first electronic device 2402 may not control the external device 2405 according to the speech input, the first electronic device 2402 may control the external device 2405 according to the speech input through the second electronic device 2404 connected to the first electronic device 2402.

Figure 25:
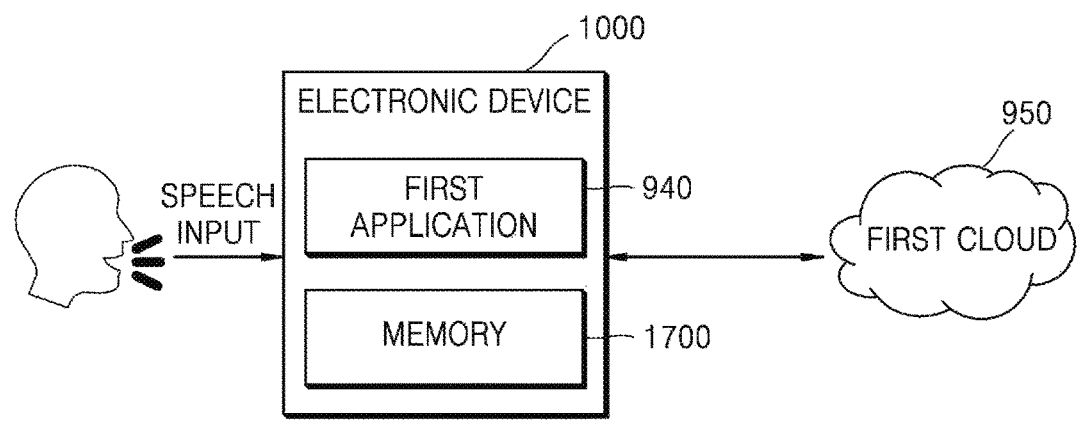
FIG. 25 is a diagram showing an example in which an electronic device processes a speech input according to an embodiment of the disclosure.

FIG. 25 is a diagram showing an example in which the electronic device 1000 processes a speech input according to an embodiment of the disclosure.

Referring to FIG. 25, the electronic device 1000 may receive the speech input and output a response corresponding to the received speech input. The electronic device 1000 may store the received speech input in the memory 1700, in order to process the speech input according to an embodiment of the disclosure.

According to an embodiment of the disclosure, the electronic device 1000 may select the first application 940 for outputting the response corresponding to the speech input, based on text corresponding to the speech input. The first application 940 may obtain and output the response corresponding to the speech input through data transmission/reception with the first cloud 950.

The electronic device 1000 according to an embodiment of the disclosure may delete the speech input stored in the memory 1700 when electronic device 1000 succeeds in processing the speech input and outputting the response.

Figure 26:
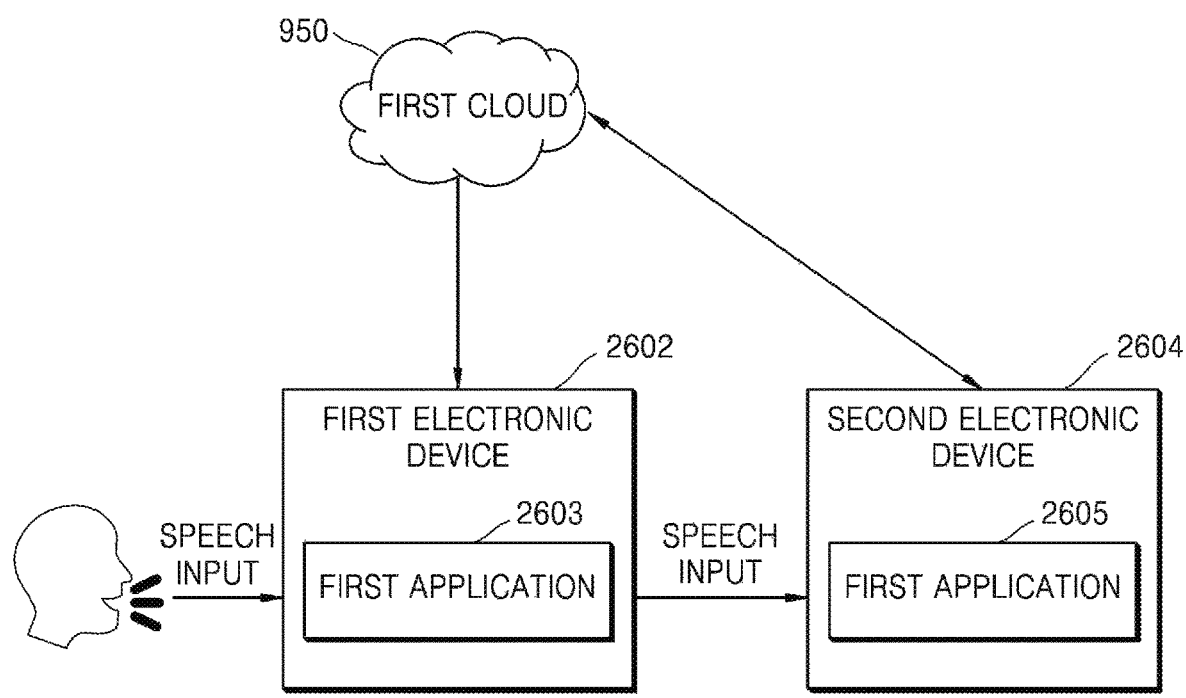
FIG. 26 is a diagram illustrating an example in which a plurality of electronic devices process a speech input according to an embodiment of the disclosure.

FIG. 26 is a diagram illustrating an example in which a plurality of electronic devices process a speech input according to an embodiment of the disclosure.

Referring to FIG. 26, a first electronic device 2602 and a second electronic device 2604 may be devices that may correspond to the electronic device 1000 of FIGS. 1 to 3. The second electronic device 2604 may be an electronic device that may be connected to the first electronic device 2602 and is different from the first electronic device 2602.

In addition, first applications 2603 and 2605 included in the first electronic device 2602 and the second electronic device 2604 according to an embodiment of the disclosure may obtain a response to the speech input through the first cloud 950.

The first electronic device 2602 may receive the speech input and process the speech input, in order to output the response corresponding to the speech input according to an embodiment of the disclosure. According to an embodiment of the disclosure, the first electronic device 2602 may store the speech input in a storage device (e.g. memory) inside the first electronic device 2602 as the first electronic device 2602 receives the speech input.

In addition, the first electronic device 2602 may search for the second electronic device 2604 that may be connected to the first electronic device 2602 when the first electronic device 2602 fails to process the speech input and output the response. The second electronic device 2604 may be a device that may process the speech input to output the response through the first application 2605 and the first cloud 950.

The first electronic device 2602 may transmit the speech input to the second electronic device 2604, and the speech input may be processed by the second electronic device 2604. The first electronic device 2602 may transmit the speech input to the second electronic device 2604 and then delete the speech input stored in the storage device. In addition, the first electronic device 2602 may transmit the speech input to the second electronic device 2604, receive and output the response to the speech input from the second electronic device 2604, and then delete the speech input stored in the storage device.

Figure 27:
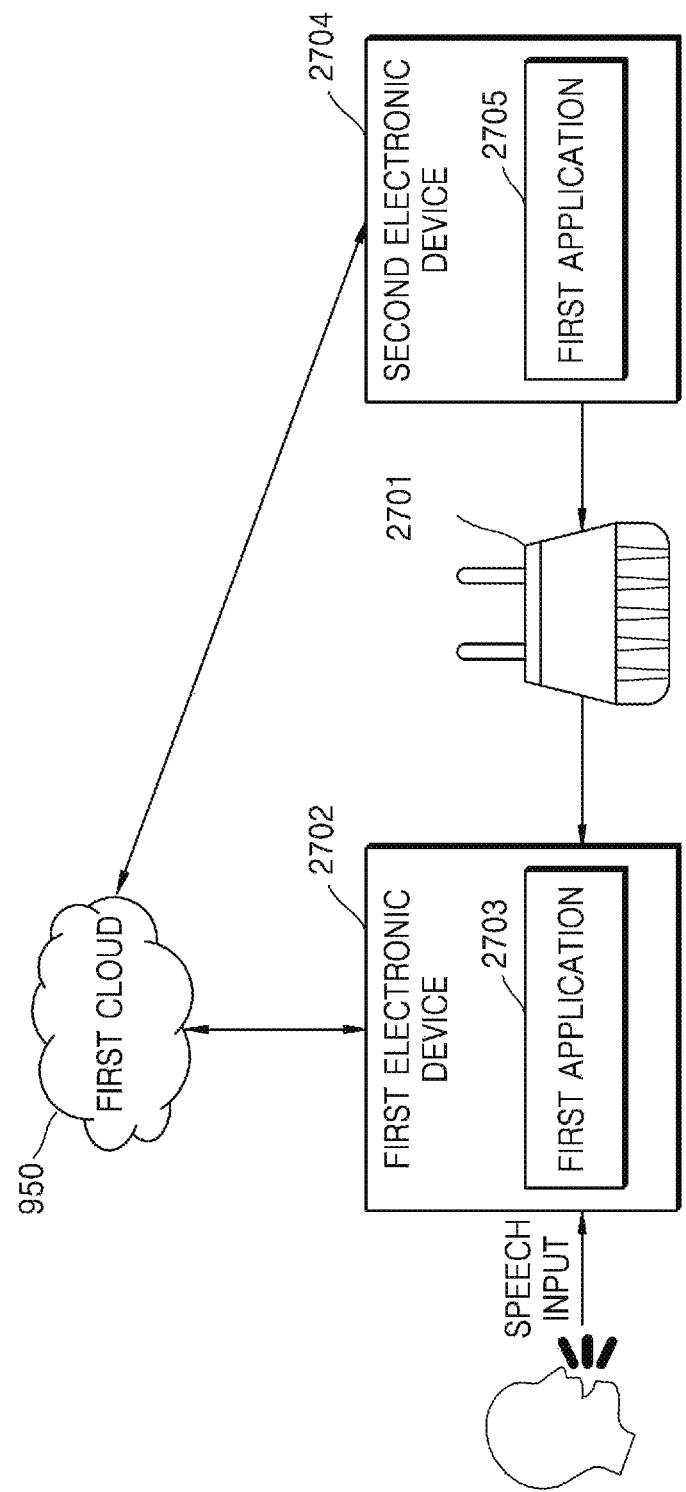
FIG. 27 is a diagram illustrating an example in which a plurality of electronic devices process a speech input according to an embodiment of the disclosure.

FIG. 27 is a diagram illustrating an example in which a plurality of electronic devices process a speech input according to an embodiment of the disclosure.

Referring to FIG. 27, a first electronic device 2702 and a second electronic device 2704 may be devices that may correspond to the electronic device 1000 of FIGS. 1 to 3. The second electronic device 2704 may be an electronic device that may be connected to the first electronic device 2702 and is different from the first electronic device 2702.

In addition, first applications 2703 and 2705 included in the first electronic device 2702 and the second electronic device 2704 according to an embodiment of the disclosure may obtain a response to the speech input through the first cloud 950.

The first electronic device 2702 may detect a presence of the second electronic device 2704 that may be connected to the first electronic device 2702 through a network device 2701 as power of the second electronic device 2704 is activated. For example, when the power of the second electronic device 2704 is activated, the second electronic device 2704 may instruct the presence of the second electronic device 2704 to the first electronic device 2702 through the network device 2701.

The first electronic device 2702 may store information about the second electronic device 2704 in a storage device (e.g. memory) inside the first electronic device 2702 based on a received indication as the first electronic device 2702 receives the indication indicating the presence of the second electronic device 2704. The information about the second electronic device 2704 may include a variety of information about the second electronic device 2704, for example, identification information of the second electronic device 2704, information about an application that may process the speech input in the second electronic device 2704, an IP address of the second electronic device 2704, information about the quality of a network connected to the second electronic device 2704, etc.

According to an embodiment of the disclosure, the first electronic device 2702 may use the information about the second electronic device 2704 to transmit a request to the second electronic device 2704 to output a response to the speech input.

Figure 28:
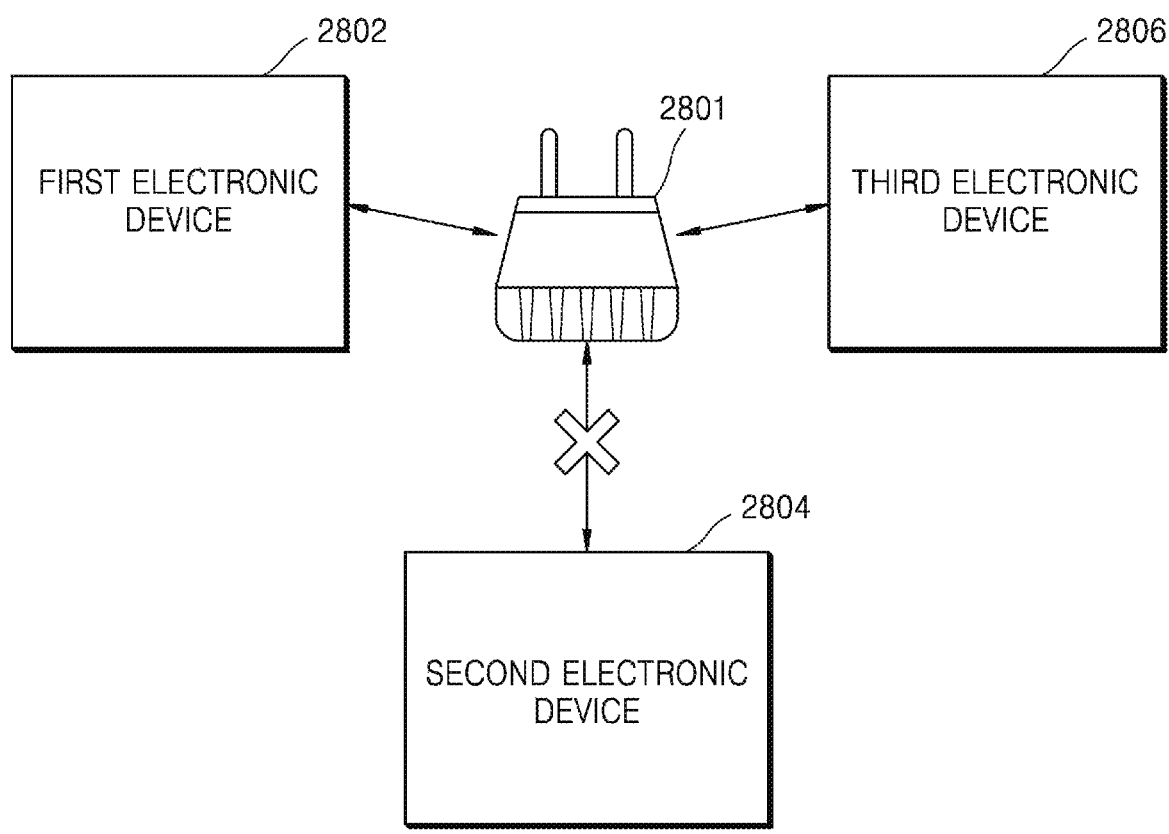
FIG. 28 is a diagram illustrating an example in which a plurality of electronic devices process a speech input according to an embodiment of the disclosure.

FIG. 28 is a diagram illustrating an example in which a plurality of electronic devices process a speech input according to an embodiment of the disclosure.

Referring to FIG. 28, a first electronic device 2802, a second electronic device 2804, and a third electronic device 2806 may be devices that may correspond to the electronic device 1000 of FIGS. 1 to 3. The first electronic device 2802, the second electronic device 2804, and the third electronic device 2806 may be different devices that may be connected through a network device 2801.

According to an embodiment of the disclosure, the first electronic device 2802 may receive an indication indicating presence of each of the second electronic device 2804 and the third electronic device 2806 from the second electronic device 2804 and the third electronic device 2806 as power of the second electronic device 2804 and the third electronic device 2806 is activated. The first electronic device 2802 may detect the presence of each device as the first electronic device 2802 receives the indication indicating the presence of each device.

According to an embodiment of the disclosure, the first electronic device 2802 may store information about the second electronic device 2804 and the third electronic device 2806 in a storage device (e.g. memory) inside the first electronic device 2802 as the first electronic device 2802 detects the presence the second electronic device 2804 and the third electronic device 2806. The information about the second electronic device 2804 and the third electronic device 2806 may include a variety of information about the second electronic device 2804 and the third electronic device 2806, for example, identification information of the second electronic device 2804 and the third electronic device 2806, information about applications that may process the speech input in the second electronic device 2804 and the third electronic device 2806, IP addresses of the second electronic device 2804 and the third electronic device 2806, information about the quality of a network connected to the second electronic device 2804 and the third electronic device 2806, etc.

Also, the first electronic device 2802 may detect absence of the second electronic device 2804 as the power of the second electronic device 2804 is deactivated. According to an embodiment of the disclosure, the first electronic device 2802 may delete the information about the second electronic device 2804 stored in the first electronic device 2802 as the first electronic device 2802 detects the absence of the second electronic device 2804.

Figure 29:
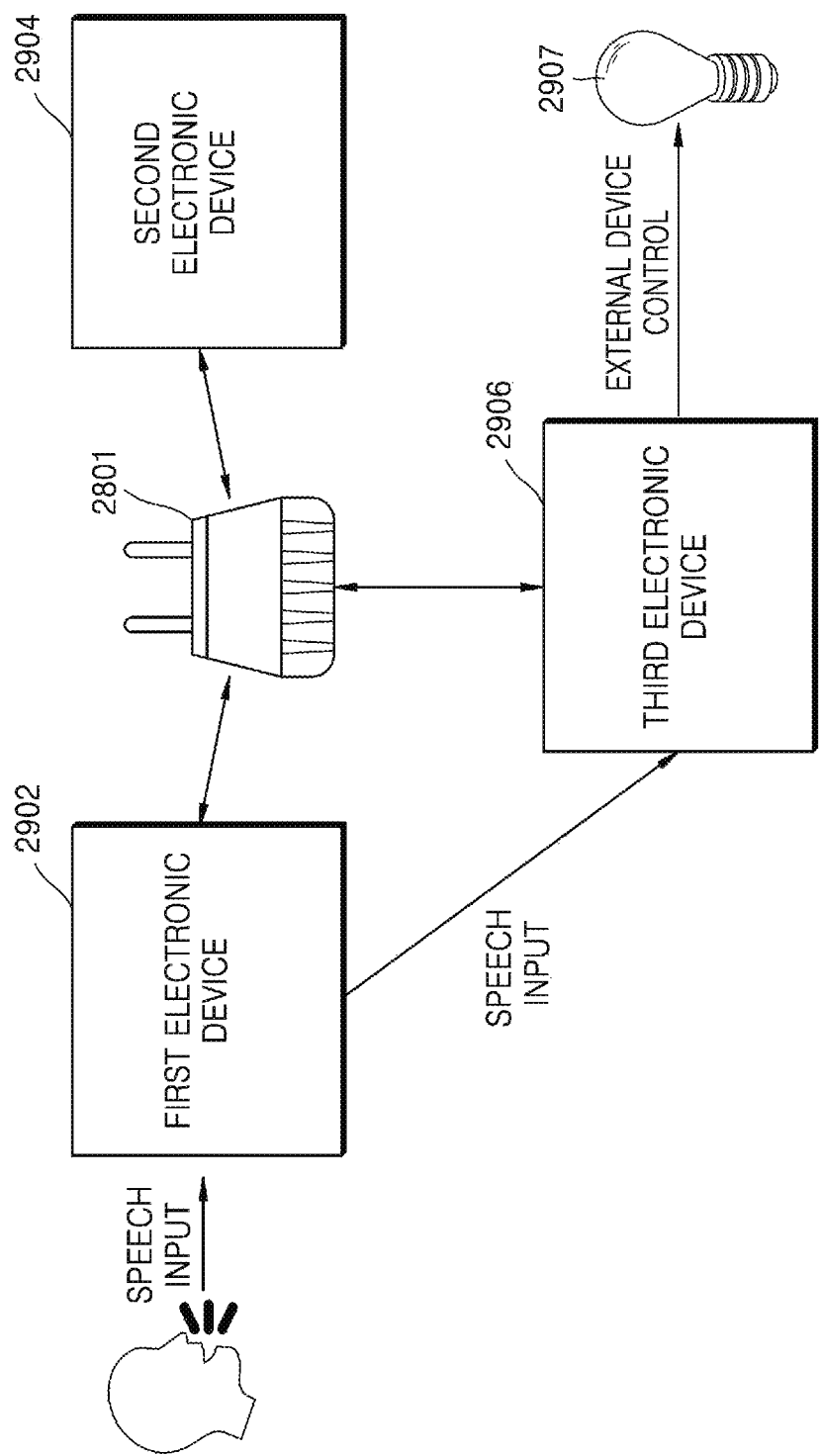
FIG. 29 is a diagram illustrating an example in which a plurality of electronic devices process a speech input according to an embodiment of the disclosure.

FIG. 29 is a diagram illustrating an example in which a plurality of electronic devices process a speech input according to an embodiment of the disclosure.

Referring to FIG. 29, a first electronic device 2902, a second electronic device 2904, and a third electronic device 2906 may be devices that may correspond to the electronic device 1000 of FIGS. 1 to 3. The first electronic device 2902, the second electronic device 2904, and the third electronic device 2906 may be different devices that may be connected through a network device 2901. Also, each of the first electronic device 2902, the second electronic device 2904, and the third electronic device 2906 may process the speech input to output the response corresponding to the speech input.

According to an embodiment of the disclosure, the first electronic device 2902 may store information about the second electronic device 2904 and the third electronic device 2906 in a storage device (e.g., memory) inside the first electronic device 2902 as the first electronic device 2902 detects the presence the second electronic device 2904 and the third electronic device 2906.

Unlike the first electronic device 2902 and the second electronic device 2904, the third electronic device 2806 may be connected to an external device 2907 to perform an operation of controlling the external device 2907 according to the speech input.

According to an embodiment of the disclosure, the first electronic device 2902 may receive the speech input from a user. For example, the first electronic device 2902 may be changed to an active state in which the first electronic device 2902 may process the speech input from an inactive state as the first electronic device 2902 receives the speech input including a wakeup word. When the speech input received by the first electronic device 2902 includes a user request to control the external device 2907, the first electronic device 2902 may determine a state in which the first electronic device 2902 may not process the speech input.

The first electronic device 2902 may transmit a wakeup request to the second electronic device 2904 and the third electronic device 2906 through the network device 2801 for processing of the speech input. As the wakeup request is transmitted, the second electronic device 2904 and the third electronic device 2906 may be in the active state in which the second electronic device 2904 and the third electronic device 2906 may process the speech input for a predetermined time period.

The first electronic device 2902 may obtain information about an operation that may be performed in each device from the second electronic device 2904 and the third electronic device 2906 in the active state. While the third electronic device 2904 remains in the activate state, the first electronic device 2902 may transmit the speech input to the third electronic device 2906 that may perform the operation according to the speech input based on the obtained information.

The third electronic device 2906 may process the speech input received from the first device 2902 to perform an operation of controlling the external device 2907 and transmit a result of performing the operation to the first electronic device 2902 or the third electronic device 2906 may output the result as the response to the speech input.

Figure 30:
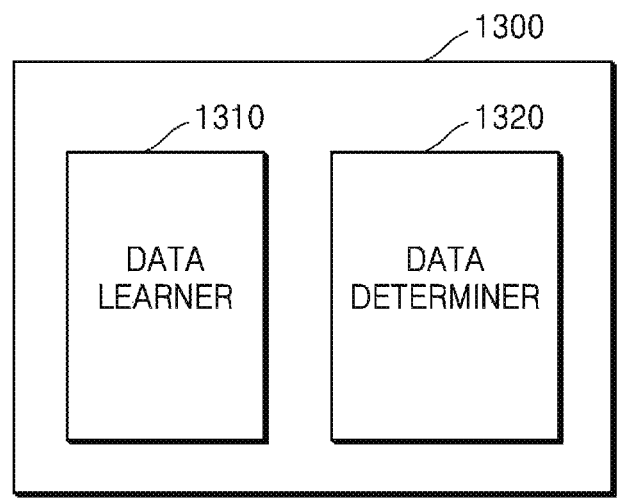
FIG. 30 is a block diagram of a processor according to an embodiment of the disclosure.

FIG. 30 is a block diagram of a processor according to an embodiment of the disclosure.

Referring to FIG. 30, the processor 1300 may include a data learner 1310 and a data determiner 1320.

The data learner 1310 may learn a reference for determining a situation. The data learner 1310 may learn the reference about what data to use for determining a predetermined situation or how to determine the situation using the data. The data learner 1310 may obtain data to be used for learning, and apply the obtained data to a data determination model that will be described later, thereby learning the reference for determining the situation.

The data learner 1310 may learn a reference for selecting an application for outputting a response corresponding to a speech input.

The data determiner 1320 may determine the situation based on the data. The data determiner 1320 may determine the situation from predetermined data by using the learned data determination model. The data determiner 1320 may obtain predetermined data according to a previously determined reference by learning and use the data determination model having the obtained data as an input value, thereby determining the predetermined situation based on the predetermined data. Further, a resultant value output by the data determination model having the obtained data as the input value may be used to refine the data determination model.

The data determiner 1320 according to an embodiment of the disclosure may select the application for outputting the response corresponding to the speech input by using the learned data determination model.

At least one of the data learner 1310 or the data determiner 1320 may be manufactured in the form of at least one hardware chip and mounted on an electronic device. For example, at least one of the data learner 1310 or the data determiner 1320 may be manufactured in the form of a dedicated hardware chip for AI or may be manufactured as a part of an existing general purpose processor (e.g. a central processing unit (CPU) or an application processor) or a graphics-only processor (e.g., a graphics processing unit (GPU)) and mounted on the electronic device.

In this case, the data learner 1310 and the data determiner 1320 may be mounted on one electronic device or may be mounted on separate electronic devices. For example, one of the data learner 1310 and the data determiner 1320 may be included in the electronic device, and the other may be included in a server. The data learner 1310 and the data determiner 1320 may also provide model information constructed by the data learner 1310 to the data determiner 1320 by wired or wirelessly, and provide data input to the data determiner 1320 to the data learner 1310 as additional training data.

Meanwhile, at least one of the data learner 1310 or the data determiner 1320 may be implemented as a software module. When the at least one of the data learner 1310 or the data determiner 1320 is implemented as the software module (or a program module including an instruction), the software module may be stored in non-transitory computer readable media. Further, in this case, at least one software module may be provided by an operating system (OS) or by a predetermined application. Alternatively, one of the at least one software module may be provided by the OS, and the other one may be provided by the predetermined application.

Figure 31:
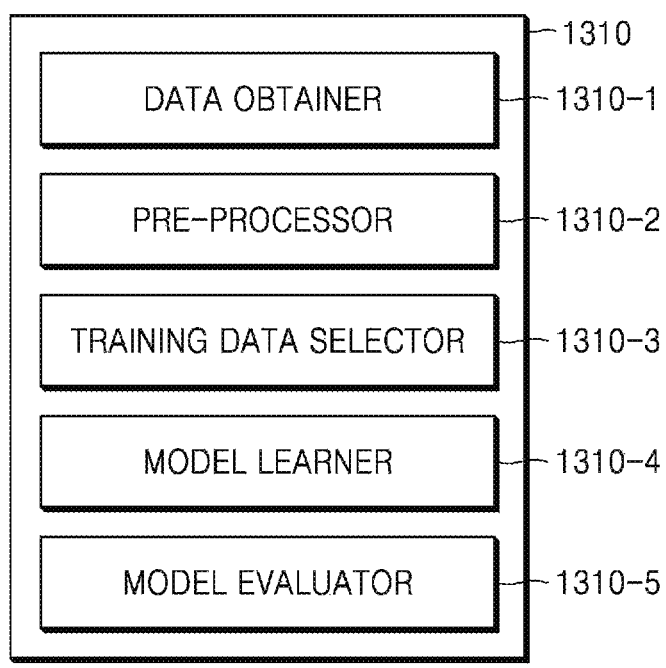
FIG. 31 is a block diagram of a data learner according to an embodiment of the disclosure.

FIG. 31 is a block diagram of the data learner 1310 according to an embodiment of the disclosure.

Referring to FIG. 31, the data learner 1310 according to an embodiment of the disclosure may include a data obtainer 1310-1, a preprocessor 1310-2, a training data selector 1310-3, a model learner 1310-4 and a model evaluator 1310-5.

The data obtainer 1310-1 may obtain data necessary for the situation determination. The data obtainer 1310-1 may obtain data necessary for learning for the situation determination.

According to an embodiment of the disclosure, the data obtainer 1310-1 may obtain data that may be used to select an application for processing a speech input. The data that can be acquired by the data obtainer 1310-1 includes, for example, metadata obtained based on the text corresponding to the speech input, information about the response of the speech input output by each application, and the like.

The preprocessor 1310-2 may pre-process the obtained data such that the obtained data may be used for learning for the situation determination. The preprocessor 1310-2 may process the obtained data in a predetermined format such that the model learner 1310-4, which will be described later, may use the obtained data for learning for the situation determination.

The training data selector 1310-3 may select data necessary for learning from the preprocessed data. The selected data may be provided to the model learner 1310-4. The training data selector 1310-3 may select the data necessary for learning from the preprocessed data according to a predetermined reference for the situation determination. The training data selector 1310-3 may also select the data according to a predetermined reference by learning by the model learner 1310-4, which will be described later.

The model learner 1310-4 may learn a reference as to how to determine a situation based on training data. Also, the model learner 1310-4 may learn a reference as to which training data is used for the situation determination.

According to an embodiment of the disclosure, the model learner 1310-4 may learn a reference for selecting an application to output a response preferred by a user, such as outputting a response of a more specific content or outputting a response at a high speed in correspondence to the speech input.

Also, the model learner 1310-4 may learn a data determination model used for the situation determination using the training data. In this case, the data determination model may be a previously constructed model. For example, the data determination model may be the previously constructed model by receiving basic training data (e.g., a sample image, etc.)

The data determination model may be constructed in consideration of an application field of a determination model, a purpose of learning, or the computer performance of an apparatus, etc. The data determination model may be, for example, a model based on a neural network. For example, a model such as deep neural network (DNN), recurrent neural network (RNN), and bidirectional recurrent DNN (BRDNN) may be used as the data determination model, but is not limited thereto.

According to various embodiments of the disclosure, when there are a plurality of data determination models that are previously constructed, the model learner 1310-4 may determine a data determination model having a high relation between input training data and basic training data as the data determination model. In this case, the basic training data may be previously classified according to data types, and the data determination model may be previously constructed for each data type. For example, the basic training data may be previously classified according to various references such as a region where the training data is generated, a time at which the training data is generated, a size of the training data, a genre of the training data, a creator of the training data, a type of an object in the training data, etc.

Also, the model learner 1310-4 may train the data determination model using a learning algorithm including, for example, an error back-propagation method or a gradient descent method.

The model learner 1310-4 may train the data determination model through supervised learning using, for example, the training data as an input value. Also, the model learner 1310-4 may train the data determination model through unsupervised learning to find the reference for situation determination by learning a type of data necessary for situation determination for itself without any guidance. Also, the model learner 1310-4 may train the data determination model, for example, through reinforcement learning using feedback on whether a result of situation determination based on the learning is correct.

Further, when the data determination model is trained, the model learner 1310-4 may store the learned data determination model. In this case, the model learner 1310-4 may store the trained data determination model in a memory of the electronic device including the data determiner 1320. Alternatively, the model learner 1310-4 may store the trained data determination model in a memory of the electronic device including the data determiner 1320 that will be described later. Alternatively, the model learner 1310-4 may store the trained data determination model in a memory of a server connected to the electronic device over a wired or wireless network.

In this case, the memory in which the trained data determination model is stored may also store, for example, a command or data related to at least one other component of the electronic device. The memory may also store software and/or program. The program may include, for example, a kernel, middleware, an application programming interface (API), and/or an application program (or "application").

The model evaluator 1310-5 may input evaluation data to the data determination model, and when a recognition result output from the evaluation data does not satisfy a predetermined reference, the model evaluator 1310-5 may allow the model learner 1310-4 to be trained again. In this case, the evaluation data may be predetermined data for evaluating the data determination model.

For example, when the number or a ratio of evaluation data having an incorrect recognition result among recognition results of the trained data determination model with respect to the evaluation data exceeds a predetermined threshold value, the model evaluator 1310-5 may evaluate that the data determination model does not satisfy the predetermined reference. For example, when the predetermined reference is defined as a ratio of 2%, and when the trained data determination model outputs an incorrect recognition result with respect to evaluation data exceeding 20 among a total of 1000 evaluation data, the model evaluator 1310-5 may evaluate that the trained data determination model is not suitable.

On the other hand, when there are a plurality of trained data determination models, the model evaluator 1310-5 may evaluate whether each of the trained motion determination models satisfies the predetermined reference and determine a model satisfying the predetermined reference as a final data determination model. In this case, when a plurality of models satisfy the predetermined reference, the model evaluator 1310-5 may determine any one or a predetermined number of models previously set in descending order of evaluation scores as the final data determination model.

Meanwhile, at least one of the data obtainer 1310-1, the preprocessor 1310-2, the training data selector 1310-3, the model learner 1310-4, or the model evaluator 1310-5 in the data learner 1310 may be manufactured in the form of at least one hardware chip and mounted on the electronic device. For example, the at least one of the data obtainer 1310-1, the preprocessor 1310-2, the training data selector 1310-3, the model learner 1310-4, or the model evaluator 1310-5 may be manufactured in the form of a dedicated hardware chip for AI or may be manufactured as a part of an existing general purpose processor (e.g. a CPU or an application processor) or a graphics-only processor (e.g., a GPU) and mounted on the electronic device.

Also, the data obtainer 1310-1, the preprocessor 1310-2, the training data selector 1310-3, the model learner 1310-4, and the model evaluator 1310-5 may be mounted on one electronic device or may be mounted on separate electronic devices. For example, some of the data obtainer 1310-1, the preprocessor 1310-2, the training data selector 1310-3, the model learner 1310-4, and the model evaluator 1310-5 may be included in the electronic device, and the others may be included in the server.

Also, at least one of the data obtainer 1310-1, the preprocessor 1310-2, the training data selector 1310-3, the model learner 1310-4, or the model evaluator 1310-5 may be implemented as a software module. When the at least one of the data obtainer 1310-1, the preprocessor 1310-2, the training data selector 1310-3, the model learner 1310-4, or the model evaluator 1310-5 is implemented as the software module (or a program module including an instruction), the software module may be stored in non-transitory computer readable media. Further, in this case, at least one software module may be provided by an OS or by a predetermined application. Alternatively, one of the at least one software module may be provided by the OS, and the other one may be provided by the predetermined application.

Figure 32:
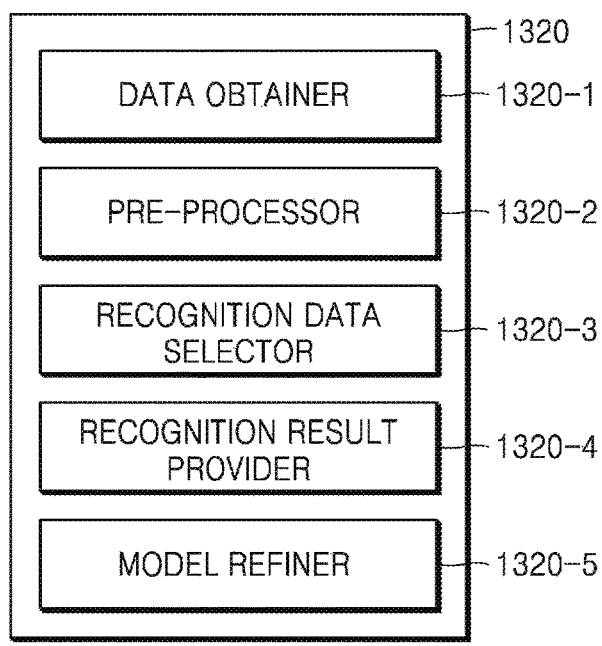
FIG. 32 is a block diagram of a data determiner according to an embodiment of the disclosure.

FIG. 32 is a block diagram of the data determiner 1320 according to an embodiment of the disclosure.

Referring to FIG. 32, the data determiner 1320 according to an embodiment of the disclosure may include a data obtainer 1320-1, a preprocessor 1320-2, a recognition data selector 1320-3, a recognition result provider 1320-4 and a model refiner 1320-5.

The data obtainer 1320-1 may obtain data necessary for situation determination, and the preprocessor 1320-2 may preprocess the obtained data such that the obtained data may be used for situation determination. The preprocessor 1320-2 may process the obtained data to a predetermined format such that the recognition result provider 1320-4, which will be described later, may use the obtained data for situation determination.

According to an embodiment of the disclosure, the electronic device 1000 may obtain text corresponding to a speech input by performing speech recognition on the speech input, and may generate metadata based on the obtained text. The electronic device 1000 may obtain the generated metadata as data necessary for the situation determination.

The recognition data selector 1320-3 may select data necessary for the situation determination from the preprocessed data. The selected data may be provided to the recognition result provider 1320-4. The recognition data selector 1320-3 may select some or all of the preprocessed data according to a predetermined reference for the situation determination. The recognition data selector 1320-3 may also select data according to the predetermined reference by learning by the model learner 1310-4, which will be described later.

The recognition result provider 1320-4 may determine a situation by applying the selected data to a data determination model. The recognition result provider 1320-4 may provide a recognition result according to a data recognition purpose. The recognition result provider 1320-4 may apply the selected data to the data determination model by using the data selected by the recognition data selector 1320-3 as an input value. Also, the recognition result may be determined by the data determination model.

According to an embodiment of the disclosure, a result of selecting an application for processing a speech input by the data determination model may be provided.

The model refiner 1320-5 may modify the data determination model based on evaluation of the recognition result provided by the recognition result provider 1320-4. For example, the model refiner 1320-5 may provide the model learner 1310-4 with the recognition result provided by the recognition result provider 1320-4 such that the model learner 1310-4 may modify the data determination model.

Meanwhile, at least one of the data obtainer 1320-1, the preprocessor 1320-2, the recognition data selector 1320-3, the recognition result provider 1320-4, or the model refiner 1320-5 in the data determiner 1320 may be manufactured in the form of at least one hardware chip and mounted on an electronic device. For example, the at least one of the data obtainer 1320-1, the preprocessor 1320-2, the recognition data selector 1320-3, the recognition result provider 1320-4, or the model refiner 1320-5 may be manufactured in the form of a dedicated hardware chip for AI or may be manufactured as a part of an existing general purpose processor (e.g., a CPU or an application processor) or a graphics-only processor (e.g., a GPU) and mounted on the electronic device.

Also, the data obtainer 1320-1, the preprocessor 1320-2, the recognition data selector 1320-3, the recognition result provider 1320-4, and the model refiner 1320-5 may be mounted on one electronic device or may be mounted on separate electronic devices. For example, some of the data obtainer 1320-1, the preprocessor 1320-2, the recognition data selector 1320-3, the recognition result provider 1320-4, and the model refiner 1320-5 may be included in the electronic device, and the others may be included in a server.

Also, at least one of the data obtainer 1320-1, the preprocessor 1320-2, the recognition data selector 1320-3, the recognition result provider 1320-4, or the model refiner 1320-5 may be implemented as a software module. When the at least one of the data obtainer 1320-1, the preprocessor 1320-2, the recognition data selector 1320-3, the recognition result provider 1320-4, or the model refiner 1320-5 is implemented as the software module (or a program module including an instruction), the software module may be stored in non-transitory computer readable media. Further, in this case, at least one software module may be provided by an OS or by a predetermined application. Alternatively, one of the at least one software module may be provided by the OS, and the other one may be provided by the predetermined application.

Figure 33:
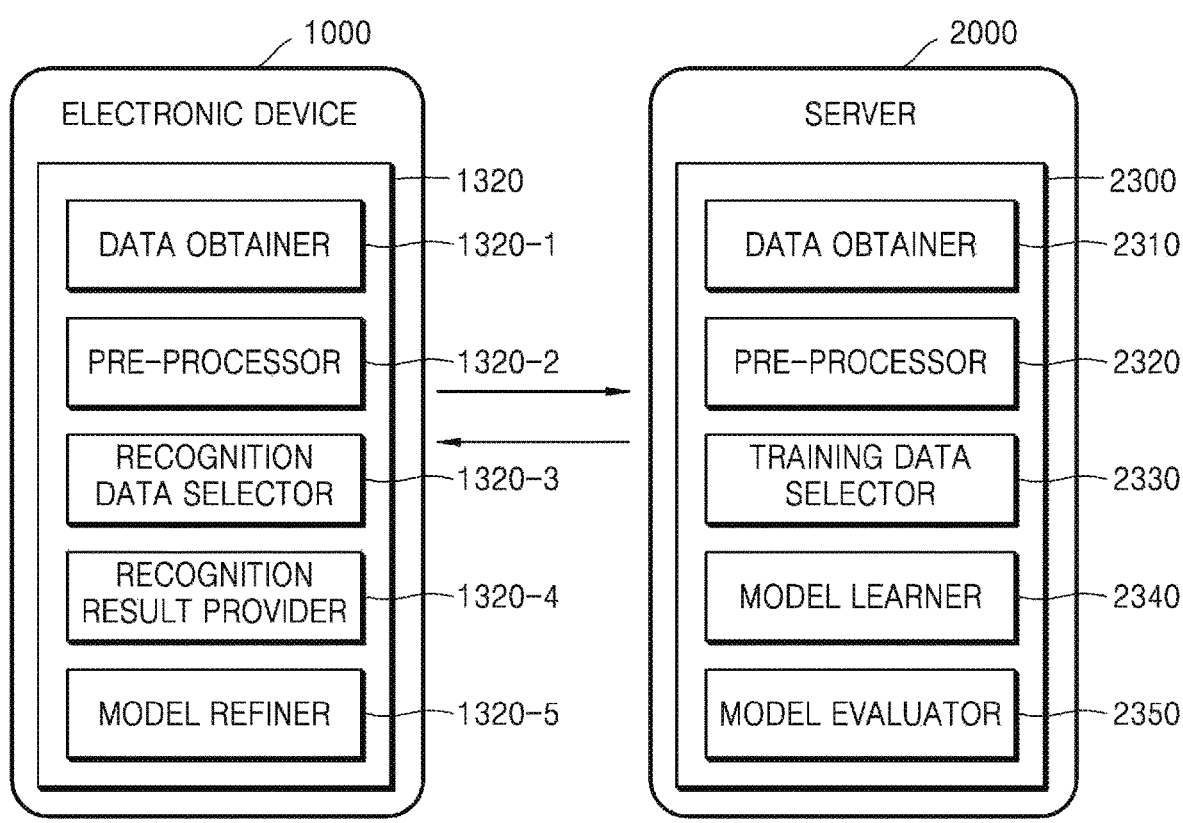
FIG. 33 is a diagram illustrating an example in which an electronic device and a server learn and determine data by interacting with each other according to an embodiment of the disclosure.

FIG. 33 is a diagram illustrating an example in which an electronic device and a server learn and determine data by interacting with each other according to an embodiment of the disclosure.

Referring to FIG. 33, the server 2000 may be implemented with at least one computer device. The server 2000 may be distributed in the form of a cloud and may provide commands, codes, files, contents, and the like. The server 2000 may include a data determiner 2300, which may include data obtainer 2310, pre-processor 2320, training data selector 2330, model learner 2340, and model evaluator 2350.

Referring to FIG. 33, the server 2000 may learn a reference for situation determination, and the electronic device 1000 may determine a situation based on a learning result by the server 2000.

In this case, a model learner 2340 of the server 2000 may perform a function of the data learner 1310 shown in FIG. 31. The model learner 2340 of the server 2000 may learn the reference about what data to use for determining a predetermined situation or how to determine the situation using the data. The model learner 2340 may obtain data to be used for learning, and apply the obtained data to a data determination model that will be described later, thereby learning the reference for determining the situation.

According to an embodiment of the disclosure, the server 2000 may learn a reference for selecting an application to output a response preferred by a user, such as outputting a response of a more specific content or outputting a response at a high speed in correspondence to the speech input.

Also, the recognition result provider 1320-4 of the electronic device 1000 may determine the situation by applying data selected by the recognition data selector 1320-3 to the data determination model generated by the server 2000. For example, the recognition result provider 1320-4 may transmit the data selected by the recognition data selector 1320-3 to the server 2000 and request the server 2000 to apply the data selected by the recognition data selector 1320-3 to the data determination model and determine the situation. Further, the recognition result provider 1320-4 may receive information about the situation determined by the server 2000 from the server 2000.

Alternatively, the recognition result provider 1320-4 of the electronic device 1000 may receive the data determination model generated by the server 2000 from the server 2000 to determine the situation using the received data determination model. In this case, the recognition result provider 1320-4 of the electronic device 1000 may apply the data selected by the recognition data selector 1320-3 to the data determination model received from the server 2000 to determine the situation.

According to an embodiment of the disclosure, the electronic device 1000 may use the application selected by the server 2000 to output a response to a speech input.

In addition, the server 2000 may perform some operations that the electronic device 1000 may perform, as well as a function of learning the above-described data. For example, the server 2000 may obtain metadata based on the speech input 100 of a user received from the electronic device 1000, and may transmit information about at least one application selected based on the metadata to the electronic device 1000. The server 2000 may also obtain the metadata based on the speech input 100 of the user received from the electronic device 1000 and use the at least one application selected based on the metadata to perform an operation corresponding to the speech input 100. The server 2000 may generate a result of performing the operation and provide the result to the electronic device 1000.

The server 2000 may perform various operations to provide the electronic device 1000 with the response to the speech input 100 according to an embodiment of the disclosure and transmit results of performing the operations to the electronic device 1000.

According to an embodiment of the disclosure, an application suitable for processing a speech input may be selected based on metadata about the speech input, and the speech input may be processed by the selected application, and thus a highly accurate response to the speech input may be provided to the user.

According to an embodiment of the disclosure, an application to provide a response to the speech input may be selected based on the metadata about the speech input, and thus the response to the speech input may be provided by the application suitable for providing the response to the speech input.

An embodiment of the disclosure may be implemented as a recording medium including computer-readable instructions such as a computer-executable program module. The computer-readable medium may be an arbitrary available medium accessible by a computer, and examples thereof include all volatile and non-volatile media and separable and non-separable media. Further, examples of the computer-readable medium may include a computer storage medium and a communication medium. Examples of the computer storage medium include all volatile and non-volatile media and separable and non-separable media, which are implemented by an arbitrary method or technology, for storing information such as computer-readable instructions, data structures, program modules, or other data. The communication medium generally includes computer-readable instructions, data structures, program modules, other data of a modulated data signal, or other transmission mechanisms, and examples thereof include an arbitrary information transmission medium.

Also, in this specification, the term "unit" may be a hardware component such as a processor or a circuit, and/or a software component executed by a hardware component such as a processor.

It will be understood by those of ordinary skill in the art that the foregoing description of the disclosure is for illustrative purposes only and that those of ordinary skill in the art may readily understand that various changes and modifications may be made without departing from the spirit or essential characteristics of the disclosure. It is therefore to be understood that the above-described embodiments of the disclosure are illustrative in all aspects and not restrictive. For example, each component described as a single entity may be distributed and implemented, and components described as being distributed may also be implemented in a combined form.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device, the method comprising:
    receiving, by a user inputter of the electronic device, a speech input;
    in response to receiving the speech input, obtaining, by at least one processor of the electronic device, text corresponding to the speech input by performing speech recognition on the speech input;
    obtaining, by the at least one processor, metadata for the speech input based on the obtained text;
    based on the metadata, obtain preference information about a plurality of applications for processing the speech input, the preference information comprising at least one of information about a result of processing the speech input by the plurality of applications or information about a time taken for the plurality of applications to output responses;
    based on the metadata and the preference information, selecting, by the at least one processor, at least one application from among the plurality of applications for outputting a response to the speech input;
    outputting, by the at least one processor, the response to the speech input by using the selected at least one application;
    updating the preference information based on information about speech output successful for outputting the response to the speech input by each application and the time taken for each application to output the response to the speech input; and
    storing the updated preference information.

2. The method of claim 1, wherein the metadata comprises at least one of a keyword extracted from the obtained text, information about an intention of a user obtained based on the obtained text, information about a sound characteristic of the speech input, or information about the user of the electronic device.

3. The method of claim 1, wherein the preference information further comprises information about feedback information of a user about responses output by the plurality of applications.

4. The method of claim 1, wherein the outputting of the response comprises:
    obtaining, by the at least one processor, at least one response to the speech input from the selected at least one application;
    determining, by the at least one processor, a priority of the at least one response; and
    outputting, by the at least one processor, the at least one response according to the determined priority.

5. The method of claim 4, wherein the determining of the priority comprises determining, by the at least one processor, the priority based on at least one of an intention of a user related to the at least one response, a size of the at least one response, whether the at least one response comprises a characteristic preferred by the user, or information about a time taken to output the at least one response after obtaining the at least one response.

6. The method of claim 4, wherein the determining of the priority comprises, in response to the user inputter receiving a plurality of speech inputs, determining, by the at least one processor, the priority based on metadata of each of the plurality of speech inputs.

7. The method of claim 1, further comprising, based on detecting an event comprising a state in which an application previously determined as an application for outputting the response to the speech input cannot output the response to the speech input, selecting, by the at least one processor, at least one of the plurality of applications for outputting the response to the speech input.

8. An electronic device comprising:
    an outputter;
    a user inputter configured to receive a speech input; and
    at least one processor configured to:
        in response to the user inputter receiving the speech input, obtain text by performing speech recognition on the speech input,
        obtain metadata for the speech input based on the obtained text,
        based on the metadata, obtain preference information about a plurality of applications for processing the speech input, the preference information comprising at least one of information about a result of processing the speech input by the plurality of applications or information about a time taken for the plurality of applications to output responses,
        based on the metadata and the preference information, select at least one application from among the plurality of applications for outputting a response to the speech input,
        control the outputter to output the response to the speech input by using the selected at least one application,
        update the preference information based on information about speech output successful for outputting the response to the speech input by each application and the time taken for each application to output the response to the speech input, and store the updated preference information.

9. The electronic device of claim 8, wherein the metadata comprises at least one of a keyword extracted from the obtained text, information about an intention of a user obtained based on the obtained text, information about a sound characteristic of the speech input, or information about the user of the electronic device.

10. The electronic device of claim 8, wherein the preference information further comprises information about feedback information of a user about responses output by the plurality of applications.

11. The electronic device of claim 8, wherein the at least one processor is further configured to:
obtain at least one response to the speech input from the selected at least one application,
determine a priority of the at least one response, and
control the outputter to output the at least one response according to the determined priority.

12. The electronic device of claim 11, wherein the at least one processor is further configured to determine the priority based on at least one of an intention of a user related to the at least one response, a size of the at least one response, whether the at least one response comprises a characteristic preferred by the user, or information about a time taken to output the at least one response after obtaining the at least one response.

13. The electronic device of claim 11, wherein the at least one processor is further configured to, in response to the user inputter receiving a plurality of speech inputs, determine the priority based on metadata of each of the plurality of speech inputs.

14. The electronic device of claim 8, wherein the at least one processor is further configured to, based on detecting an event comprising a state in which an application previously determined as an application for outputting the response to the speech input cannot output the response to the speech input, select at least one of the plurality of applications for outputting the response to the speech input.

15. A non-transitory computer-readable storage medium configured to store one or more computer programs including instructions that, when executed by at least one processor of an electronic device, cause the at least one processor to control to:
receive a speech input;
in response to receiving the speech input, obtain text corresponding to the speech input by performing speech recognition on the speech input;
obtain metadata for the speech input based on the obtained text;
based on the metadata, obtain preference information about a plurality of applications for processing the speech input, the preference information comprising at least one of information about a result of processing the speech input by the plurality of applications or information about a time taken for the plurality of applications to output responses;
based on the metadata and the preference information, select at least one application from among the plurality of applications for outputting a response to the speech input;
output the response to the speech input by using the selected at least one application;
update the preference information based on information about speech output successful for outputting the response to the speech input by each application and the time taken for each application to output the response to the speech input; and
store the updated preference information.

\* \* \* \* \*

UNITED STATES PATENT AND TRADEMARK OFFICE
CERTIFICATE OF CORRECTION

PATENT NO.        : 11,508,364 B2
APPLICATION NO.   : 16/418371
DATED             : November 22, 2022
INVENTOR(S)       : Cheenepalli Srirama Krishna Bhargava et al.

It is certified that error appears in the above-identified patent and that said Letters Patent is hereby corrected as shown below:

On the Title Page

In item (30) the Foreign Application Priority Data, please replace:
"May 22, 2018 (IN) ................ 20184109106"
With:
--May 22, 2018 (IN) ... 201841019106--

In item (30) the Foreign Application Priority Data, please replace:
"Nov. 30, 2018 (IN) ................ 2018 4109106"
With:
--Nov. 30, 2018 (IN) ... 2018 41019106--

Signed and Sealed this
Seventh Day of November, 2023

Katherine Kelly Vidal
Director of the United States Patent and Trademark Office